US010586655B1

(12) United States Patent
Stockman

(10) Patent No.: US 10,586,655 B1
(45) Date of Patent: Mar. 10, 2020

(54) CAPACITOR WITH MULTIPLE ELEMENTS FOR MULTIPLE REPLACEMENT APPLICATIONS

(71) Applicant: American Radionic Company, Inc., Palm Coast, FL (US)

(72) Inventor: Robert M. Stockman, Palm Coast, FL (US)

(73) Assignee: American Radionic Company, Inc., Palm Coast, FL (US)

( * ) Notice: Subject to any disclaimer, the term of this patent is extended or adjusted under 35 U.S.C. 154(b) by 0 days.

(21) Appl. No.: 16/526,308

(22) Filed: Jul. 30, 2019

Related U.S. Application Data

(60) Provisional application No. 62/785,989, filed on Dec. 28, 2018, provisional application No. 62/852,811,
(Continued)

(51) Int. Cl.
*H01G 4/32* (2006.01)
*H01G 4/38* (2006.01)
(Continued)

(52) U.S. Cl.
CPC .............. *H01G 4/385* (2013.01); *H01G 2/24* (2013.01); *H01G 4/224* (2013.01); *H01G 4/228* (2013.01);
(Continued)

(58) Field of Classification Search
CPC ........ H01G 4/385; H01G 4/236; H01G 4/232; H01G 4/32; H01G 2/24; H01G 4/224; H01G 4/38; H01G 4/228
See application file for complete search history.

(56) References Cited

U.S. PATENT DOCUMENTS 1,665,499 A    4/1928  Hoch
1,707,959 A    4/1929  Fried
(Continued)

FOREIGN PATENT DOCUMENTS

CA    2285721    4/2000
CN    3607691    2/2007
(Continued)

OTHER PUBLICATIONS

US 10,504,654 B2, 12/2019, Stockman (withdrawn)*
(Continued)

*Primary Examiner* — Nguyen T Ha
(74) *Attorney, Agent, or Firm* — Fish & Richardson P.C.

(57) ABSTRACT

An apparatus includes a case having an elliptical cross-section capable of receiving a plurality of capacitive elements. One or more of the capacitive elements provide at least one capacitor having a first capacitor terminal and a second capacitor terminal. The apparatus also includes a cover assembly that includes a deformable cover mountable to the case, and, a common cover terminal having a contact extending from the cover. The cover assembly also includes at least three capacitor cover terminals, each of the at least three capacitor cover terminals having at least one contact extending from the deformable cover. The deformable cover is configured to displace at least one of the at least three capacitor cover terminals upon an operative failure of at least one of the plurality of the capacitive elements. The cover assembly also includes at least four insulation structures. One of the four insulation structures is associated with one of the at least three capacitor cover terminals. The apparatus also includes a first conductor capable of electrically connecting the first capacitor terminal of a capacitor provided by one of the plurality of capacitive elements to one of the at least three capacitor cover terminals and a
(Continued)

second conductor capable of electrically connecting the second capacitor terminal of the capacitor provided by one of the plurality of capacitive elements to the common cover terminal.

21 Claims, 39 Drawing Sheets

Related U.S. Application Data filed on May 24, 2019, provisional application No. 62/858,608, filed on Jun. 7, 2019.

(51) Int. Cl.
 H01G 4/228 (2006.01)
 H01G 4/224 (2006.01)
 H01G 4/236 (2006.01)
 H01G 4/232 (2006.01)
 H01G 2/24 (2006.01)
(52) U.S. Cl.
 CPC ............. *H01G 4/232* (2013.01); *H01G 4/236* (2013.01); *H01G 4/32* (2013.01)

(56) References Cited

U.S. PATENT DOCUMENTS

| | | |
|---|---|---|
| 1,943,714 A | 1/1934 | Bailey |
| 2,202,166 A | 11/1937 | Peck |
| D122,825 S | 10/1940 | Peck |
| D124,726 S | 1/1941 | Shimer |
| 2,569,925 A | 12/1948 | Deeley |
| 2,896,008 A | 12/1953 | Putz |
| 3,015,687 A | 11/1959 | Ruscito |
| 3,302,081 A | 1/1967 | Grahame |
| 3,304,473 A | 2/1967 | Netherwood et al. |
| D209,054 S | 10/1967 | Braiman et al. |
| D210,210 S | 2/1968 | Braiman et al. |
| 3,377,510 A | 4/1968 | Rayno |
| 3,921,041 A | 11/1975 | Stockman |
| 3,988,650 A | 10/1976 | Fritze |
| 4,028,595 A | 6/1977 | Stockman |
| 4,095,902 A | 6/1978 | Florer et al. |
| 4,106,068 A | 8/1978 | Flanagan |
| 4,107,758 A | 8/1978 | Shirn et al. |
| 4,112,424 A | 9/1978 | Lapeyre |
| 4,209,815 A | 6/1980 | Rollins et al. |
| 4,240,126 A | 12/1980 | Sanvito |
| 4,263,638 A | 4/1981 | Stockman et al. |
| 4,312,027 A | 1/1982 | Stockman |
| 4,326,237 A | 4/1982 | Markarian et al. |
| 4,352,145 A | 9/1982 | Stockman |
| 4,363,078 A | 12/1982 | Dwyer |
| 4,398,782 A | 8/1983 | Markarian |
| 4,408,818 A | 10/1983 | Markarian |
| 4,420,791 A | 12/1983 | Shedigian |
| 4,447,854 A | 5/1984 | Markarian |
| 4,459,637 A | 7/1984 | Shedigian |
| 4,486,809 A | 12/1984 | Deak et al. |
| 4,546,300 A | 10/1985 | Shaikh |
| 4,558,394 A | 12/1985 | Stockman |
| 4,586,107 A | 4/1986 | Price |
| 4,609,967 A | 9/1986 | Shedigian |
| 4,621,301 A | 11/1986 | Shedigian |
| 4,631,631 A | 12/1986 | Hodges et al. |
| 4,633,365 A | 12/1986 | Stockman |
| 4,633,367 A | 12/1986 | Strange et al. |
| 4,633,369 A | 12/1986 | Lapp et al. |
| 4,639,828 A | 1/1987 | Strange et al. |
| 4,642,731 A | 2/1987 | Shedigian |
| 4,698,725 A | 10/1987 | MacDougall et al. |
| 4,754,361 A | 6/1988 | Venturini |
| 4,768,129 A | 8/1988 | Sasaki |
| 4,811,161 A | 3/1989 | Sasaki |
| 4,812,941 A | 3/1989 | Rice et al. |
| 4,897,760 A | 1/1990 | Bourbeau |
| D307,000 S | 4/1990 | Sasaki |
| 5,006,726 A | 4/1991 | Okumura |
| 5,019,934 A | 5/1991 | Bentley et al. |
| 5,032,948 A | 7/1991 | Sakai |
| 5,138,519 A | 8/1992 | Stockman |
| 5,148,347 A | 9/1992 | Cox et al. |
| 5,280,219 A | 1/1994 | Ghanbari |
| 5,313,360 A | 5/1994 | Stockman |
| 5,381,301 A | 1/1995 | Hudis |
| 5,412,532 A | 5/1995 | Nishimori |
| 5,528,120 A | 6/1996 | Brodetsky |
| 5,673,168 A | 9/1997 | Efford et al. |
| 5,817,975 A | 10/1998 | Heilmann et al. |
| 5,917,975 A | 6/1999 | Bloom |
| 5,921,820 A | 7/1999 | Dijkstra |
| 5,940,263 A | 8/1999 | Jakoubovitch |
| 6,009,348 A | 12/1999 | Rorvick et al. |
| 6,014,308 A | 1/2000 | Stockman |
| 6,031,713 A | 2/2000 | Takeisha et al. |
| 6,084,764 A | 7/2000 | Anderson |
| 6,141,205 A | 10/2000 | Nutzman |
| 6,147,856 A | 11/2000 | Karidis |
| 6,157,531 A | 12/2000 | Breyen et al. |
| 6,212,058 B1 | 4/2001 | Huber |
| 6,222,270 B1 | 4/2001 | Lee |
| 6,282,078 B1 | 8/2001 | Tsai |
| 6,282,081 B1 | 8/2001 | Takabayashi et al. |
| 6,310,756 B1 | 10/2001 | Miura et al. |
| 6,313,978 B1 | 11/2001 | Stockman et al. |
| 6,373,720 B1 | 4/2002 | Fechtig et al. |
| 6,385,490 B1 | 5/2002 | O'Phelan |
| 6,404,618 B1 | 6/2002 | Beard et al. |
| 6,410,184 B1 | 6/2002 | Horiuchi |
| 6,490,158 B1 | 12/2002 | Ellyson et al. |
| 6,552,893 B2 | 4/2003 | Tanaka |
| 6,697,249 B2 | 2/2004 | Maletin et al. |
| 6,798,677 B2 | 9/2004 | Jakob et al. |
| 6,807,048 B1 | 10/2004 | Nielsen |
| 6,816,541 B1 | 11/2004 | Hong |
| 6,819,545 B1 | 11/2004 | Lobo et al. |
| 6,842,328 B2 | 1/2005 | Schott |
| 6,847,517 B2 | 1/2005 | Iwaida et al. |
| 6,888,266 B2 | 5/2005 | Burke et al. |
| 6,922,330 B2 | 7/2005 | Nielson et al. |
| 6,930,874 B2 | 8/2005 | Lobot et al. |
| 6,982,539 B1 | 1/2006 | Ward |
| 6,995,971 B2 | 2/2006 | Norton |
| 7,031,139 B1 | 4/2006 | Fayram |
| 7,046,498 B1 | 5/2006 | Huang |
| D522,456 S | 6/2006 | Matsumoto |
| 7,110,240 B2 | 9/2006 | Breyen |
| 7,184,256 B1 | 2/2007 | Sato |
| 7,203,053 B2 | 4/2007 | Stockman |
| 7,206,186 B1 | 4/2007 | Knight |
| 7,251,123 B2 | 7/2007 | O'Phelan |
| 7,365,959 B1 | 4/2008 | Ward |
| 7,423,861 B2 | 9/2008 | Stockman |
| 7,474,519 B2 | 1/2009 | Stockman |
| 7,474,520 B2 | 1/2009 | Kashihara |
| 7,492,574 B2 | 2/2009 | Fresard et al. |
| 7,511,941 B1 | 3/2009 | Gallay |
| 7,547,233 B2 | 6/2009 | Inoue et al. |
| 7,667,954 B2 | 2/2010 | Lessner |
| 7,710,713 B2 | 5/2010 | Restorff |
| D621,789 S | 8/2010 | Wang et al. |
| 7,835,133 B2 | 11/2010 | Stockman |
| 7,848,079 B1 | 12/2010 | Gordin et al. |
| 7,867,290 B2 | 1/2011 | Nielsen |
| 7,881,043 B2 | 2/2011 | Hirose et al. |
| 7,911,762 B2 | 3/2011 | Stockman |
| 7,911,766 B2 | 3/2011 | Caumont et al. |
| 7,952,854 B2 | 5/2011 | Stockman |
| 7,987,593 B1 | 8/2011 | Gorst |
| 8,029,290 B2 | 10/2011 | Johnson |
| 8,170,662 B2 | 5/2012 | Bocek |
| 8,174,817 B2 | 5/2012 | Georgopoulos et al. |
| 8,270,143 B2 | 9/2012 | Stockman |

(56) References Cited

U.S. PATENT DOCUMENTS

| | | | |
|---|---|---|---|
| 8,274,778 B2 | 9/2012 | Yoshinaga et al. | |
| 8,310,802 B2 | 11/2012 | Fujii et al. | |
| 8,331,076 B2 | 12/2012 | Tuncer | |
| 8,456,795 B2 | 6/2013 | Stockman | |
| 8,465,555 B2 | 6/2013 | Sherwood | |
| 8,514,547 B2 | 8/2013 | Galvagni | |
| 8,514,548 B2 | 8/2013 | Miller et al. | |
| 8,531,815 B2 | 9/2013 | Stockman | |
| 8,537,522 B2 | 9/2013 | Stockman | |
| 8,559,161 B2 | 10/2013 | Takeoka et al. | |
| 8,761,875 B2 | 6/2014 | Sherwood | |
| 8,842,411 B2 | 9/2014 | Zhang | |
| 8,853,318 B2 | 10/2014 | Tielemans | |
| 8,861,178 B2 | 10/2014 | Terashima et al. | |
| 8,861,184 B2 | 10/2014 | Schmidt | |
| 8,871,850 B2 | 10/2014 | Koh et al. | |
| 8,885,318 B2 | 11/2014 | Stockman | |
| 8,891,224 B2 * | 11/2014 | Stockman | H01G 2/24 361/301.5 |
| D729,164 S | 5/2015 | Chen | |
| 9,105,401 B2 | 8/2015 | Dreissig | |
| 9,318,261 B2 | 4/2016 | Stockman | |
| 9,324,501 B2 * | 4/2016 | Stockman | H01G 5/38 |
| 9,343,238 B2 * | 5/2016 | Stockman | H01G 2/24 |
| 9,378,893 B2 | 6/2016 | Stockman | |
| 9,412,521 B2 * | 8/2016 | Stockman | H01G 4/385 |
| 9,424,995 B2 * | 8/2016 | Stockman | H01G 9/008 |
| 9,466,429 B1 | 10/2016 | Casanova | |
| D771,567 S | 11/2016 | Flohe et al. | |
| 9,496,086 B2 | 11/2016 | Stockman | |
| 9,536,670 B2 | 1/2017 | Stockman | |
| 9,859,060 B1 * | 1/2018 | Stockman | H01G 4/385 |
| 9,916,934 B1 * | 3/2018 | Casanova | H01G 4/385 |
| D818,437 S | 5/2018 | Stockman | |
| D818,959 S | 5/2018 | Stockman | |
| 10,056,194 B2 | 8/2018 | Stockman | |
| 10,056,195 B2 * | 8/2018 | Stockman | H01G 9/151 |
| D829,173 S | 9/2018 | Stockman | |
| 10,134,528 B2 | 11/2018 | Stockman | |
| 10,147,549 B2 | 12/2018 | Stockman | |
| 10,147,550 B1 | 12/2018 | Stockman | |
| 10,163,571 B2 | 12/2018 | Stockman | |
| 10,249,439 B2 | 4/2019 | Stockman | |
| 10,256,195 B2 | 4/2019 | Yamamoto | |
| 10,497,518 B1 * | 12/2019 | Stockman | H01G 4/32 |
| 2001/0025618 A1 | 10/2001 | Kelling | |
| 2005/0272012 A1 | 12/2005 | Logan et al. | |
| 2006/0201971 A1 | 9/2006 | Wegman | |
| 2006/0227495 A1 | 10/2006 | Stockman | |
| 2007/0025051 A1 | 2/2007 | Stockman | |
| 2007/0236860 A1 | 10/2007 | Stockman | |
| 2007/0279015 A1 | 12/2007 | Livingston et al. | |
| 2008/0158780 A1 | 7/2008 | Stockman | |
| 2008/0217053 A1 | 9/2008 | Vojtila et al. | |
| 2009/0052109 A1 | 2/2009 | Stockman et al. | |
| 2009/0059463 A1 | 3/2009 | Ward | |
| 2009/0219665 A1 | 9/2009 | Stockman | |
| 2011/0063775 A1 | 3/2011 | Stockman | |
| 2011/0134584 A1 | 6/2011 | Stockman | |
| 2011/0157764 A1 | 6/2011 | Stockman | |
| 2011/0228446 A1 | 9/2011 | Stockman | |
| 2011/0317333 A1 | 12/2011 | Chun | |
| 2012/0026046 A1 | 2/2012 | Bit-Babik | |
| 2013/0003252 A1 | 1/2013 | Stockman | |
| 2013/0214720 A1 | 8/2013 | Stockman | |
| 2013/0329342 A1 | 12/2013 | Stockman | |
| 2013/0343029 A1 | 12/2013 | Stockman | |
| 2014/0049205 A1 | 2/2014 | Curiel | |
| 2014/0126107 A1 | 5/2014 | Yoda et al. | |
| 2014/0138009 A1 | 5/2014 | Lim | |
| 2014/0201018 A1 | 7/2014 | Chassin | |
| 2014/0285949 A1 | 9/2014 | Stockman | |
| 2014/0347784 A1 | 11/2014 | Stockman et al. | |
| 2015/0016012 A1 | 1/2015 | Stockman | |
| 2015/0022991 A1 | 1/2015 | Stockman et al. | |
| 2015/0138690 A1 | 5/2015 | Stockman | |
| 2015/0255218 A1 | 9/2015 | Stockman et al. | |
| 2016/0203916 A1 | 7/2016 | Stockman | |
| 2016/0233030 A1 | 8/2016 | Stockman | |
| 2017/0011855 A1 | 1/2017 | Stockman et al. | |
| 2017/0032898 A1 | 2/2017 | Stockman | |
| 2017/0110252 A1 | 4/2017 | Stockman | |
| 2017/0186554 A1 | 6/2017 | Stockman | |
| 2017/0229242 A1 | 8/2017 | Goodson et al. | |
| 2017/0236646 A1 | 8/2017 | Stockman | |
| 2017/0372838 A1 | 12/2017 | Casanova et al. | |
| 2018/0090278 A1 | 3/2018 | Stockman et al. | |
| 2018/0254150 A1 * | 9/2018 | Stockman | H01G 4/236 |
| 2018/0261391 A1 | 9/2018 | Stockman | |
| 2019/0057815 A1 | 2/2019 | Stockman | |
| 2019/0057817 A1 | 2/2019 | Stockman | |

FOREIGN PATENT DOCUMENTS

| | | |
|---|---|---|
| CN | 304806073 | 9/2018 |
| EP | 1115128 | 7/2001 |
| EP | 2587503 | 5/2013 |
| FR | 2343221 | 9/1977 |
| GB | 517718 | 2/1940 |
| GB | 2070861 | 9/1981 |
| GB | 2169747 | 7/1986 |

OTHER PUBLICATIONS

Ruby Lane, SuzansTreasures.shop, Link: https://www.rubylane.com/item/34499-CCKx20-x20205/Mazon-Cobalt-Glass-Jar-Medicine-Bottle. Visited Jul. 22, 2019. 1940s Mazon Cobalt Glass Jar Medicine Bottle.

"American Radionics—Home of the Turbo200 MultiUse Capacitor," online archive of website captured at http://web.archive.org/web/20050309191805fw_/http://www.americanradionic.com/home, Mar. 9, 2005, (16 pages), (accessed May 29, 2014).

"AC Capacitors," brochure by AmRad Engineering, Inc., undated (4 pages).

"American Radionic Co., Inc. Introduces a New Circuit Component The Patented Ultramet™ Capacitor," poster by American Radionic Co., Inc., (poster undated, 1980 year date appears below one image), (one page).

"American Radionic Co., Inc. Introduces a New Circuit Component, The Patented Ultramet™ Capacitor," poster by American Radionic Co., Inc., which is reprint from Electronic News dated Feb. 11, 1980, (one page).

"American Radionic Co., Inc. Introduces . . . The World's First Multiple Metallized Film Dielectric Capacitor Produced from a Single Winding! The Patented Ultramet™ Capacitor," poster by American Radionic Co., Inc. (undated) (one page).

"American Radionic Company's Chronology of Patents, New Products and Technology Transfer Programs—From the Present, to the Past, a Thirty-Five Year Review," online website having URL: http:/www.americanradionic.com/content/blogcategory/13/29/8/16, accessed May 19, 2014 (undated) (3 pages).

"American Radionic Introduces Capacitors Without Compromise", color brochure, 1989, (1 page).

"AmRad Engineering: Universal Capacitor," The Air Conditioning|Heating|Refrigeration News, Jan. 29, 2005, Printout of website having URL: "http://www.archrnews.com/articles/print/amrad-engineering-universal-capacitor" (accessed Jun. 2, 2014) (1 page).

"Capacitors—Motor Run, Oil Filled Capacitors, AC Rated. AmRad." Online archive of website captured at http://webarchive.org/web/20041214091042/http://americanradionic.com, Dec. 14, 2004, (13 pages) (accessed May 29, 2014).

"Capacitors—Motor Run, Oil Filled Capacitors, AC Rated. AmRad." Online archive of website captured at http:/webarchive.org/web/20011126195819/http://www.americanradionic.com, Nov. 26, 2001, (13 pages) (accessed May 29, 2014).

"Capacitors—Motor Run, Oil Filled Capacitors, AC Rated. AmRad." Printout of website having URL: http://amradcapacitors.com/index.htm, Jan. 3, 2003(20 pages).

(56) References Cited

OTHER PUBLICATIONS

"Industrial Power Factor Correction Capacitors," Cornell Dubilier, Undated (1 page).
"Product of the Year Awards," Electronic Products Magazine, Jan. 1981, pp. 39-45.
"Super-Sized Show," ASHRae Journal Show Daily, 2005 International Air-Conditioning, Heating, Refrigerating Exposition, Tuesday, Feb. 8, 2005 (24 pages).
"The Patented Ultramet™ Capacitor," poster by American Radionic Co., Inc., (undated) (three pages).
"The Patented Ultramet™ Capacitor. A product of years of American Radionic research & development," poster by American Radionic Co., Inc. (undated) (one page).
Amazon. <https://www.amazon.com/TEMCo-Capacitor-RC0120-50-Electric-Motor/dp/B01H0S87X6/ref+pd_sim_328_5> Aug. 29, 2014. TEMCo Dual Run Capacitor RC0120-50/5 nnfd 370 V 440 V VAC volt 50+5 of AC Electric Motor HVAC, 6 pages.
Amazon. <URL: https://www.amazon.com/AmRad-Turbo-200-Mini-Oval/dp/BOOKQSKDOY/ref=pd_sbs_60_4?_encoding=UTF8&pd_rd_i=BOOKQSKDOY&pd_rd_r=A6')/0E2')/080')/0A6.> May 5, 2015. AmRad Turbo 200 Mini Oval Capacitor with label and color trim, 5 pages.
Amazon. <URL: https://www.amazon.com/Amrad-Turbo-Universal-Motor-Capacitor/dp/B00B610TOM/ref=pd_rhf_dp_s_cp_0_7?_encoding=UTF8&pd_rd_i=BOOB610TOM&pd_rd_r=N5WYCAD5Y36C86DFWDEG&pd_rd_w=6tW7l&pd_rd_wg=DWEJcApsc=1&refRID=N5WYCAD5Y36C86DFWDEG.> Jan. 27, 2013. Amrad Turbo 200X Universal Motor Run Capacitor.
Amazon. <URL: https://www.amazon.com/AmRad-USA2227-MFD-370-Volt/dp/BOOGSU3YV8/ref=pd_day0_328_6?_encoding=UTF8&pd_rd_i=BOOGSU3YV8&pd_rd_r%0E2')/080')/0A6.> Jun. 29, 2014. AmRad Dual Run Capacitor, 6 pages.
Amazon. <URL: https://www.amazon.com/CPT00656-Trane-Round-Capacitor-Upgrade/dp/BOOEVTIOMC/ref=cm_cr_arp_d_product_top?ie=UTF8.> May 11, 2016. Replacement Trane Round Dual Run Capacitor, 6 pages.
Amazon. <URL: https://www.amazon.com/gp/product/B01HPK5ANO/ref=s9_dcacsd_dcoop_bw_c_x_6_w.> Aug. 21, 2016. Titan TRCFD405 Dual Rated Motor Run Capacitor, 6 pages.
Amazon. <URL: https://www.amazon.com/Labels-Protective-Backed-Clean-Remove-Adhesive/dp/BOOVIDW1C1/ref=sr_1_18?ie=UTF8&clid=1522957818&sr=8-18&keycY0E2')/080')/0A6.> Apr. 1, 2015. Labels, 7 pages.
Amazon. <URL: https://www.amazon.com/MARS-Motors-Armatures-12788-Capacitor/dp/BOOCOYS2CM/ref=pd_sim_328_6?_encoding=UTF8&pd_rd_i=BOOCOYS2CM&pd_rd_r=KEFT1DXGOAWQ1KCZDJFJ&pd_rd_w=LNF6S&pd_rd_wg=5eFTh&psc=1&refRID=KEFT1DXGOAWQ1KCZDJFJ.> Jan. 25, 2012. MARS Dual Run Capacitor, 7 pages.
Amazon. <URL: https://www.amazon.com/Packard-TRCFD405-5MFD-370VACCapacitor/dp/B009558E9U/ref=pd_sim_328_4?_encoding=UTF8&pd_rd_i=B009558E9U&pd_rd_r=SX1DRWZQZ8SH12JWHYH2&pd_rd_w=y1jQe&pd_rd_wg=mH0n1&psc=1&refRID=SX1DRWZQZ8SH12JWHYH2&dp1D=31IxzeyCr/0252B7L&preST=_QL70_&dpSrc=detail.> May 1, 2015. Packard Capacitor, 5 pages.
Amazon. <URL: https://www.amazon.com/Universal-Capacitor-Trane-Replacement-USA2031/dp/BOOGSU4OKW/ref=pd_sim_328_3?_encoding=UTF8&pd_rd_i=BOOGSU4OKW&pd_rd_r=YX6P84XR7NY113X4DWJG&pd_rd_w=gejaD&pd_rd_wg=NLVIY&psc=1&refRID=YX6P84XR7NY113X4DWJG.> Nov. 26, 2014. Am Rad Oval Universal Capacitor with label and color trim, 6 pages.
Amazon. <URL:https://www.amazon.com/dp/B00FL70C0U/ref=cm_sw_r_cp_ep_dp_qIIZBbFD278ZE> Dec. 4, 2013. AmRad Engineering USA2215 Round Motor Run Capacitor, 40 MFD, 370_440 Vac—Pipe Fittings, 6 pages.
Amazon. <URL:https://www.amazon.com/dp/B01F7P8GJO/ref=sspa_dk_detail_4?psc=1.> Aug. 1, 2016. TradePro PowerWell Dual Run Round Capacitor, 6 pages.
Amazon. Link: https://www.amazon.conn/Round-Universal-Capacitor-Replacement-USA2235/dpBOOGSU4401/ref=cnn_cr_arp_d_product_top?ie=UTF8. Jun. 20, 2014. Round Dual Universal Capacitor. (Year: 2014), 6 pages.
Answer and affirmative defenses to Complaint by Cornell-Dubliner Electronics, Inc. (Allaman, Melissa) (Entered: Jan. 9, 2015).
Answer and affirmative defenses to Complaint by Packard Inc. (Allaman, Melissa) (Entered: Jan. 9, 2015).
Case Management and Scheduling Order: Amended Pleadings and Joinder of Parties due by Apr. 9, 2015. Discovery due by Feb. 16, 2016. Dispositive motions due by Apr. 7, 2016. Pretrial statement due by Aug. 11, 2016. All other motions due by Jul. 28, 2016. Plaintiff disclosure of expert report due by Dec. 10, 2015. Defendant disclosure of expert report due by Jan. 14, 2016. Final Pretrial Conference set for Aug. 18, 2016 at 01:15 PM in Orlando Courtroom 4 A before Judge Roy B. Dalton, Jr., Jury Trial Set for the trial team commencing Sep. 6, 2016 at 09:00 AM in Orlando Courtroom 4 A before Judge Roy B. Dalton Jr., Conduct mediation hearing by Mar. 29, 2016. Lead counsel to coordinate dates. Signed by Judge Roy B. Dalton, Jr. on Feb. 10, 2015. (VMF). (Entered: Feb. 10, 2015).
Complaint for Patent Infringement against Cornell-Dubliner Electronics, Inc., Packard Inc. with Jury Demand (Filing fee $400 receipt No. ORL-38930) filed by American Radionic Company, Inc. (Attachments: #1 Civil Cover sheet, #2 Exhibit A)(LMM) Modified on Nov. 19, 2014 (LMM). (Entered: Nov. 19, 2014).
Declaration of Noah C. Graubart in Support of Plaintiff's Claim Construction Brief by American Radionic Company, Inc. (Attachments: #1 Exhibit 1, #2 Exhibit 2, #3 Exhibit 3, #4 Exhibit 4, #5 Exhibit 5, #6 Exhibit 6) (Graubart, Noah) (Entered: Jun. 18, 2015).
Defendants' First Supplemental Disclosure of Non-Infringement and Invalidity Contentions *American Radionic, Inc.*, v. *Packard, Inc., and Cornell-Dubilier Electronics, Inc.*, No. 6:14-cv-01881-RBD-KRS.
Document from Defendants' First Supplemental Disclosure of Non-Infringement and Invalidity Contentions that purported to be Standard for Safety UL 810 Capacitors, Underwriters Laboratories Inc. having multiple dates ranging from 1976 to 1988 (22 pages).
Edisontechcenter. Link: http://edisontechcenter.org/batteries.html#drycell. 2014. Bright Star 1.5 V Columbia dry cell. (Year: 2014), 10 pages.
Eveready. Link: http://www.eveready.conn/about-us/battery-history. Visited Nov. 30, 2018. 1950s Eveready Battery. (Year: 2018), 2 pages.
First Amended Answer and affirmative defenses to 1 Complaint by Cornell-Dubliner Electronics, Inc. (Allaman, Melissa) (Entered: Feb. 4, 2015).
First Amended Answer and affirmative defenses to 1 Complaint by Packard Inc. (Allaman, Melissa) (Entered: Jan. 9, 2015).
Grainger, "Round Motor Dual Run Capacitor, 40/5 Microfarad Rating, 370 VAC Voltage," Retrieved from the Internet: URL<https://www.grainger.com/product/5CMW3&AL!2966!3!166587674359!!!g!82128730437!?cm_mmc=PPC:+Google+PLA?campaignid=719691765&s_kwcid=AL!2966!3!166587674359!!!!82128730437!&ef_id=WRSnxQAAAILWhRlb:20170824174108:s>. Visited Aug. 24, 2017, Capacitor.
Hudis, Martin et al., "Motor-Run Capacitors," Motors & Motor Control, undated (reprinted from Appliance Manufacturer, Oct. 1994) (3 pages).
Hudis, Martin, "Plastic Case Self-Protected Liquid Filled AC Capacitors for 70° Applications," Presented at CAPTECH '97, Mar. 1997, 7 pages.
Hudis, Martin, "Technology Evolution in Metallized Polymeric Film Capacitors over the Past 10 Years," Presented at CARTS Symposium in Nice, France, Oct. 1996, 9 pages.
International Search Report and Written Opinion, PCT/US2014/39003, dated Oct. 2, 2014, 12 pages.
Joint Pre-Hearing Statement re: Claim Construction by American Radionic Company, Inc., Packard Inc., Cornell-Dubliner Electronics, Inc. (Attachments: #1 Exhibit 1, #2 Exhibit 2) (Graubart, Noah) Modified on Jul. 24, 2015.

(56) References Cited

OTHER PUBLICATIONS

Macomber, Laird L., et al., "New Solid Polymer Aluminum Capacitors Improve Reliability," Electro Power Electronics, Oct. 1, 2001, 5 pages.
Macomber, Laird L., et al., "Solid Polymer Aluminum Capacitor Chips in DC-DC Converter Modules Reduce Cost and Size and Improve High-Frequency Performance," PCIM Power Electronics 2001 Proceeding for the PowerSystems World Conference, Sep. 2001, 8 pages.
Mallory Distributor Products Co., 1967 Precision Electronic Components Catalog, 52 pages.
Minute Entry, Proceedings of Claim Construction Hearing held before Judge Roy B. Dalton, Jr. on Aug. 24, 2015. Court Report: Arnie First (VMF) (FMV). (Entered: Aug. 24, 2015).
Notice of Filing of Claim Construction Evidence by American Radionic Company, Inc. (Attachments: #1 Exhibit 1, #2 Exhibit 2, #3 Exhibit 3) (Graubart, Noah) Modified on Aug. 25, 2015 (EJS). (Entered: Aug. 25, 2015).
Order granting 69 Motion for Consent Judgment and Injunction, Signed by Judge Roy B. Dalton, Jr. on Nov. 5, 2015. (CAC) (Entered Nov. 5, 2015).
Parente, Audrey, "Can-sized device the right fit," The Daytona Beach News-Journal, Jan. 3, 2005 (2 pages).
Photograph 1 from Defendants' First Supplemental Disclosure of Non-Infringement and Invalidity Contentions, undated (1 page).
Photograph 10, undated (1 page).
Photograph 11, undated (1 page).
Photograph 12, undated (1 page).
Photograph 13, undated (1 page).
Photograph 14, undated (1 page).
Photograph 15, undated (1 page).
Photograph 16, undated (1 page).
Photograph 17, undated (1 page).
Photograph 18, undated (1 page).
Photograph 19, undated (1 page).
Photograph 2 from Defendants' First Supplemental Disclosure of Non-Infringement and Invalidity Contentions, undated (1 p.).
Photograph 20, undated (1 page).
Photograph 3 from Defendants' First Supplemental Disclosure of Non-Infringement and Invalidity Contentions, undated (1 page).
Photograph 4 from Defendants' First Supplemental Disclosure of Non-Infringement and Invalidity Contentions, undated (1 page).
Photograph 5 from Defendants' First Supplemental Disclosure of Non-Infringement and Invalidity Contentions, undated (1 page).
Photograph 6 from Defendants' First Supplemental Disclosure of Non-Infringement and Invalidity Contentions, undated (1 page).
Photograph 7 from Defendants' First Supplemental Disclosure of Non-Infringement and Invalidity Contentions, undated (1 page).
Photograph 8, undated (1 page).
Photograph 9, undated (1 page).
Plaintiff's Brief re 59 Declaration Plaintiff's Claim Construction Brief filed by American Radionic Company, Inc. (Graubart, Noah) (Entered May 18, 2015).
Response to Plaintiff's Claim Construction Brief re 60 Brief—Plaintiff filed by Cornell-Dubliner Electronics, Inc., Packard Inc. (Killen, Craig) Modified on Jul. 17, 2015 (EJS). (Entered Jul. 16, 2015).
Status report Joint Claim Construction Statement by American Radionic Company, Inc., Packard Inc., and Cornell-Dubliner Electronics, Inc. (Attachments: #1 Exhibit 1, #2 Exhibit 2) (Graubart, Noah) Modified on May 29, 2015 (SWT). (Entered: May 28, 2015).
Transcript of Markman Hearing held on Aug. 24, 2015 before Judge Roy B. Dalton, Jr., Court Reporter Arnie R. First, DRD, CRR< ArnieFirst.CourtReporter@gmail.com. Transcript may be viewed at the court public terminal or purchased through the Court Reporter before the deadline for Release of Transcript Restriction. After that date it may be obtained through PACER or purchased through the court Reporter, Redaction Request due Oct. 22, 2015. Redacted Transcript Deadline set for Nov. 2, 2015. Release of Transcript Restriction set for Dec. 30, 2015. (ARF) (Entered: Oct. 1, 2015).
Wikimedia Commons. Link: https://connnnons.wikimedia.org/wiki/File:PP4-PP3-batteries.jpg. Oct. 22, 2016. Eveready PP4 battery. (Year: 2016), 17 pages.
YouTube. <URL: https://www.youtube.com/watch?v=19A9IvQ611A&t=3s.> Oct. 1, 2015. GE Dual Run Capacitor, 5 pages.
YouTube. <URL: https://www.youtube.com/watch?v=R5B189BWrz0.> Jul. 29, 2011. HVAC Service : Install New Turbo 200 Capacitor.
YouTube. <URL: https://www.youtube.com/watch?v=U7h7pg12t6M.> Jul. 15, 2011. How to Install the Turbo 200 Capacitor.
YouTube. <URL: https://www.youtube.com/watch?v=Xiw_xHXJHUg.> Sep. 4, 2011. AmRad Dual Run Capacitor, 4 pages.

* cited by examiner

Single Value Capacitors

| Item No. | Green 2.5 Mfd. | White 5.0 Mfd. | White 5.0 Mfd. | Red 10.0 Mfd. | Yellow 20.0 Mfd. | Blue 25.0 Mfd. | | Total Value Mfd. |
|---|---|---|---|---|---|---|---|---|
| 1 | 2.5 | | | | | | Equals | 2.5 |
| 2 | | 5.0 | | | | | Equals | 5.0 |
| 3 | 2.5 | 5.0 | | | | | Equals | 7.5 |
| 4 | | | | 10.0 | | | Equals | 10.0 |
| 5 | 2.5 | | | 10.0 | | | Equals | 12.5 |
| 6 | | 5.0 | | 10.0 | | | Equals | 15.0 |
| 7 | 2.5 | 5.0 | | 10.0 | | | Equals | 17.5 |
| 8 | | | | | 20.0 | | Equals | 20.0 |
| 9 | 2.5 | | | | 20.0 | | Equals | 22.5 |
| 10 | | 5.0 | | | 20.0 | | Equals | 25.0 |
| 11 | 2.5 | 5.0 | | | 20.0 | | Equals | 27.5 |
| 12 | | | | 10.0 | 20.0 | | Equals | 30.0 |
| 13 | 2.5 | | | 10.0 | 20.0 | | Equals | 32.5 |
| 14 | | 5.0 | | 10.0 | 20.0 | | Equals | 35.0 |
| 15 | 2.5 | 5.0 | | 10.0 | 20.0 | | Equals | 37.5 |
| 16 | | 5.0 | | 10.0 | | 25.0 | Equals | 40.0 |
| 17 | 2.5 | 5.0 | | 10.0 | | 25.0 | Equals | 42.5 |
| 18 | | | | | 20.0 | 25.0 | Equals | 45.0 |
| 19 | 2.5 | | | | 20.0 | 25.0 | Equals | 47.5 |
| 20 | | 5.0 | | | 20.0 | 25.0 | Equals | 50.0 |
| 21 | 2.5 | 5.0 | | | 20.0 | 25.0 | Equals | 52.5 |
| 22 | | | | 10.0 | 20.0 | 25.0 | Equals | 55.0 |
| 23 | 2.5 | | | 10.0 | 20.0 | 25.0 | Equals | 57.5 |
| 24 | | 5.0 | | 10.0 | 20.0 | 25.0 | Equals | 60.0 |
| 25 | 2.5 | 5.0 | | 10.0 | 20.0 | 25.0 | Equals | 62.5 |
| 26 | | 5.0 | 5.0 | 10.0 | 20.0 | 25.0 | Equals | 65.0 |
| → 27 | 2.5 | 5.0 | 5.0 | 10.0 | 20.0 | 25.0 | Equals | 67.5 |

These are all Parallel Connections.

← This is the Capacitor Value being Replaced.

Mfd= microfarad

Using this Chart, Add Across to Calculate the Microfarad Values Needed to Obtain the Required Final Total Which will be Equal to the Part being Replaced.

Attach the Enclosed Jumper Wires to the Various Terminals to Obtain the Desired Microfarad Value. Then, Connect One Lead from the Compressor to the Common (Black Cup - Center Terminal) and the Other Lead to the Terminal of Highest Microfarad Value that has been Selected.

FIG. 19

Dual Value Capacitors

This is the Capacitor Value being Replaced. → This is the Capacitor Value being Replaced.

Mfd=microfarad

Using this Chart, Add Across to Calculate the Microfarad Values Needed to Obtain the Required Final Total Which will be Equal to the Part being Replaced.

Use the Enclosed Jumper Wires to Actually Obtain the Desired Microfarad Value.

| Item No. | Fan Total Green | Herm (Compressor) | | | | | Compressor Total |
|---|---|---|---|---|---|---|---|
| | | White | White | Red | Yellow | Blue | |
| | 2.5 Mfd. | 5.0 Mfd. | 5.0 Mfd. | 10.0 Mfd. | 20.0 Mfd. | 25.0 Mfd. | Mfd. |
| 1 | 2.5 | 5.0 | | | | | Equals | 5.0 |
| 2 | 2.5 | 5.0 | | 10.0 | | | Equals | 10.0 |
| 3 | 2.5 | 5.0 | 5.0 | 10.0 | | | Equals | 15.0 |
| 4 | 2.5 | 5.0 | | | 20.0 | | Equals | 20.0 |
| 5 | 2.5 | 5.0 | 5.0 | | 20.0 | | Equals | 25.0 |
| 6 | 2.5 | 5.0 | | | | 25.0 | Equals | 30.0 |
| 7 | 2.5 | 5.0 | | 10.0 | | 25.0 | Equals | 35.0 |
| 8 | 2.5 | 5.0 | 5.0 | 10.0 | | 25.0 | Equals | 40.0 |
| 9 | 2.5 | 5.0 | | | 20.0 | 25.0 | Equals | 45.0 |
| 10 | 2.5 | 5.0 | 5.0 | | 20.0 | 25.0 | Equals | 50.0 |
| 11 | 2.5 | 5.0 | | 10.0 | 20.0 | 25.0 | Equals | 55.0 |
| 12 | 2.5 | 5.0 | 5.0 | 10.0 | 20.0 | 25.0 | Equals | 60.0 |
| 13 | 2.5 | 5.0 | 5.0 | 10.0 | 20.0 | 25.0 | Equals | 65.0 |

This 2.5mfd Capacitor can also be used as a Direct Substitute for a 3.0Mfd "fan" Capacitor.

These are all Parallel Connections.

FIG. 20

Dual Value Capacitors

This is the Capacitor Value being Replaced.

| Item No. | Fan Total White | Herm (Compressor) | | | | | Compressor Total | |
|---|---|---|---|---|---|---|---|---|
| | | Green | White | Red | Yellow | Blue | | |
| | 5.0 Mfd. | 2.5 Mfd. | 5.0 Mfd. | 10.0 Mfd. | 20.0 Mfd. | 25.0 Mfd. | Mfd. | |
| 1 | 5.0 | 2.5 | | | | | Equals | 2.5 |
| 2 | 5.0 | | 5.0 | | | | Equals | 5.0 |
| 3 | 5.0 | 2.5 | 5.0 | | | | Equals | 7.5 |
| 4 | 5.0 | | | 10.0 | | | Equals | 10.0 |
| 5 | 5.0 | 2.5 | | 10.0 | | | Equals | 12.5 |
| 6 | 5.0 | | 5.0 | 10.0 | | | Equals | 15.0 |
| 7 | 5.0 | 2.5 | 5.0 | 10.0 | | | Equals | 17.5 |
| 8 | 5.0 | | | | 20.0 | | Equals | 20.0 |
| 9 | 5.0 | 2.5 | | | 20.0 | | Equals | 22.5 |
| 10 | 5.0 | | 5.0 | | 20.0 | | Equals | 25.0 |
| 11 | 5.0 | 2.5 | 5.0 | | 20.0 | | Equals | 27.5 |
| 12 | 5.0 | | | 10.0 | 20.0 | | Equals | 30.0 |
| 13 | 5.0 | 2.5 | | 10.0 | 20.0 | | Equals | 32.5 |
| 14 | 5.0 | | 5.0 | 10.0 | 20.0 | | Equals | 35.0 |
| 15 | 5.0 | 2.5 | 5.0 | 10.0 | 20.0 | | Equals | 37.5 |
| 16 | 5.0 | | 5.0 | 10.0 | | 25.0 | Equals | 40.0 |
| 17 | 5.0 | 2.5 | 5.0 | 10.0 | | 25.0 | Equals | 42.5 |
| 18 | 5.0 | | | | 20.0 | 25.0 | Equals | 45.0 |
| 19 | 5.0 | 2.5 | | | 20.0 | 25.0 | Equals | 47.5 |
| 20 | 5.0 | | 5.0 | | 20.0 | 25.0 | Equals | 50.0 |
| 21 | 5.0 | 2.5 | 5.0 | | 20.0 | 25.0 | Equals | 52.5 |
| 22 | 5.0 | | | 10.0 | 20.0 | 25.0 | Equals | 55.0 |
| 23 | 5.0 | 2.5 | | 10.0 | 20.0 | 25.0 | Equals | 57.5 |
| 24 | 5.0 | | 5.0 | 10.0 | 20.0 | 25.0 | Equals | 60.0 |
| 25 | 5.0 | 2.5 | 5.0 | 10.0 | 20.0 | 25.0 | Equals | 62.5 |

← This is the Capacitor Value being Replaced.

Mfd= microfarad

Using this Chart, Add Across to Calculate the Microfarad Values Needed to Obtain the Required Final Total Which will be Equal to the Part being Replaced.

Use the Enclosed Jumper Wires to Actually Obtain the Desired Microfarad Value.

The 5.0Mfd Capacitor (White Cup) that is Closest to the Green Cup can be used to Replace a 4.0Mfd Fan Motor Capacitor.

These are all Parallel Connections.

FIG. 21

Dual Value Capacitors

This is the Capacitor Value being Replaced. →

This is the Capacitor Value being Replaced. →

Mfd. = microfarad

Using this Chart, Add Across to Calculate the Microfarad Values Needed to Obtain the Required Final Total Which will be Equal to the Part being Replaced.

Use the Enclosed Jumper Wires to Actually Obtain the Desired Microfarad Value.

| Item No. | White Mfd. | Green Mfd. |   | Fan Total | Herm (Compressor) | | | |   | Compressor Total Mfd. |
|---|---|---|---|---|---|---|---|---|---|---|
|   |   |   |   |   | 5.0 Mfd. | 10.0 Mfd. | 20.0 Mfd. | 25.0 Mfd. |   |   |
| 1 | 5.0 | 2.5 | = | 7.5 | 5.0 | 10.0 |   |   | Equals | 10.0 |
| 2 | 5.0 | 2.5 | = | 7.5 | 5.0 | 10.0 |   |   | Equals | 15.0 |
| 3 | 5.0 | 2.5 | = | 7.5 |   |   | 20.0 |   | Equals | 20.0 |
| 4 | 5.0 | 2.5 | = | 7.5 |   |   |   | 25.0 | Equals | 25.0 |
| 5 | 5.0 | 2.5 | = | 7.5 | 5.0 |   |   | 25.0 | Equals | 30.0 |
| 6 | 5.0 | 2.5 | = | 7.5 |   | 10.0 |   | 25.0 | Equals | 35.0 |
| 7 | 5.0 | 2.5 | = | 7.5 | 5.0 | 10.0 |   | 25.0 | Equals | 40.0 |
| 8 | 5.0 | 2.5 | = | 7.5 | 5.0 |   | 20.0 | 25.0 | Equals | 45.0 |
| 9 | 5.0 | 2.5 | = | 7.5 |   | 10.0 | 20.0 | 25.0 | Equals | 50.0 |
| 10 | 5.0 | 2.5 | = | 7.5 | 5.0 | 10.0 | 20.0 | 25.0 | Equals | 55.0 |
| 11 | 5.0 | 2.5 | = | 7.5 | 5.0 | 10.0 | 20.0 | 25.0 | Equals | 60.0 |

These are all Parallel Connections.

FIG. 22

Dual Value Capacitors

← This is the Capacitor Value being Replaced.

→ This is the Capacitor Value being Replaced.

Mfd = microfarad

| Item No. | Fan Total Red | Herm (Compressor) | | | | | | Compressor Total |
|---|---|---|---|---|---|---|---|---|
| | | Green | White | White | Yellow | Blue | | |
| | 10.0 | 2.5 | 5.0 | 5.0 | 20.0 | 25.0 | | |
| | Mfd. | Mfd. | Mfd. | Mfd. | Mfd. | Mfd. | | Mfd. |
| 1 | 10.0 | | 5.0 | 5.0 | | | Equals | 10.0 |
| 2 | 10.0 | 2.5 | 5.0 | 5.0 | | | Equals | 12.5 |
| 3 | 10.0 | | | | 20.0 | | Equals | 20.0 |
| 4 | 10.0 | 2.5 | | | 20.0 | | Equals | 22.5 |
| 5 | 10.0 | | | | | 25.0 | Equals | 25.0 |
| 6 | 10.0 | 2.5 | | | | 25.0 | Equals | 27.5 |
| 7 | 10.0 | | 5.0 | | | 25.0 | Equals | 30.0 |
| 8 | 10.0 | 2.5 | 5.0 | | | 25.0 | Equals | 32.5 |
| 9 | 10.0 | | 5.0 | 5.0 | | 25.0 | Equals | 35.0 |
| 10 | 10.0 | 2.5 | 5.0 | 5.0 | | 25.0 | Equals | 37.5 |
| 11 | 10.0 | | | | 20.0 | 25.0 | Equals | 45.0 |
| 12 | 10.0 | 2.5 | | | 20.0 | 25.0 | Equals | 47.5 |
| 13 | 10.0 | | 5.0 | | 20.0 | 25.0 | Equals | 50.0 |
| 14 | 10.0 | 2.5 | 5.0 | | 20.0 | 25.0 | Equals | 52.5 |
| 15 | 10.0 | | 5.0 | 5.0 | 20.0 | 25.0 | Equals | 55.0 |
| 16 | 10.0 | 2.5 | 5.0 | 5.0 | 20.0 | 25.0 | Equals | 57.5 |

These are all Parallel Connections.

FIG. 23

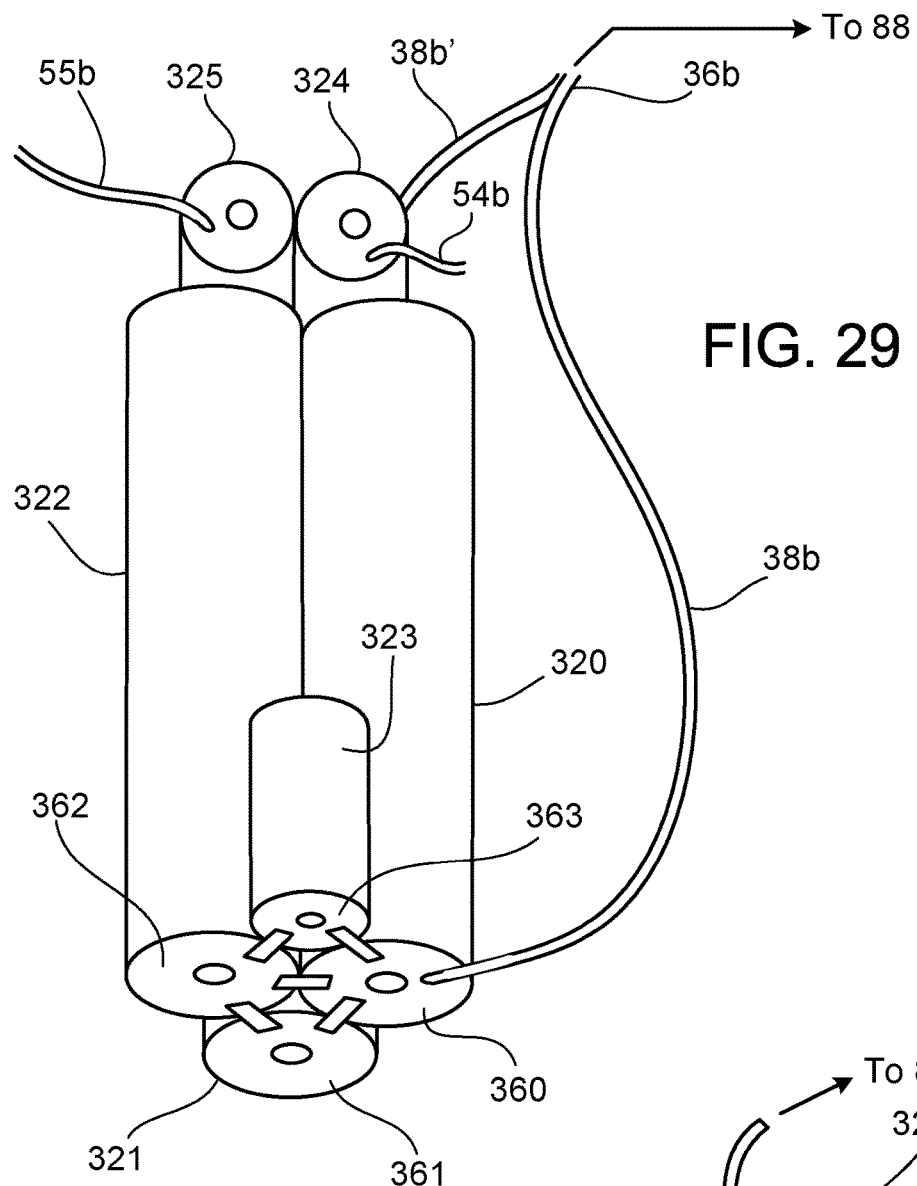
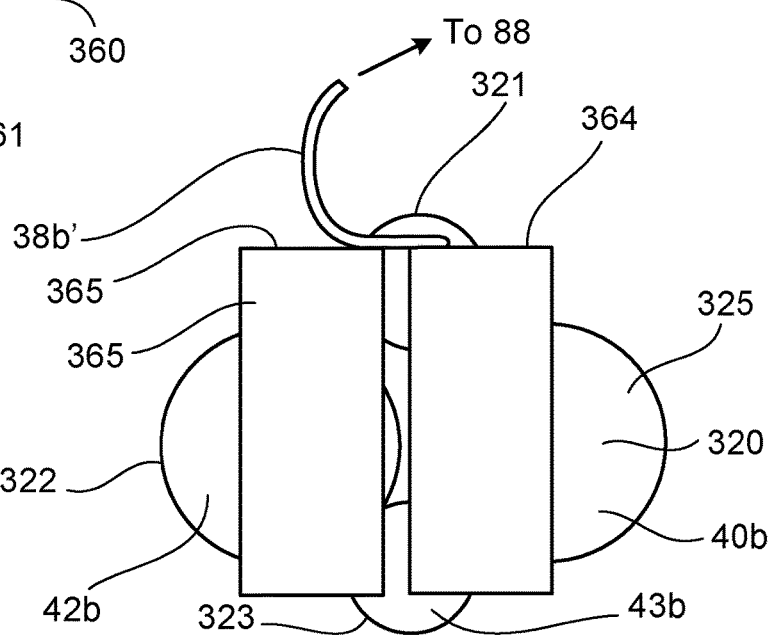

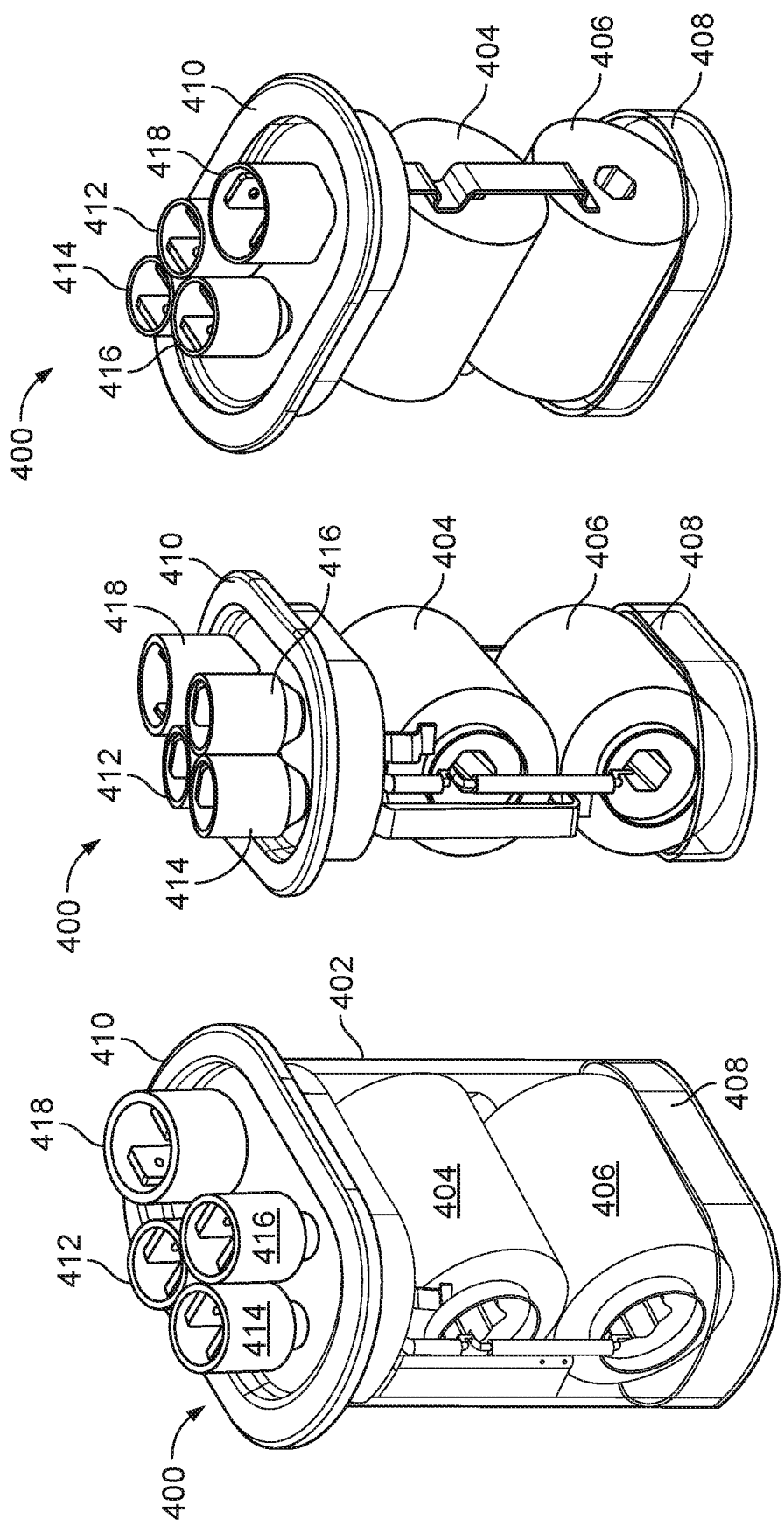

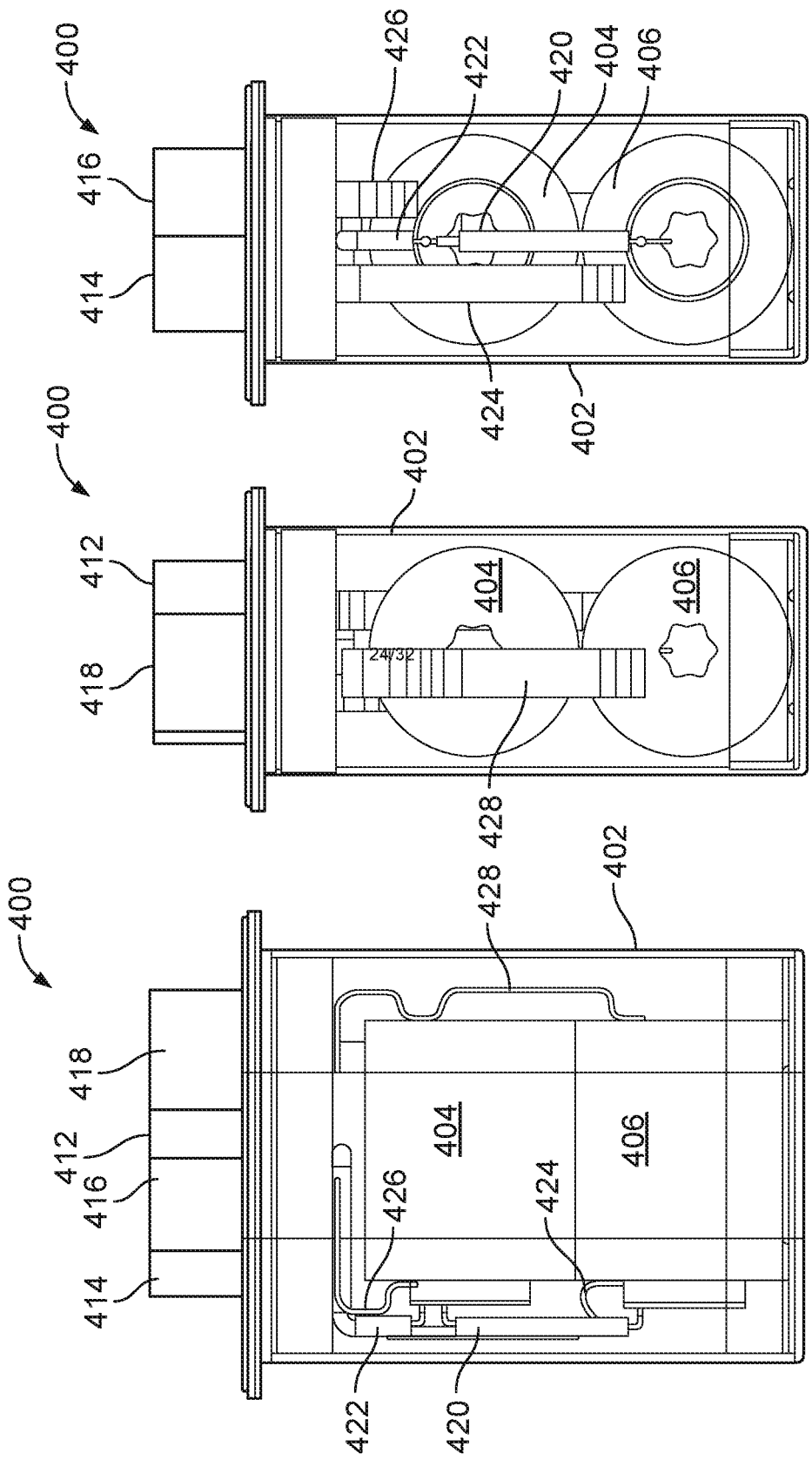

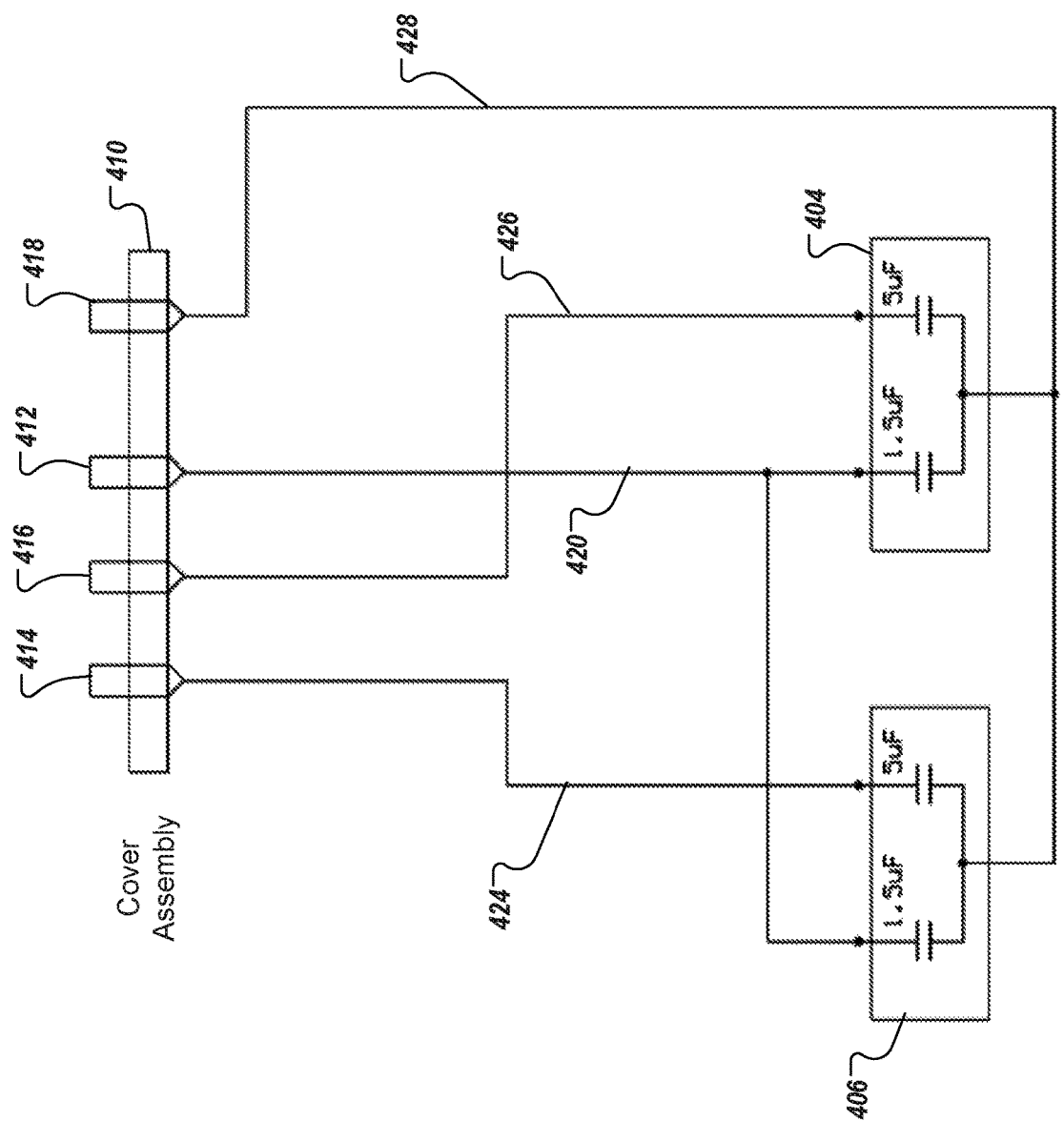

CAPACITOR WITH MULTIPLE ELEMENTS FOR MULTIPLE REPLACEMENT APPLICATIONS

CLAIM OF PRIORITY

This application claims the benefit of priority under 35 U.S.C. § 119(e) to U.S. Provisional Application Serial Nos. 62/785,989, filed on Dec. 28, 2018, 62/852,811, filed on May 24, 2019, and 62/858,608, filed on Jun. 7, 2019, the entirety of each of which are incorporated by reference herein.

FIELD OF THE DISCLOSURE

The disclosure herein relates to a capacitor with multiple capacitor values selectively connectable to match the capacitance or capacitances of one or more capacitors being replaced.

BACKGROUND

One common use for capacitors is in connection with the motors of air-conditioning systems. The systems often employ two capacitors, one used in association with a compressor motor and another smaller value capacitor for use in association with a fan motor. Air-conditioning systems of different BTU capacity, made by different manufacturers or being a different model all may use capacitors having different values. These capacitors have a finite life and sometimes fail, causing the system to become inoperative.

A serviceman making a service call usually will not know in advance whether a replacement capacitor is necessary to repair an air-conditioning system, or what value capacitor or capacitors might be needed to make the repair. One option is for the serviceman to carry a large number of capacitors of different values in the service truck, but it is difficult and expensive to maintain such an inventory, especially because there can be a random need for several capacitors of the same value on the same day. The other option is for the serviceman to return to the shop or visit a supplier to pick up a replacement capacitor of the required value. This is inefficient as the travel time to pick up parts greatly extends the overall time necessary to complete a repair. This is extremely detrimental if there is a backlog of inoperative air-conditioning systems on a hot day. This problem presents itself in connection with air-conditioning systems, but is also found in any situation where capacitors are used in association with motors and are replaced on service calls. Other typical examples are refrigeration and heating systems, pumps, and manufacturing systems utilizing compressors.

A desirable replacement capacitor would have the electrical and physical characteristics of the failed capacitor, i.e. it should provide the same capacitance value or values at the same or higher voltage rating, be connectable using the same leads and be mountable on the same brackets or other mounting provision. It should also have the same safety protection, as confirmed by independent tests performed by Underwriter Laboratories or others. Efforts have been made to provide such a capacitor in the past, but they have not resulted in a commercially acceptable capacitor adapted for replacing capacitors having a wide range of capacitance values. U.S. Pat. Nos. 3,921,041 and 4,028,595 disclose dual capacitor elements in the form of two concentric wound capacitor sections. My U.S. Pat. No. 4,263,638 also shows dual capacitors sections formed in a wound capacitive element, and my U.S. Pat. No. 4,352,145 shows a wound capacitor with dual elements, but suggests that multiple concentric capacitive elements may be provided, as does my U.S. Pat. Nos. 4,312,027 and 5,313,360. None of these patents show a capacitor having electrical and physical characteristics necessary to replace any one of the variety of failed capacitors that might be encountered on a service call.

An effort to provide a capacitor with multiple, selectable capacitance values is described in my U.S. Pat. No. 4,558, 394. Three capacitance sections are provided in a wound capacitor element that is encapsulated in a plastic insulating material. An external terminal lug is connected with one of capacitor's sections and a second external terminal lug is provided with a common connection to all three capacitor sections. Pre-wired fixed jumper leads each connect the three capacitive sections in parallel, and the pre-wired fixed jumper leads have a portion exposed above the plastic encapsulation. This permits one or two jumper leads to be severed to remove one or two of the capacitor sections from the parallel configuration, and thereby to adjust the effective capacitance value across the terminal lugs. The '394 patent suggests that further combinations could be made with different connections, but does not provide any suitable means for doing so.

Another attempt to provide a capacitor wherein the capacitance may be selected on a service call is described in my U.S. Pat. No. 5,138,519. This capacitor has two capacitor sections connected in parallel, and has two external terminals for connecting the capacitor into a circuit. One of the terminals is rotatable, and one of the capacitor sections is connected to the rotatable terminal by a wire which may be broken by rotation of the terminal. This provides for selectively removing that capacitor section and thereby reducing the capacitance of the unit to the value of the remaining capacitor. This capacitor provides a choice of only two capacitance values in a fluid-filled case with a cover incorporating a pressure interrupter system.

In another effort to provide a universal adjustable capacitor for AC applications, American Radionic Co., Inc. produced a capacitor having five concentric capacitor sections in a cylindrical wound capacitor element. A common lead was provided from one end of the capacitor sections, and individual wire leads were provided from the other ends of the respective capacitor sections. The wound capacitor element was encapsulated in a plastic insulating material with the wire leads extending outwardly from the encapsulating material. Blade connectors were mounted at the ends of the wire leads, and sliding rubber boots were provided to expose the terminals for making connections and for shielding the terminals after connections were made. Various capacitance values could be selected by connecting various ones of the capacitor sections in parallel relationship, in series relationship, or in combinations of parallel and series relationships. In a later version, blade terminals were mounted on the encapsulating material. These capacitors did not meet the needs of servicemen. The connections were difficult to accomplish and the encapsulated structure did not provide pressure interrupter protection in case of capacitor failure, wherein the capacitors did not meet industry safety standards and did not achieve commercial acceptance or success.

Thus, although the desirability of providing a serviceman with a capacitor that is adapted to replace failed capacitors of a variety of values has been recognized for a considerable period of time, a capacitor that meets the serviceman's needs in this regard has not heretofore been achieved. This is a continuing need and a solution would be a considerable advance in the art.

SUMMARY OF THE INVENTION

An object of the disclosure is to provide a capacitor that is connectable with selectable capacitance values.

An object of the disclosure is to provide a capacitor incorporating multiple capacitance values that may be connected in the field to replace the capacitance value or values of a failed capacitor.

An object of the disclosure is to provide a capacitor having the objectives set forth above and which operates to disconnect itself from an electrical circuit upon a pressure-event failure.

An object of the disclosure is to incorporate multiple capacitance values in a single replacement capacitor that is adapted for connecting selected ones of the multiple capacitance values into a circuit.

An object of the disclosure to provide a capacitor having one or more of the foregoing objectives and which provides for safely making and maintaining connections thereto.

An object of the disclosure to increase the flexibility of replacing failed capacitors with capacitors incorporating multiple capacitance values by utilizing a range of tolerances in selecting the multiple capacitance values provided.

An object of the disclosure to provide a capacitor for replacing any one of a plurality of failed capacitors having different capacitance values and to meet or exceed the ratings and safety features of the failed capacitor.

In carrying out the disclosure herein, a replacement capacitor is provided having a plurality of selectable capacitance values. A capacitive element has a plurality of capacitor sections, each having a capacitance value. Each capacitor section has a section terminal and the capacitor sections are connected at a capacitive element common terminal. The capacitive element is received in a case together with an insulating fluid at least partially and preferably substantially surrounding the capacitive element. The case is provided with a pressure interrupter cover assembly, including a cover having a common cover terminal and a plurality of section cover terminals thereon. The section terminals of the capacitive element are respectively connected to the section cover terminals and the common terminal of the capacitive element is connected to the common cover terminal, with the pressure interrupter cover assembly adapted to break one or more connections as required to disconnect the capacitive element from an electrical circuit in the event that the capacitive element has a catastrophic pressure-event failure. The replacement capacitor is connected into an electrical circuit to replace a failed capacitor by connections to selected ones of the common cover terminal and section cover terminals, the capacitor sections and connections being selected to provide one or more capacitance values corresponding to the capacitor being replaced. Such connections may include connecting capacitor sections in parallel, connecting capacitor sections in series, connecting capacitor sections in combinations of parallel and series, and connecting one or more capacitor sections separately to provide two or more independent capacitance values.

In one aspect of the disclosure, the capacitive element is a wound cylindrical capacitive element having a plurality of concentric wound capacitor sections, each having a capacitance value. The number of capacitor sections is preferably six, but may be four or five, or may be greater than six. The capacitor section with the largest capacitance value is one of the outer three sections of the capacitive element. The capacitor sections are separated by insulation barriers and a metallic spray is applied to the ends of the capacitor sections. The insulation barriers withstand heat associated with connecting wire conductors to the capacitor sections.

In another aspect of the disclosure, the capacitive element is two or more wound cylindrical capacitive elements. There may be one wound cylindrical capacitive element for each capacitor section and capacitance value, and there may be four, five or six such wound cylindrical capacitive elements. Further, at least one of the two or more wound cylindrical capacitive elements may provide two or more capacitor sections. In a specific aspect, there are two wound cylindrical capacitive elements each providing three capacitor sections. The capacitor sections, however provided, are connected at a common terminal.

The case may employ one or more geometries, for example, the cross section of the case maybe cylindrical, having a cylindrical side wall, a bottom wall and an open top, to accommodate the one wound cylindrical capacitive element or to accommodate the plurality of wound capacitive elements providing the capacitor sections. The cross section of the case may also be elliptically shaped, for example, a case may be produced with an oval shaped cross-section.

Also, according to aspects of the disclosure, the pressure interrupter cover assembly includes a deformable circular cover having a peripheral edge sealingly secured to the upper end of the case. The common cover terminal and section cover terminals are mounted to the cover at spaced apart locations thereon, and have terminal posts extending downwardly from the cover to a distal end. A rigid disconnect plate is supported under the cover and defines openings therethrough accommodating the terminal posts and exposing the distal ends thereof. Conductors connect the capacitor section terminals and the common element terminal to the distal ends of the respective terminal posts of the section cover terminals and common cover terminal. The conductor connections at the distal ends of the terminal posts are broken upon outward deformation of the cover. In more specific aspects, the conductors connecting the capacitor sections to the distal ends of the section cover terminal posts are insulated wires, with the ends soldered to foil tabs that are welded or soldered to the distal ends of the terminal posts adjacent the disconnect plate.

Also, in some arrangements, the common cover terminal is positioned generally centrally on the cover, and the section cover terminals are positioned at spaced apart locations surrounding the common cover terminal. However, other layouts may be implemented for positioning the cover terminals and the common cover terminal. The section cover terminals include at least one blade connector, and preferably two or more blade connectors extending outwardly from the cover for receiving mating connectors for connecting selected ones of the capacitor sections into an electrical circuit. The common cover terminal preferably has four blade connectors.

Additional aspects of the disclosure include providing insulators for the section and common cover terminals, the insulators including cylindrical cups upstanding from the cover, with the cylindrical cup of at least the common cover terminal extending to or above the blades thereof. According to a preferred aspect of the invention, the insulators include a cover insulation barrier having a barrier cup upstanding from the cover and substantially surrounding a central common cover terminal and further having barrier fins radially extending from the barrier cup and deployed between adjacent section cover terminals.

The disclosure is carried out by connecting one or more capacitor sections into an electrical circuit, by attaching leads to the cover terminals. This includes connecting capacitor sections in parallel, connecting capacitor sections in series, connecting individual capacitor sections, or connecting capacitor sections in combinations of parallel and series, as required to match the capacitance value or values of the failed capacitor being replaced. The capacitor sections can be connected to replace multiple capacitor values, as required, to substitute the capacitor for the capacitor that has failed.

In another aspect of the disclosure, the capacitance values of the capacitor sections are varied within a tolerance range from a stated value, such that one capacitor section may be utilized effectively to replace one of two values, either individually or in combinations of capacitor sections.

In another aspect of the disclosure, an apparatus includes a case having an elliptical cross-section capable of receiving a plurality of capacitors, each having a capacitive value. Each capacitor having a first capacitor terminal and a second capacitor terminal. The apparatus also including a cover assembly with a peripheral edge sealingly secured to the case. The cover assembly includes a common cover terminal having a contact extending upwardly from the cover. The cover assembly also includes a plurality of capacitor cover terminals, each of the plurality of capacitor cover terminals having at least one contact extending upwardly from the cover. The cover assembly also includes a first conductor connecting the first capacitor terminal of one capacitor of the plurality of capacitors to one of the plurality of capacitor cover terminals and a second conductor connecting the second capacitor terminal of the capacitor to the common cover terminal. The cover assembly also includes an arrangement of insulator cups to form an insulation barrier between each pair of adjacent cover terminals. The common cover terminal and each of the plurality of capacitor cover terminals is individually positioned within one of the insulator cups.

In another aspect of the disclosure, an apparatus includes a case having an elliptical cross-section capable of receiving a plurality of capacitive elements. One or more of the capacitive elements provide at least one capacitor having a first capacitor terminal and a second capacitor terminal. The apparatus also includes a cover assembly that includes a deformable cover mountable to the case, and, a common cover terminal having a contact extending from the cover. The cover assembly also includes at least three capacitor cover terminals, each of the at least three capacitor cover terminals having at least one contact extending from the deformable cover. The deformable cover is configured to displace at least one of the at least three capacitor cover terminals upon an operative failure of at least one of the plurality of the capacitive elements. The cover assembly also includes at least four insulation structures. One of the four insulation structures is associated with one of the at least three capacitor cover terminals. The apparatus also includes a first conductor capable of electrically connecting the first capacitor terminal of a capacitor provided by one of the plurality of capacitive elements to one of the at least three capacitor cover terminals and a second conductor capable of electrically connecting the second capacitor terminal of the capacitor provided by one of the plurality of capacitive elements to the common cover terminal.

Implementations may include one or more of the following features. The plurality of capacitive elements may be each separately wound. The combined capacitance value of one of the plurality of capacitance elements may be greater than about 4.0 microfarads. Each of the at least four insulation structures may be cup shaped. Each of the insulation structures may be colored. At least two of the insulation structures may be differently colored. At least one capacitor may have a capacitance value in a range of about 1.5 microfarad to about 5.0 microfarad.

In another aspect of the disclosure, an apparatus includes a case having an elliptical cross-section capable of receiving a plurality of capacitive elements. One or more of the capacitive elements provide at least one capacitor having a first capacitor terminal and a second capacitor terminal. The apparatus also includes a cover assembly that includes a deformable cover mountable to the case, and, a common cover terminal having a contact extending from the cover. The cover assembly also includes at least three capacitor cover terminals, each of the at least three capacitor cover terminals having at least one contact extending from the deformable cover. The deformable cover is configured to displace at least one of the at least three capacitor cover terminals upon an operative failure. The cover assembly also includes at least four colored insulation structures. One of the four colored insulation structures is associated with one of the at least three capacitor cover terminals. The apparatus includes a first conductor capable of electrically connecting the first capacitor terminal of a capacitor provided by one of the plurality of capacitive elements to one of the at least three capacitor cover terminals and a second conductor capable of electrically connecting the second capacitor terminal of the capacitor provided by one of the plurality of capacitive elements to the common cover terminal.

Implementations may include one or more of the following features. The plurality of capacitive elements may be each separately wound. The combined capacitance value of one of the plurality of capacitance elements may be greater than about 4.0 microfarads. Each of the at least four colored insulation structures may be cup shaped. At least two of the colored insulation structures may be differently colored. The at least one capacitor has a capacitance value in a range of about 1.5 microfarads to about 5.0 microfarads.

In another aspect of the disclosure, an apparatus includes a case having an elliptical cross-section capable of receiving a plurality of capacitive elements. One or more of the capacitive elements provide at least one capacitor having a first capacitor terminal and a second capacitor terminal. The at least one capacitor has a capacitance value in a range of about 1.5 microfarads to about 5.0 microfarads. The apparatus also includes a cover assembly that includes a deformable cover mountable to the case, and, a common cover terminal having a contact extending from the cover. The cover assembly includes at least three capacitor cover terminals. Each of the at least three capacitor cover terminals has at least one contact extending from the deformable cover. The deformable cover is configured to displace at least one of the at least three capacitor cover terminals upon an operative failure. The cover assembly includes at least four insulation structures. One of the four insulation structures is associated with one of the at least three capacitor cover terminals. The apparatus also includes a first conductor capable of electrically connecting the first capacitor terminal of a capacitor provided by one of the plurality of capacitive elements to one of the at least three capacitor cover terminals and a second conductor capable of electrically connecting the second capacitor terminal of the capacitor provided by one of the plurality of capacitive elements to the common cover terminal.

Implementations may include one or more of the following features. The plurality of capacitive elements may be each separately wound. The combined capacitance value of one of the plurality of capacitance elements may be greater than about 4.0 microfarads. Each of the at least four insulation structures may be cup shaped. Each of the at least four insulation structures may be colored. At least two of the at least four insulation structures may be differently colored.

Other and more specific objects and features of the invention herein will, in part, be understood by those skilled in the art and will, in part, appear in the following description of the preferred embodiments, and claims, taken together with the drawings.

BRIEF DESCRIPTION OF DRAWINGS

FIG. 12 is a schematic circuit diagram of the capacitor of FIG. 1 connected as shown in

FIG. 11;

FIG. 14 is a schematic circuit diagram of the capacitor of FIG. 1 connected as shown in

FIG. 13;

FIG. 19 is a chart showing the single value capacitance values that may be provided by the capacitor of FIG. 1;

FIG. 20 is a chart showing dual value capacitances that may be provided by the capacitor of FIG. 1;

FIG. 21 is another chart showing dual value capacitances that may be provided by the capacitor of FIG. 1;

FIG. 22 is another chart showing dual value capacitances that may be provided by the capacitor of FIG. 1;

FIG. 23 is another chart showing dual value capacitances that may be provided by the capacitor of FIG. 1;

FIG. 29 is a perspective view of the capacitive element of the capacitor of FIG. 28, including some of the conductors connected to the capacitor sections thereof;

FIG. 30 is a top view of the capacitive element of the capacitor of FIG. 28, including conductors connected to capacitor sections thereof.

FIG. 31(a)-(c) illustrates perspective views of a capacitor including an elliptically-shaped case;

FIG. 32(a)-(c) illustrates front and side views of a capacitor including an elliptically-shaped case;

FIG. 34 is a schematic circuit diagram of the capacitor of FIG. 31(a)-(c).

The same reference numerals refer to the same elements throughout the various Figures.

DETAILED DESCRIPTION

Figure 1:
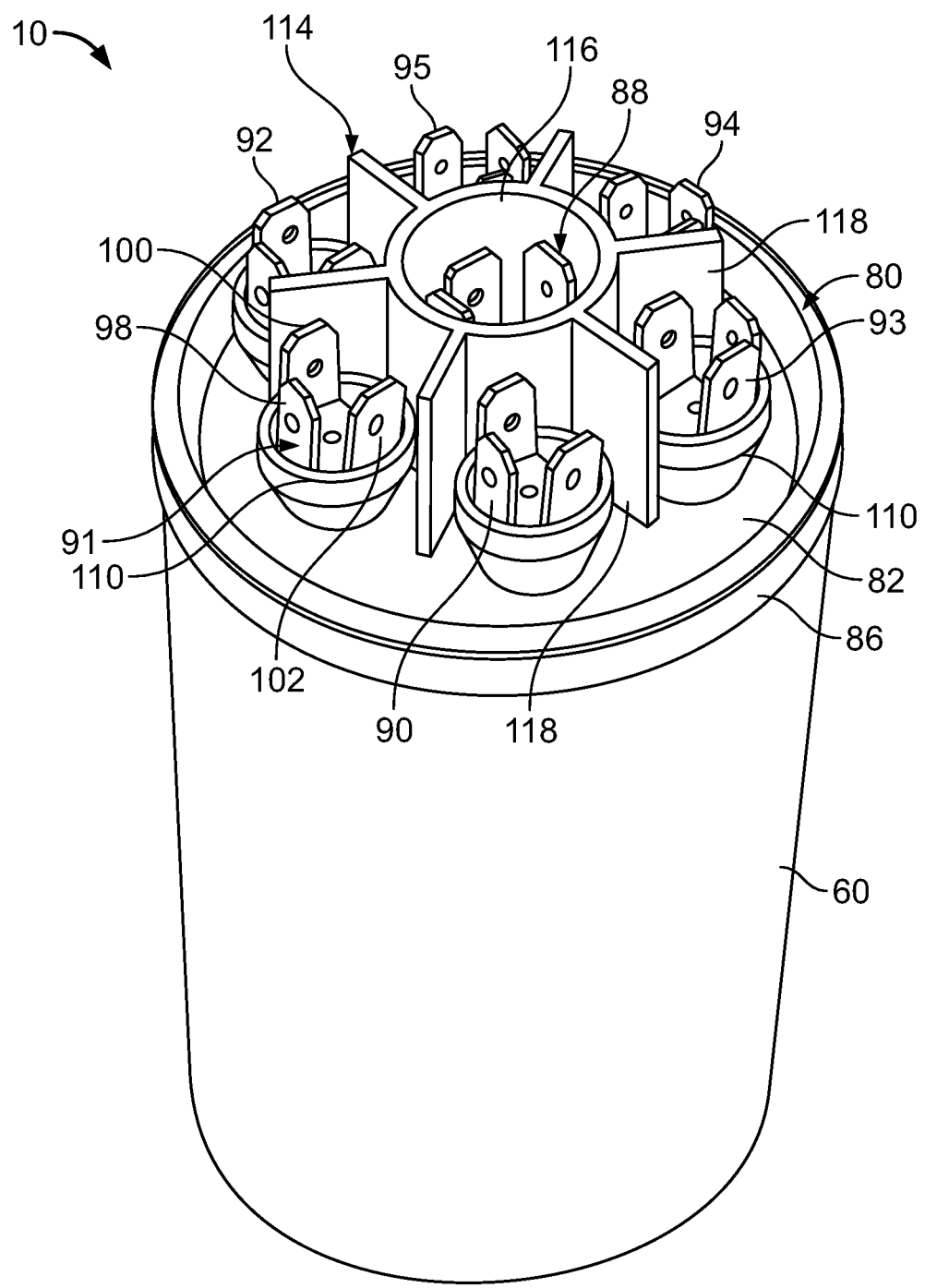
FIG. 1 is a perspective view of a capacitor according to the invention herein.
Figure 2:
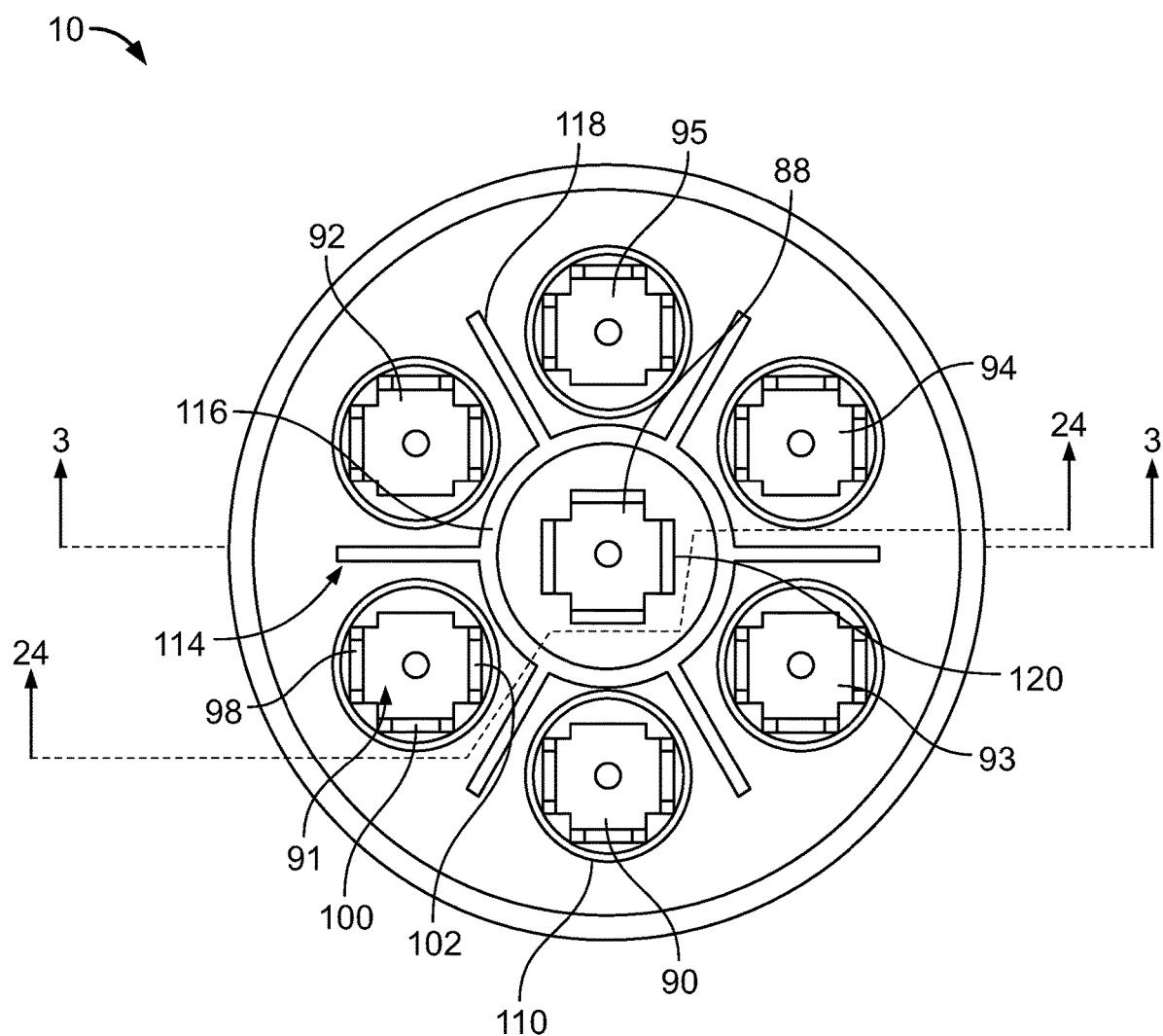
FIG. 2 is a top view of the capacitor of FIG. 1.
Figure 3:
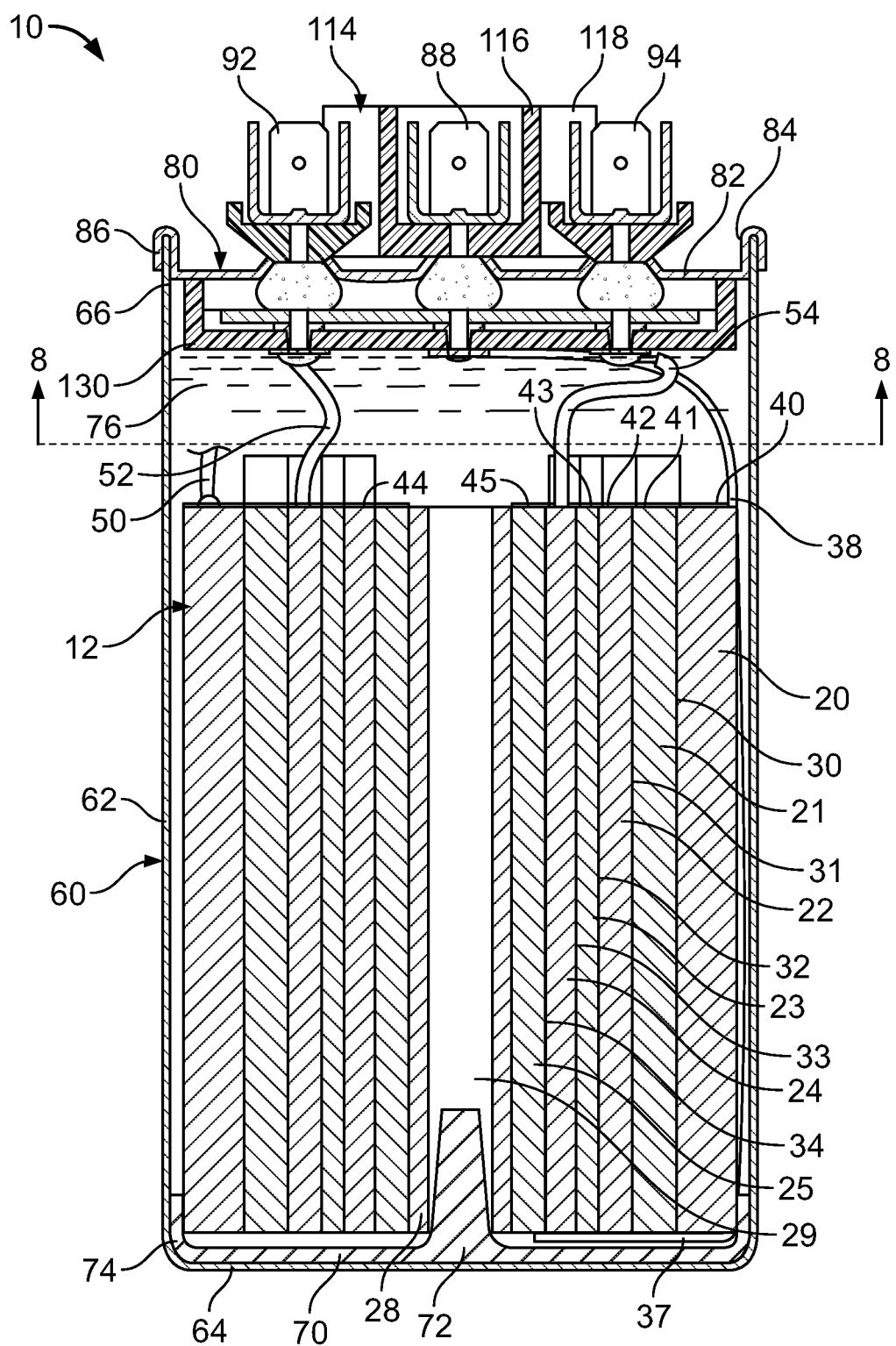
FIG. 3 is a sectional view of the capacitor of FIG. 1, taken along the lines 3-3 of FIG. 2.

A capacitor 10 is shown in FIGS. 1-3, as well as in other Figures to be described below. The capacitor 10 is adapted to replace any one of a large number of capacitors. Therefore, a serviceman may carry a capacitor 10 on a service call and, upon encountering a failed capacitor, the serviceman can utilize the capacitor 10 to replace the failed capacitor with the capacitor 10 being connected to provide the same capacitance value or values of the failed capacitor.

Figure 4:
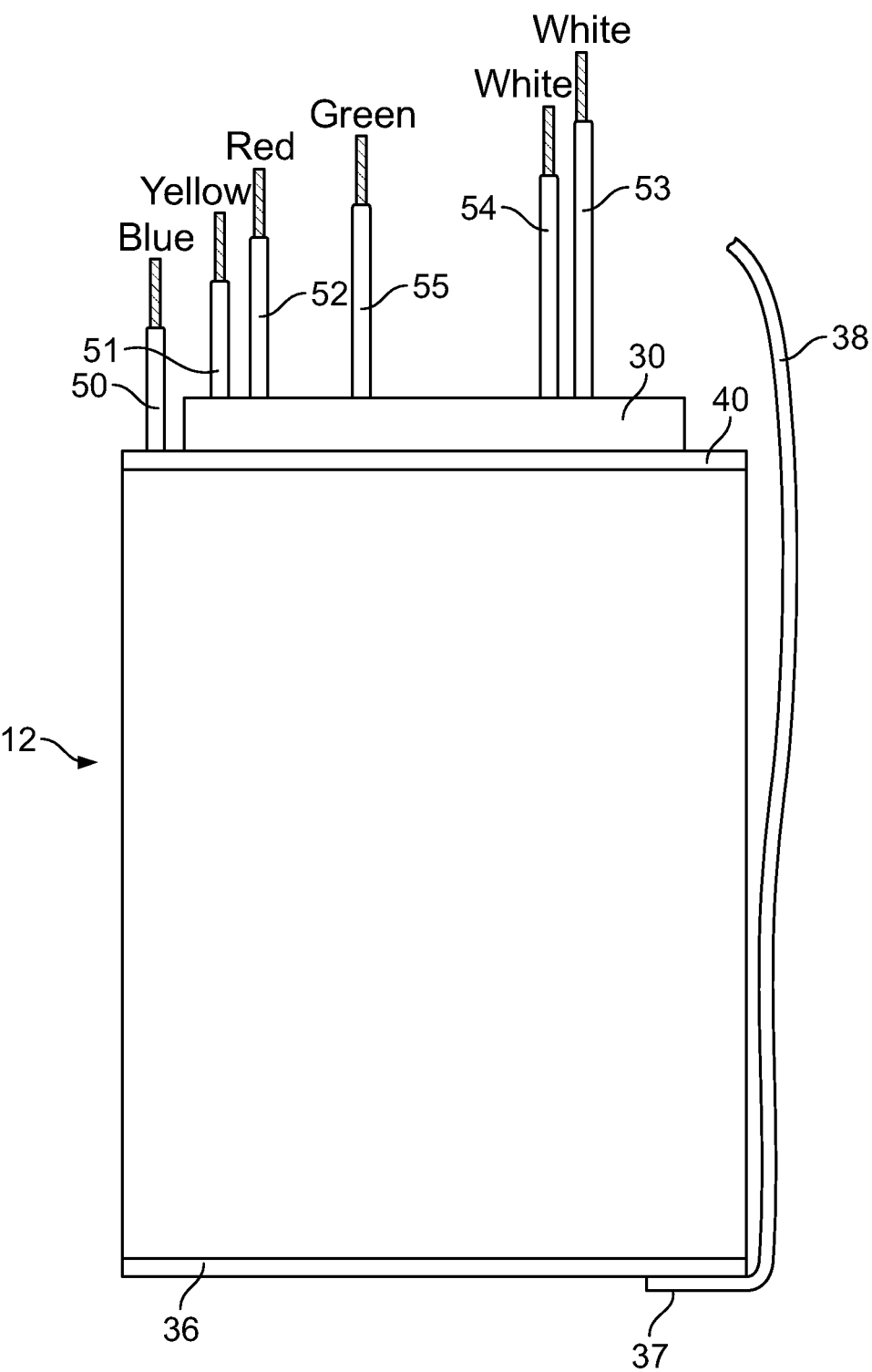
FIG. 4 is a side elevation view of the capacitive element of the capacitor of FIG. 1, including wire conductors connected to the capacitor sections thereof.
Figure 5:
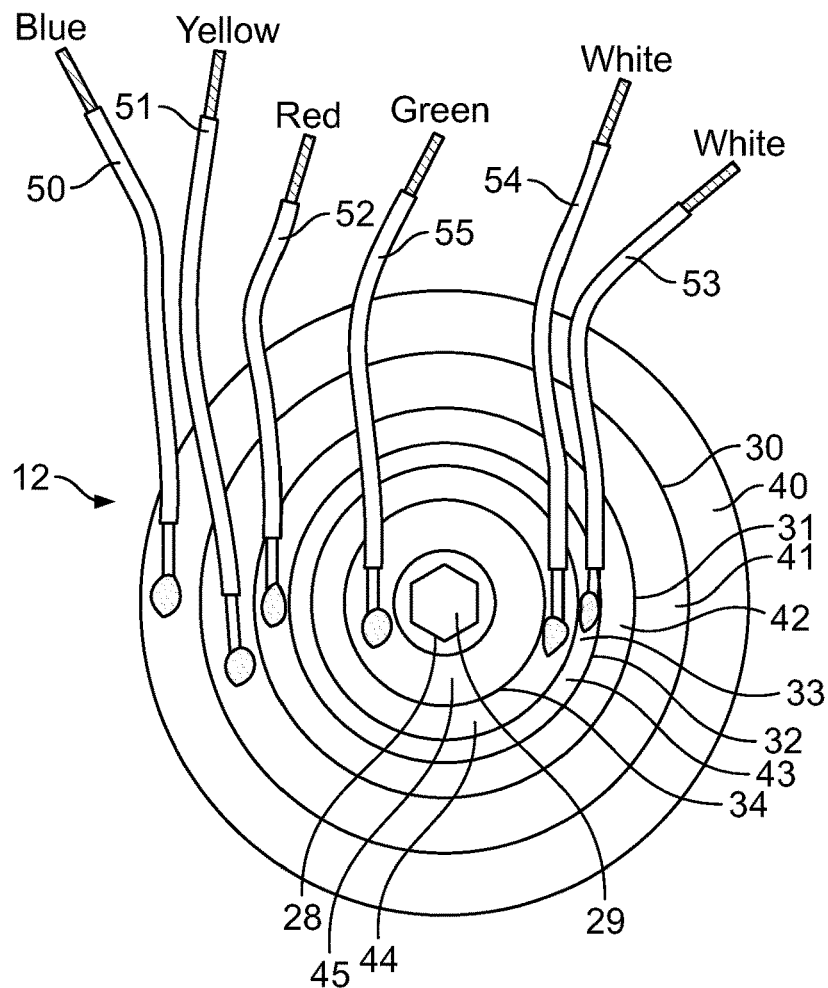
FIG. 5 is a top view of the capacitive element of the capacitor of FIG. 1, including wire conductors connected to capacitor sections thereof.

The capacitor 10 has a capacitive element 12 having a plurality of capacitor sections, each having a capacitance value. The capacitive element 12 is also shown in FIGS. 4 and 5. In the preferred embodiment described herein, the capacitive element 12 has six capacitor sections 20-25. The capacitive element 12 is a wound cylindrical element manufactured by extension of the techniques described in my prior U.S. Pat. No. 3,921,041, my U.S. Pat. No. 4,028,595, my U.S. Pat. No. 4,352,145 and my U.S. Pat. No. 5,313,360, incorporated herein by reference. Those patents relate to capacitive elements having two capacitor sections rather than a larger plurality of capacitor sections, such as the six capacitor sections 20-25 of the capacitive element 12. Accordingly, the capacitive element 12 has a central spool or mandrel 28, which has a central opening 29. First and second dielectric films, each having a metalized layer on one side thereof, are wound in cylindrical form on the mandrel 28 with the non-metalized side of one film being in contact with the metalized side of the other. Selected portions of one or both of the metalized layers are removed in order to provide a multiple section capacitive element. Element insulation barriers are inserted into the winding to separate the capacitor sections, the element insulation barriers also assuming a cylindrical configuration. Five element insulation barriers 30-34 are provided to separate the six capacitor sections 20-25, with element insulation barrier 30 separating capacitor sections 20 and 21, element insulation barrier 31 separating capacitor sections 21 and 22, element insulation barrier 32 separating capacitor sections 22 and 23, element insulation barrier 33 separating capacitor sections 23 and 24, and element insulation barrier 34 separating capacitor sections 24 and 25.

The element insulation barriers are insulating polymer sheet material, which in the capacitive element 12 is polypropylene having a thickness of 0.005 inches, wound into the capacitive element 12. Thickness of 0.0025 to 0.007 may be used. Other materials may also be used. The barriers each have about 2¾-4 wraps of the polypropylene sheet material, wherein the element insulation barriers have a thickness of about 0.013 to 0.020 inches. The barriers 30-34 are thicker than used before in capacitors with fewer capacitor sections. The important characteristic of the barriers 30-34 is that they are able to withstand heat from adjacent soldering without losing integrity of electrical insulation, such that adjacent sections can become bridged.

As is known in the art, the metalized films each have one unmetalized marginal edge, such that the metalized marginal edge of one film is exposed at one end of the wound capacitive element 12 and the metalized marginal edge of the other film is exposed at the other end of the capacitive element 12. With reference to FIGS. 3 and 5, at the lower end of the capacitance element 12, the barriers 30-34 do not extend from the film, and an element common terminal 36 is established contacting the exposed metalized marginal edges of one metalized film of all the capacitor sections 20-25. The element common terminal 36 is preferably a zinc spray applied onto the end of the capacitive element 12.

At the top end of the capacitive element 12 as depicted in FIGS. 3 and 5, the element insulation barriers 30-34 extend above the wound metalized film. An individual capacitor element section terminal is provided for each of the capacitive sections 20-25, also by applying a zinc or other metallic spray onto the end of the capacitive element 12 with the zinc being deployed on each of the capacitor sections 20-25 between and adjacent the element insulation barriers 30-34. The element section terminals are identified by numerals 40-45. Element section terminal 40 of capacitor section 20 extends from the outer-most element insulation barrier 30 to the outer surface of the capacitive element 12, and the element section terminal 45 of capacitor section 25 extends from the inner-most element insulation barrier 34 to the central mandrel 28. Element section terminals 41-44 are respectively deployed on the capacitor sections 21-24.

Conductors preferably in the form of six insulated wires 50-55 each have one of their ends respectively soldered to the element section terminals 40-45, as best seen in FIG. 5. The thickness of the polypropylene barriers 30-34 resists any burn-through as a result of the soldering to connect wires 50-55 to the terminals 40-45.

The insulation of the wires 50-55 is color coded to facilitate identifying which wire is connected to which capacitor section. Wire 50 connected to element section terminal 40 of capacitor section 20 has blue insulation, wire 51 connected to element section terminal 41 of capacitor section 21 has yellow insulation, wire 52 connected to element section terminal 42 of capacitor section 22 has red insulation, wire 53 connected to element section terminal 43 of capacitor section 23 has white insulation, wire 54 connection to element section terminal 44 of capacitor section 24 has white insulation, and wire 55 connected to element section terminal 45 of capacitor section 25 has green insulation. These colors are indicated on FIG. 4.

The capacitive element 12 is further provided with foil strip conductor 38, having one end attached to the element common terminal 36 at 37. The foil strip conductor 38 is coated with insulation, except for the point of attachment 37 and the distal end 39 thereof. The conductor 50 connected to the outer capacitor element section 20 and its terminal 30 may also be a foil strip conductor. If desired, foil or wire conductors may be utilized for all connections.

In the capacitive element 12 used in the capacitor 10, the capacitor section 20 has a value of 25.0 microfarads and the capacitor section 21 has a capacitance of 20.0 microfarads. The capacitor section 22 has a capacitance of 10.0 microfarads. The capacitor section 23 has a capacitance of 5.5 microfarads, but is identified as having a capacitance of 5.0 microfarads for purposes further discussed below. The capacitor section 24 has a capacitance of 4.5 microfarads but is labeled as having a capacitance of 5 microfarads, again for purposes described below. The capacitor section 25 has a capacitance of 2.8 microfarads. The capacitor section 20 with the largest capacitance value also has the most metallic film, and is therefore advantageously located as the outer section or at least one of the three outer sections of the capacitive element 12.

The capacitor 10 also has a case 60, best seen in FIGS. 1-3, having a cylindrical side wall 62, a bottom wall 64, and an open top 66 of side wall 62. The case 60 is formed of aluminum and the cylindrical side wall 62 has an outside diameter of 2.50 inches. This is a very common diameter for capacitors of this type, wherein the capacitor 10 will be readily received in the mounting space and with the mounting hardware provided for the capacitor being replaced. Other diameters may, however, be used, and the case may also be plastic or of other suitable material.

The capacitive element 12 with the wires 50-55 and the foil strip 38 are received in the case 60 with the element common terminal 36 adjacent the bottom wall 64 of the case. An insulating bottom cup 70 is preferably provided for insulating the capacitive element 12 from the bottom wall 64, the bottom cup 70 having a center post 72 that is received in the center opening 29 of the mandrel 28, and an up-turned skirt 74 that embraces the lower side wall of the cylindrical capacitive element 12 and spaces it from the side wall 62 of the case 60.

An insulating fluid 76 is provided within the case 60, at least partly and preferably substantially surrounding the capacitive element 12. The fluid 76 may be the fluid described in my U.S. Pat. No. 6,014,308, incorporated herein by reference, or one of the other insulating fluids used in the trade, such as polybutene.

Figure 9:
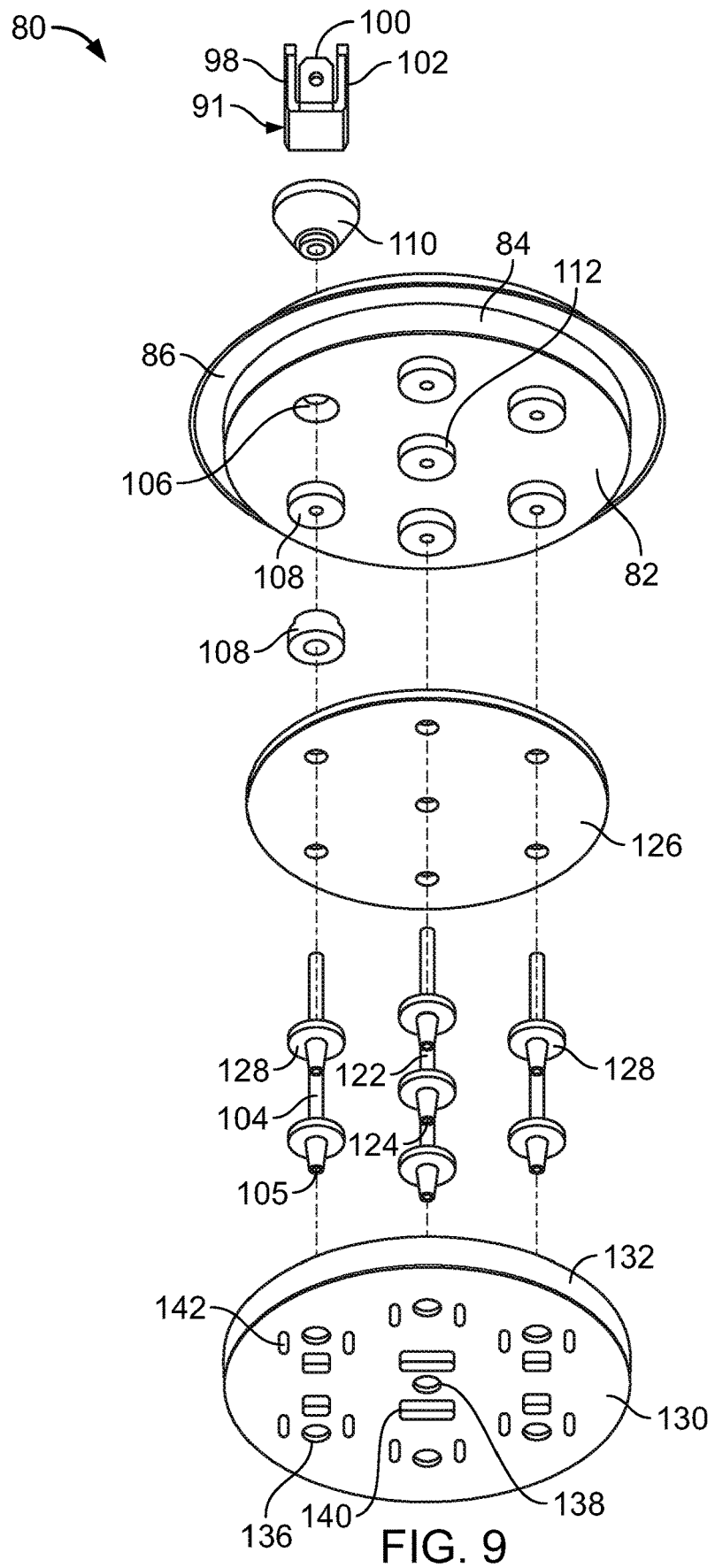
FIG. 9 is an exploded perspective view of the pressure interrupter cover assembly of the capacitor of FIG. 1.
Figure 10:
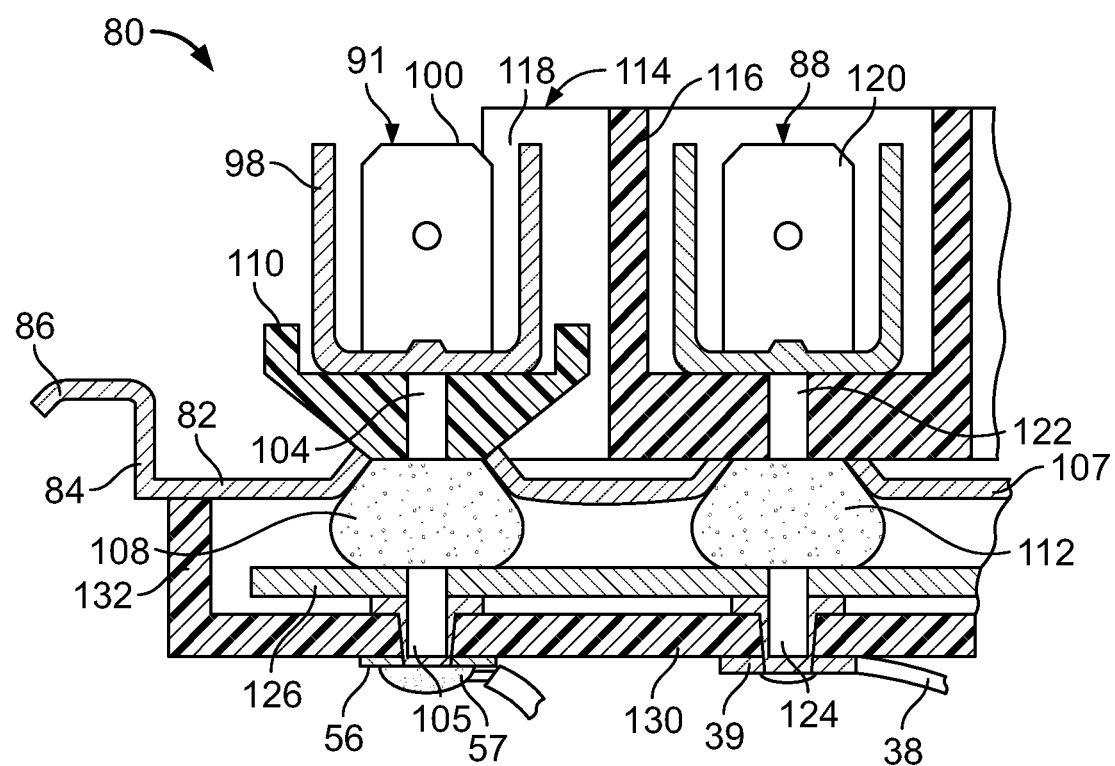
FIG. 10 is an enlarged fragmentary view of the pressure interrupter cover assembly of the capacitor of FIG. 1.

The capacitor 10 also has a pressure interrupter cover assembly 80 best seen in FIGS. 1-3, 8-10 and 24. The cover assembly 80 includes a deformable circular cover 82 having an upstanding cylindrical skirt 84 and a peripheral rim 86 as best seen in FIGS. 9 and 10. The skirt 84 fits into the open top 66 cylindrical side wall 62 of case 60, and the peripheral rim 86 is crimped to the open top 66 of the case 60 to seal the interior of the capacitor 10 and the fluid 76 contained therein, as shown in FIGS. 1 and 3.

The pressure interrupter cover assembly 80 includes seven cover terminals mounted on the deformable cover 82. A common cover terminal 88 is mounted generally centrally on the cover 82, and section cover terminals 90-95, each respectively corresponding to one of the capacitor sections 20-25, are mounted at spaced apart locations surrounding the common cover terminal 88. With particular reference to FIGS. 1, 2, 9 and 10, the section cover terminal 91 has three upstanding blades 98, 100 and 102 mounted on the upper end of a terminal post 104. Terminal post 104 has a distal end 105, opposite the blades 98, 100 and 102. The cover 82 has an opening 106 for accommodating the terminal post 104, and has a beveled lip 107 surrounding the opening. A shaped silicone insulator 108 fits snuggly under the cover in the beveled lip 107 and the terminal post 104 passes through the insulator 108. On the upper side of the cover, an insulator cup 110 also surrounds the post 104, and the insulator cup 110 sits atop the silicone insulator 108; thus, the terminal 91 and its terminal post 104 are well insulated from the cover 82. The other cover section terminals 92-95 are similarly mounted with an insulator cup and a silicone insulator.

The common cover terminal 88 has four blades 120, and a terminal post 122 that passes through a silicone insulator 112. The common cover terminal 88 mounts cover insulator barrier 114 that includes an elongated cylindrical center barrier cup 116 surrounding and extending above the blades 120 of the common cover terminal 88, and six barrier fins 118 that extend respectively radially outwardly from the elongated center barrier cup 116 such that they are deployed between adjacent section cover terminals 90-95. This provides additional protection against any arcing or bridging contact between adjacent section cover terminals or with the common cover terminal 88. Alternatively, the common cover terminal 88 may be provided with an insulator cup 116, preferably extending above blades 120 but with no separating barrier fins, although the barrier fins 118 are preferred. The terminal post 122 extends through an opening in the bottom of the base 117 of the insulating barrier cup 116, and through the silicone insulator 112, to a distal end 124.

The pressure interrupter cover assembly 80 has a fiberboard disc 126 through which the terminal posts 122, terminal post 104 and the terminal posts of the other section cover terminals extend. The disc 126 may be also fabricated of other suitable material, such as polymers. The terminal posts 104, 122, etc. are configured as rivets with rivet flanges 128 for assembly purposes. The terminal posts 104, 122, etc. are inserted through the disc 126, insulators 108, 112, insulator cups 110 and barrier cup 116, and the cover terminals 88, 90-95 are spot welded to the ends of the rivets opposite the rivet flanges 128. Thus, the rivet flanges 128 secure the cover terminals 88, 90-95 in the cover 82, together with the insulator barrier 114, insulator cups 110 and silicone insulators 108, 112. The fiberboard disc 126 facilitates this assembly, but may be omitted, if desired. The distal ends of the terminal posts are preferably exposed below the rivet flanges 128.

The cover assembly 80 has a disconnect plate 130, perhaps best seen in FIGS. 3, 9 and 10. The disconnect plate 130 is made of a rigid insulating material, such as a phenolic, is spaced below the cover 82 by a spacer 134 in the form of a skirt. The disconnect plate 130 is provided with openings accommodating the distal ends of the terminal posts, such as opening 136 accommodating the distal end 105 of terminal post 104 and opening 138 accommodating the distal end 124 of the terminal post 122. With particular reference to FIG. 9, the disconnect plate 130 may be provided with raised guides, such as linear guides 140 and dimple guides 142, generally adjacent the openings accommodating the distal ends of terminal posts. These guides are for positioning purposes as discussed below.

In prior capacitors having three or fewer capacitor sections, the conductors between the capacitor sections and the terminal posts were generally foil strips, such as the one used for the common element terminal 36 of the capacitive element 12 herein. The foil strips were positioned on a breaker plate over the distal ends of terminal posts, and were welded to the distal ends of the terminal posts. In capacitor 10, the distal end 39 of the foil strip 38 is connected to the distal end 124 of terminal post 122 by welding, as in prior capacitors.

Figure 6:
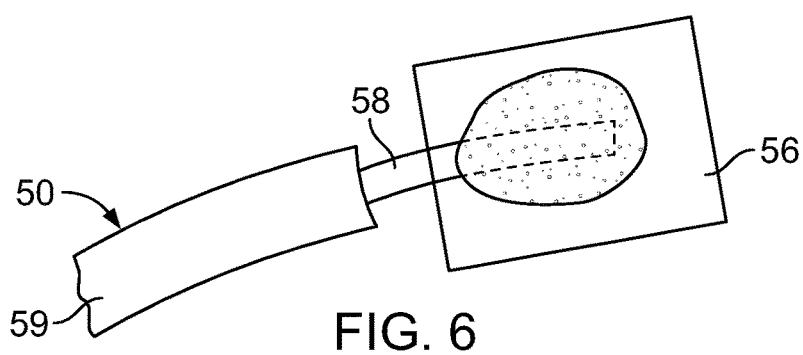
FIG. 6 is an enlarged fragmentary plan view of a distal end of a wire conductor of FIGS. 4 and 5, connected to a foil tab.
Figure 7:
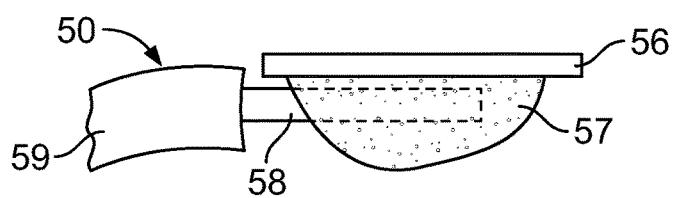
FIG. 7 is an enlarged fragmentary side view of a distal end of a wire conductor of FIGS. 4 and 5, connected to a foil tab.
Figure 8:
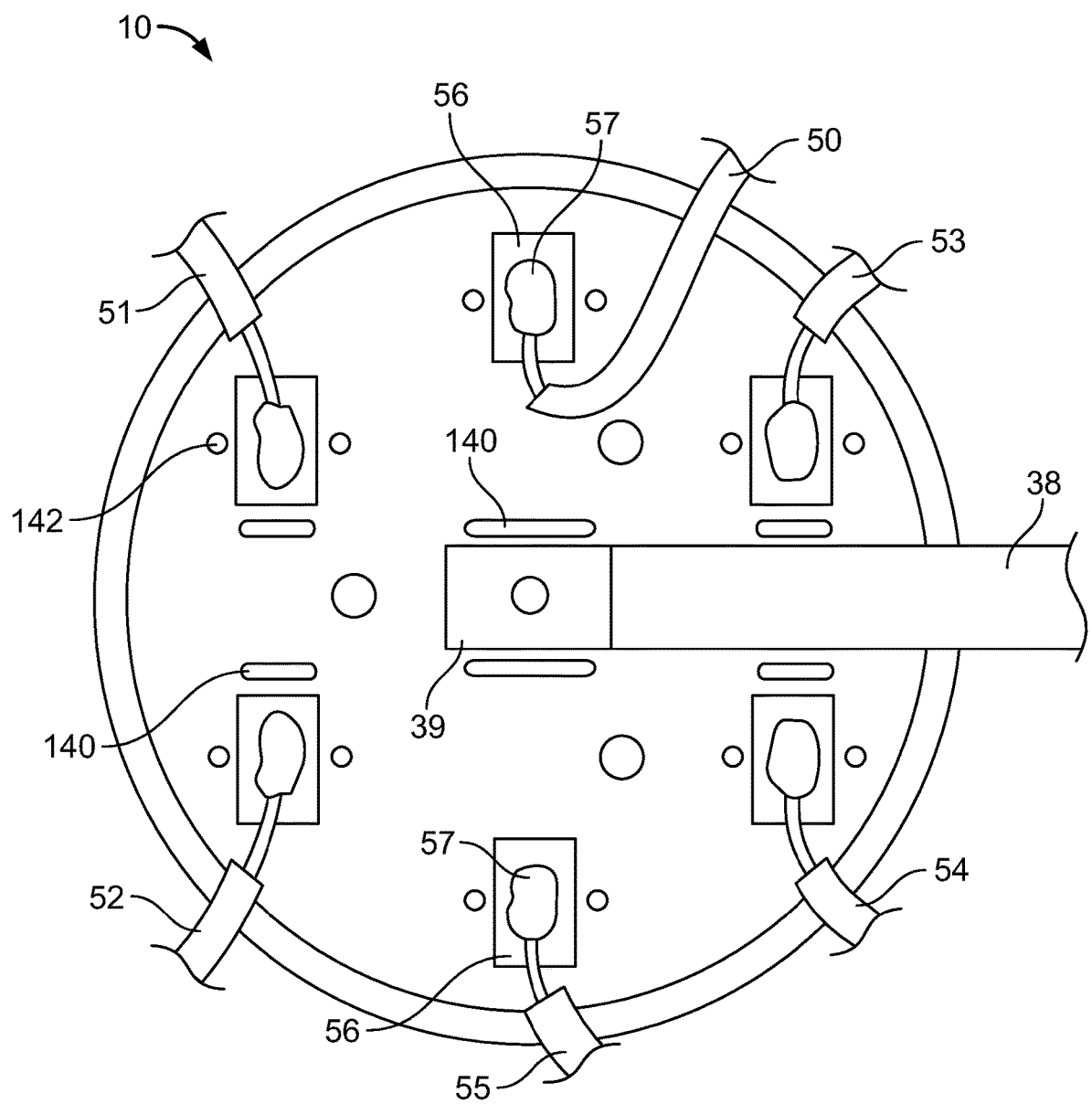
FIG. 8 is a sectional view of the capacitor of FIG. 1 taken along the lines 8-8 of FIG. 3, and showing a pressure interrupter cover assembly of the capacitor of FIG. 1.

The wires 50-55 are not well-configured for welding to the distal ends of the terminal posts of the cover section terminals. However, the wires 50-55 are desirable in place of foil strips because they are better accommodated in the case 60 and have good insulating properties, resist nicking and are readily available with colored insulations. In order to make the necessary connection of the wires 50-55 to their respective terminal posts, foil tabs 56 are welded to each of the distal ends of the terminal posts of the section cover terminals 90-95, and the guides 140, 142 are helpful in positioning the foil tabs 56 for the welding procedure. The attachment may be accomplished by welding the distal end of a foil strip to the terminal post, and then cutting the foil strip to leave the foil tab 56. Thereafter, and as best seen in FIGS. 6, 7 and 10, the conductor 58 of wire 50 is soldered to the tab 56, by solder 57. The insulation 59 of wire 50 has been stripped to expose the conductor 58. The other wires 51-55 are similarly connected to their respective cover section terminals. Alternatively, the foil tabs may be soldered to the wires and the tabs may then be welded to the terminal posts, if desired, or other conductive attachment may be employed.

Accordingly, each of the capacitor sections 20-25 is connected to a corresponding section cover terminal 90-95 by a respective one of color coded wires 50-55. The insulator cups 110 associated with each of the section cover terminals 90-95 are also color coded, using the same color scheme as used in the wires 50-55. This facilitates assembly, in that each capacitor section and its wire conductor are readily associated with the correct corresponding section cover terminal, so that the correct capacitor sections can be identified on the cover to make the desired connections for establishing a selected capacitance value.

The connections of the wires 50-55 and the foil 38 to the terminal posts are made prior to placing the capacitive element 12 in the case 60, adding the insulating fluid 76, and sealing the cover 82 of cover assembly 80 to the case 60. The case 60 may be labeled with the capacitance values of the capacitance sections 20-25 adjacent the cover terminals, such as on the side of case 60 near the cover 82 or on the cover 82.

The capacitor 10 may be used to replace a failed capacitor of any one of over two hundred different capacitance values, including both single and dual applications. Therefore, a serviceman is able to replace virtually any failed capacitor he may encounter as he makes service calls on equipment of various manufacturers, models, ages and the like.

As noted above, the capacitor 10 is expected to be used most widely in servicing air conditioning units. Air conditioning units typically have two capacitors; a capacitor for the compressor motor which may or may not be of relatively high capacitance value and a capacitor of relatively low capacitance value for a fan motor. The compressor motor capacitors typically have capacitances of from 20 to about 60 microfarads. The fan motor capacitors typically have capacitance values from about 2.5 to 12.5 microfarads, and sometimes as high as 15 microfarads, although values at the lower end of the range are most common.

Figure 11:
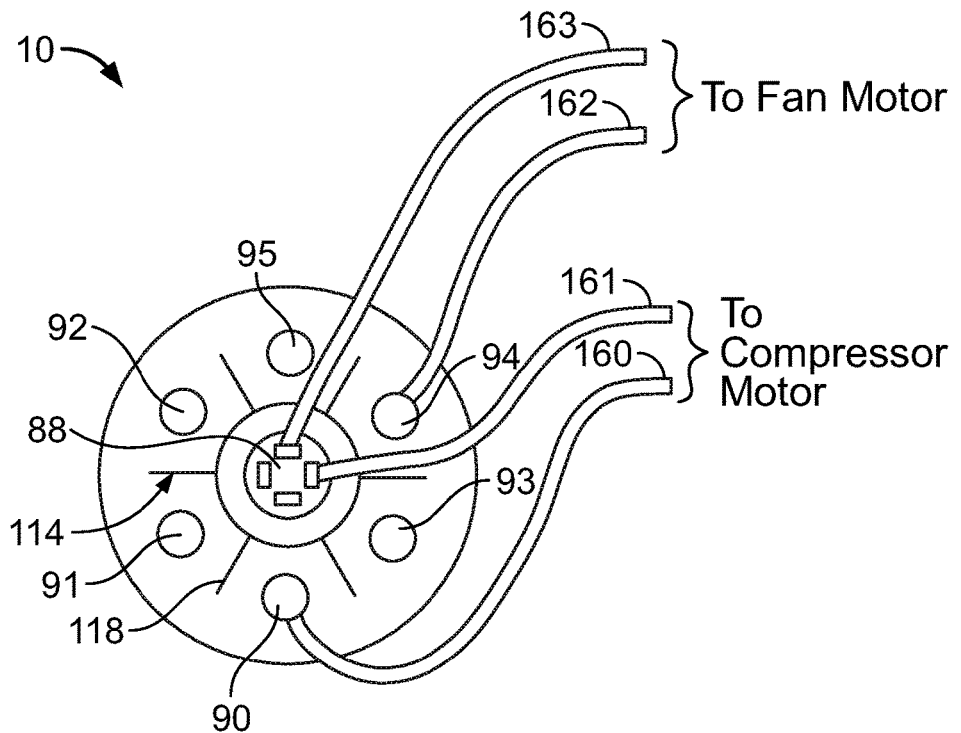
FIG. 11 is a top view of the capacitor of FIG. 1, shown with selected capacitor sections connected to a fan motor and a compressor motor.
Figure 12:
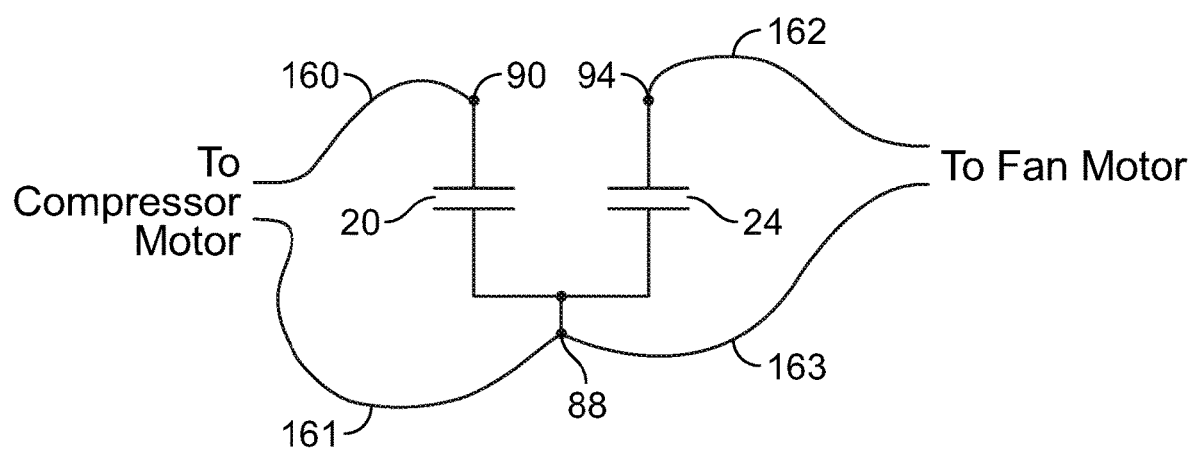

With reference to FIG. 11, capacitor 10 is connected to replace a compressor motor capacitor and a fan motor capacitor, where the compressor motor capacitor has a value of 25.0 microfarads and the fan motor capacitor has a value of 4.0 microfarads. The 25.0 microfarad replacement capacitance for the compressor motor is made by one of the compressor motor leads 160 being connected to one of the blades of the blue section cover terminal 90 of capacitor section 20, which has a capacitance value of 25.0 microfarads, and the other compressor motor lead 161 being connected to one of the blades 120 of common cover terminal 88. The lead 162 from the fan motor is connected to the white section cover terminal 94 of capacitor section 24, and the second lead 163 from the fan motor is also connected to the common cover terminal 88. As set forth above, the actual capacitance value of the capacitor section 24 that is connected to the section cover terminal 94 is 4.5 microfarads, and the instructions and/or labeling for the capacitor 10 indicate that the capacitor section 24 as represented at terminal 94 should be used for a 4.0 microfarad replacement. Preferred labeling for this purpose can be "5.0 (4.0) microfarads" or similar. The 4.5 microfarad capacitance value is within approximately 10% of the specified 4.0 microfarad value, and that is within acceptable tolerances for proper operation of the fan motor. Of course, the capacitor section 24 and terminal 94 may be connected to replace a 5.0 microfarad capacitance value as well, whereby the 4.5 microfarad actual capacitance value of capacitor section 24 gives added flexibility in replacing failed capacitors. Similarly, the 5.5 microfarad capacitor section 23 can be used for either 5.0 microfarad or 6.0 microfarad replacement, and the 2.8 microfarad capacitor section 25 can be used for a 3.0 microfarad replacement or for a 2.5 microfarad additive value. FIG. 12 schematically illustrates the connection of capacitor sections 20 and 24 to the compressor motor and fan motor shown in FIG. 11.

Figure 13:
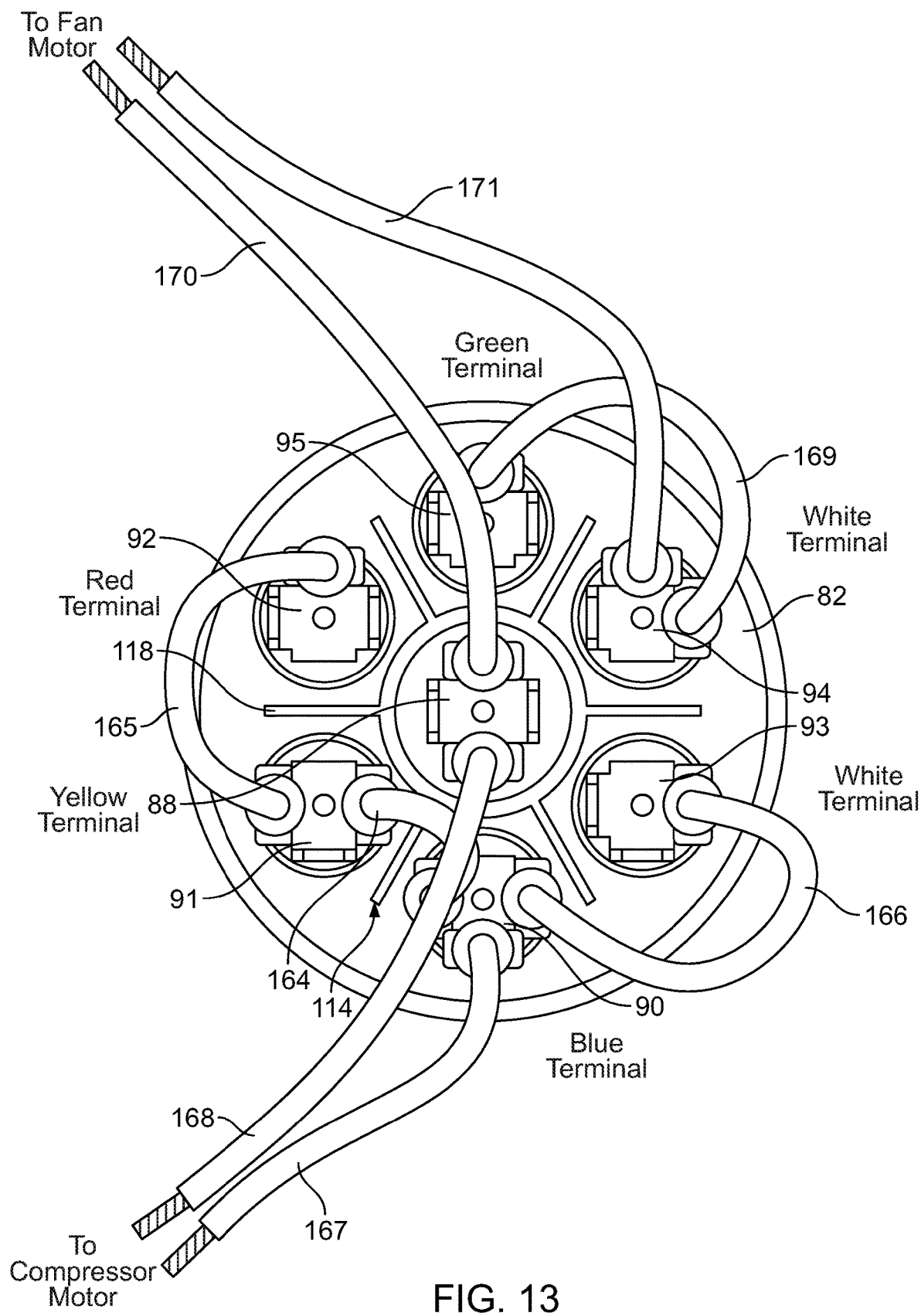
FIG. 13 is a top view of the capacitor of FIG. 1 with jumper wires connecting selected capacitor sections in parallel, and also shown connected in an electrical circuit to a fan motor and a compressor motor.

FIG. 13 illustrates another connection of the capacitor 10 for replacing a 60.0 microfarad compressor motor capacitor and a 7.5 microfarad fan motor capacitor. The formula for the total capacitance value for capacitors connected in parallel is additive namely: $C_t=C_1+C_2+C_3\ldots$. Therefore, with reference to FIG. 13, a 60.0 microfarad capacitance value for the compressor motor is achieved by connecting in parallel the section cover terminal 90 (capacitor section 20 at a value of 25.0 microfarads), section cover terminal 91 (capacitor section 21 at a value of 20.0 microfarads), section cover terminal 92 (capacitor section 22 at a value of 10.0 microfarads) and section cover terminal 93 (capacitor section 23 at a nominal value of 5.0 microfarads). The foregoing connections are made by means of jumpers 164, 165 and 166, which may be supplied with the capacitor 10. Lead 167 is connected from the section cover terminal 90 of the capacitor section 20 to the compressor motor, and lead 168 is connected from the common cover terminal 88 to the compressor motor. This has the effect of connecting the specified capacitor sections 20, 21, 22 and 23 in parallel, giving a total of 60.0 microfarad capacitance; to wit: 25+20+10+5=60. It is preferred but not required to connect the lead from the compressor motor or the fan motor to the highest value capacitor section used in providing the total capacitance.

Figure 14:
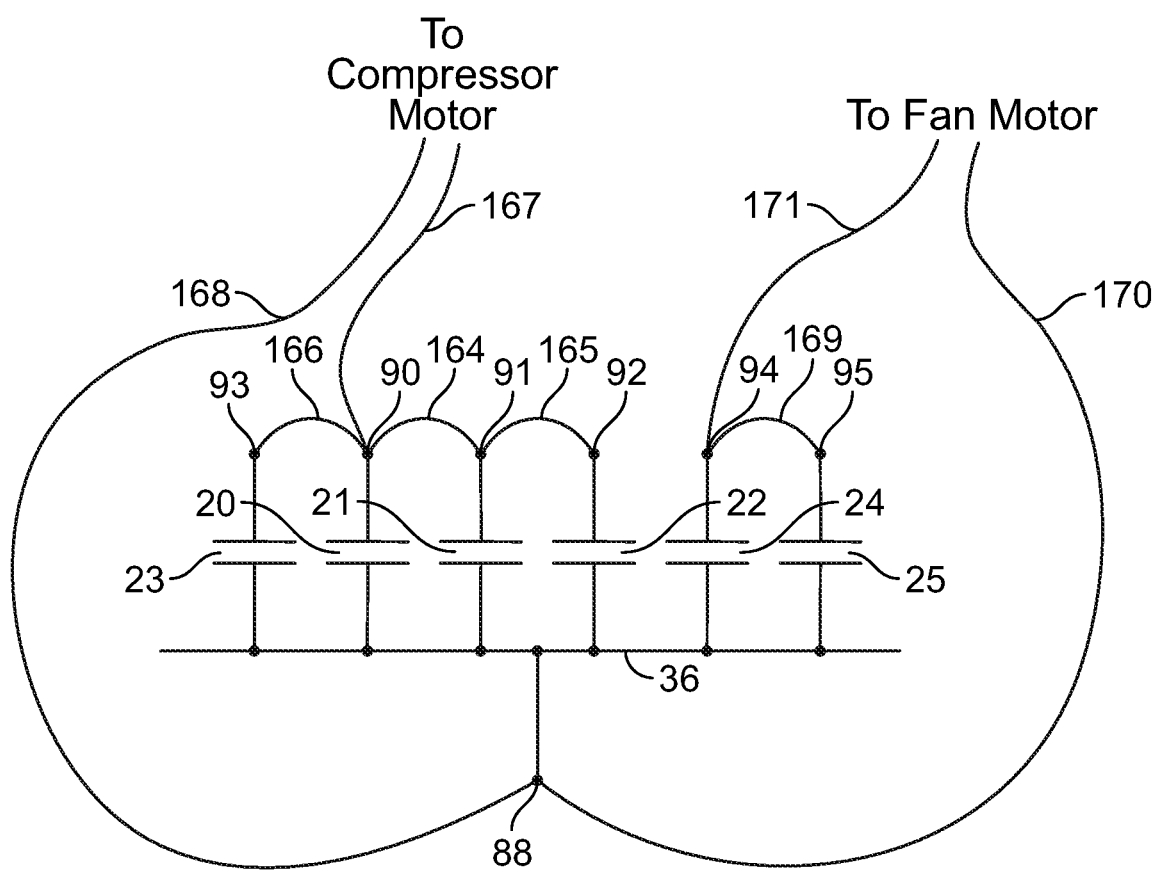

Similarly, a 7.5 microfarad capacitance is provided to the fan motor by connecting section cover terminal 94 of the 5.0 microfarad capacitor section 24 and the section cover terminal 95 of the nominal 2.5 microfarad capacitor section 25 in parallel via jumper 169. Leads 170 and 171 connect the fan motor to the common cover terminal 88 and the section cover terminal 95 of the capacitor section 25. FIG. 14 diagrammatically illustrates the connection of the capacitor 10 shown in FIG. 13.

It will be appreciated that various other jumper connections between section cover terminals can be utilized to connect selected capacitor sections in parallel, in order to provide a wide variety of capacitance replacement values.

The capacitor sections can also be connected in series to utilize capacitor 10 as a single value replacement capacitor. This has the added advantage of increasing the voltage rating of the capacitor 10 in a series application, i.e. the capacitor 10 can safely operate at higher voltages when its sections are connected in series. As a practical matter, the operating voltage will not be increased as it is established by the existing equipment and circuit, and the increased voltage rating derived from a series connection will increase the life of the capacitor 10 because it will be operating well below its maximum rating.

Figure 15:
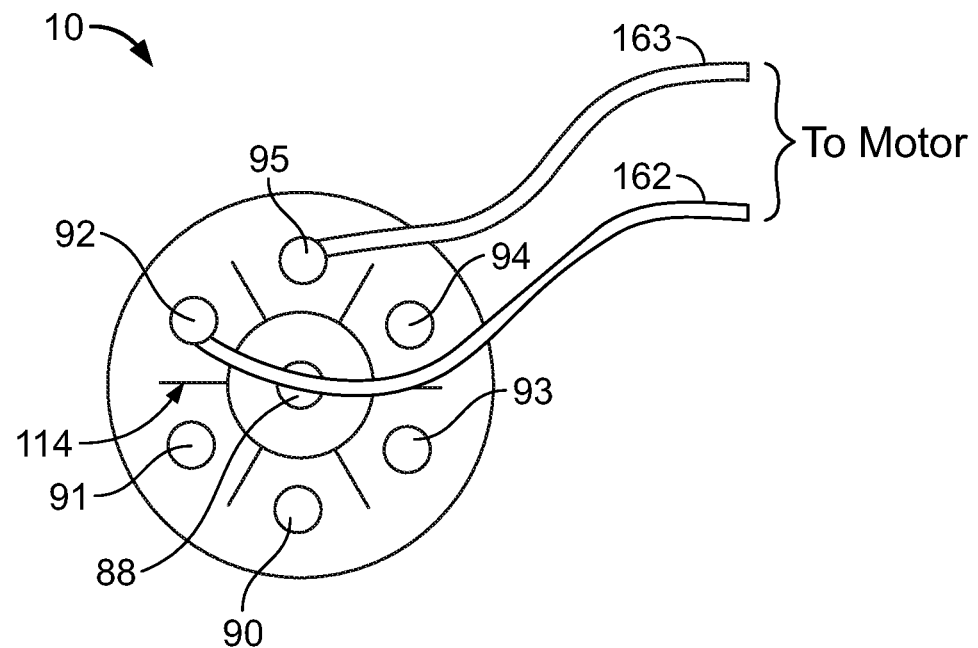
FIG. 15 is a top view of the capacitor of FIG. 1 connecting selected capacitor sections in series, and also shown connected in an electrical circuit to a motor.
Figure 16:
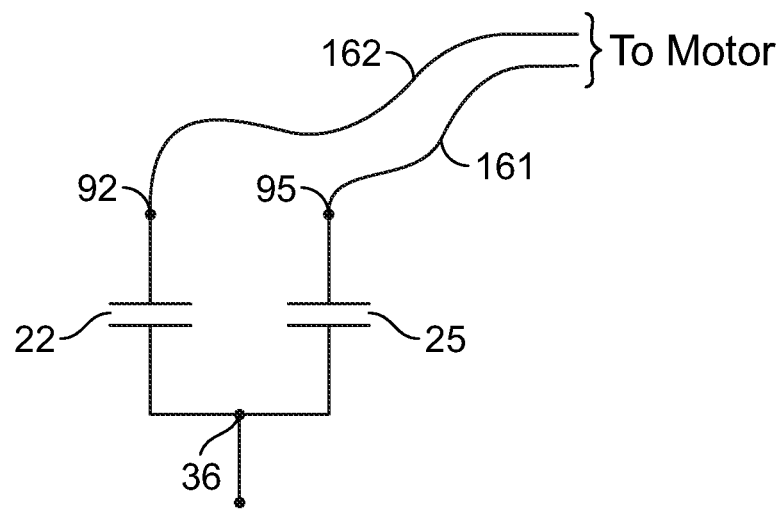
FIG. 16 is a schematic circuit diagram of the capacitor of FIG. 1 as connected shown in FIG. 15.

With reference to FIG. 15, the capacitor 10 is shown with capacitor section 22 (terminal 92) having a value of 10.0 microfarads connected in series with capacitor section 25 (terminal 95) having a nominal value of 2.5 microfarads to provide a replacement capacitance value of 2.0 microfarads. Leads 175 and 176 make the connections from the respective section cover terminals 92 and 95 to the motor, and the element common terminal 36 connects the capacitor sections 22 and 25 of capacitive element 12. With reference to FIG. 16, the connection of capacitor 10 shown in FIG. 15 is illustrated diagrammatically. In both FIGS. 15 and 16, it will be seen that the common cover terminal 88 is not used in making series connections.

The formula for capacitance of capacitors connected in series is $$\frac{1}{C_T} = \frac{1}{C_1} + \frac{1}{C_2} + \frac{1}{C_3}\ldots$$

Therefore, $$C_T = \frac{C_1 \times C_2}{C_1 + C_2},$$

and the total capacitance of the capacitor sections 22 and 25 connected as shown in FIGS. 15 and 16 is $$C_T = \frac{10.0 \times 2.5}{10.0 + 2.5} = \frac{25}{12.5} = 2.0 \text{ microfarads.}$$

microfarads. The capacitance of each of the capacitor sections 20-25 is rated at 440 volts. However, when two or more capacitor sections 20-25 are connected in series, the applied voltage section is divided between the capacitor sections in inverse proportion to their value. Thus, in the series connection of FIGS. 15 and 16, the nominal 2.5 microfarad section sees about 80% of the applied voltage and the 10.0 microfarad section sees about 20% of the applied voltage. The net effect is that the capacitor 10 provides the 2.0 microfarad replacement value at a higher rating, due to the series connection. In this configuration, the capacitor 10 is lightly stressed and is apt to have an extremely long life.

Figure 17:
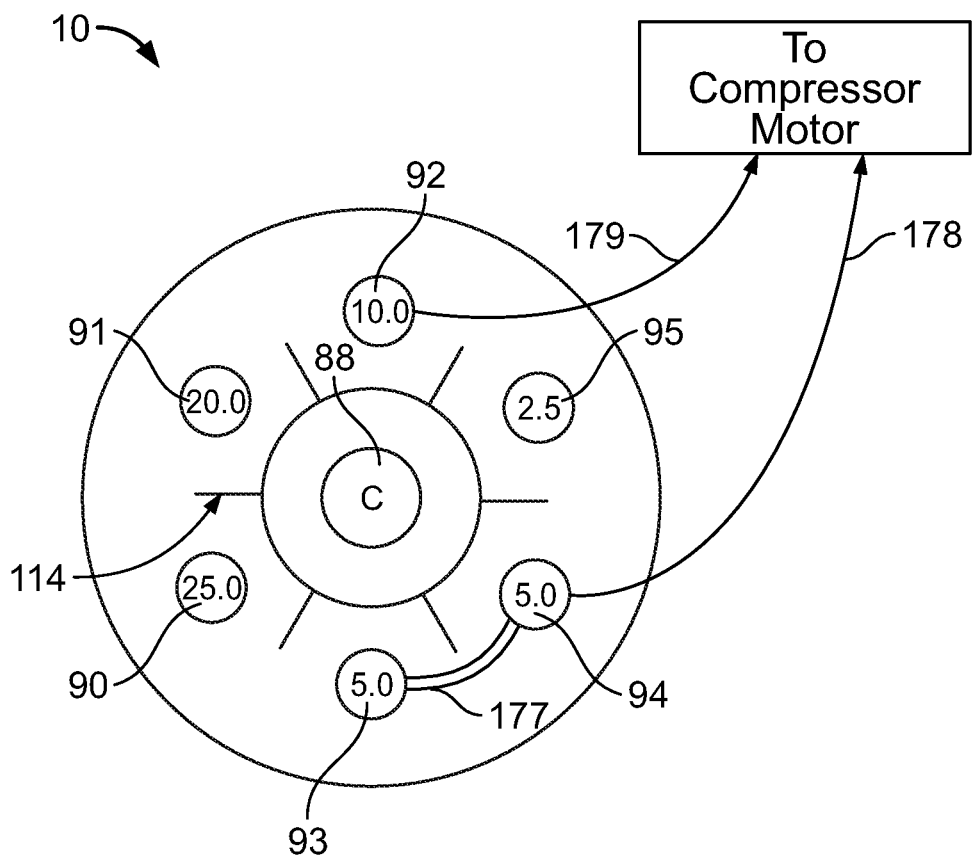
FIG. 17 is a top view of the capacitor of FIG. 1 with a jumper wire connecting selected capacitor sections in series, and also shown connected in an electrical circuit to a compressor motor.
Figure 18:
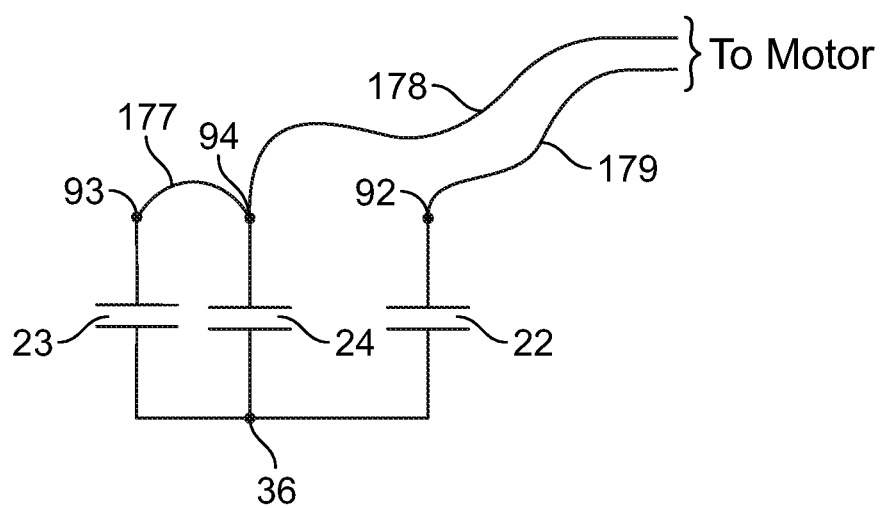
FIG. 18 is a schematic circuit diagram of the capacitor of FIG. 1 connected as shown in FIG. 17.

With reference to FIG. 17, the capacitor sections of the capacitor 10 are shown connected in a combination of parallel and series connections to provide additional capacitive values at high voltage ratings, in this case 5.0 microfarads. The two capacitor sections 23 and 24 each having a nominal value of 5.0 microfarads is connected in parallel by jumper 177 between their respective cover section terminals 93 and 94. The leads 178 and 179 from a compressor motor are connected to the section cover terminal 92 of capacitor section 22 having a value of 10.0 microfarads, and the other lead is connected to cover section terminal 94 of capacitor section 24. Thus, a capacitance value of 5.0 microfarads is provided according to the following formula $$\frac{1}{C_T} = \frac{1}{C_1} + \frac{1}{C_2},$$

where $C_1$ is a parallel connection having the value C+C, in this case 5.0+5.0 for a $C_1$ of 10.0 microfarads. With that substitution, the total value is $$C_T = \frac{10.0 \times 10.0}{10 + 10} = \frac{100}{20} = 5.0 \text{ microfarads.}$$

microfarads. The connection of capacitor 10 illustrated in FIG. 17 is shown diagrammatically in FIG. 18.

FIG. 19 is a chart showing single capacitance values that can be provided by the capacitor 10 connected in parallel. The values are derived by connecting individual capacitor sections into a circuit, or by parallel connections of capacitor sections. The chart should be interpreted remembering that the 2.8 microfarad capacitor section can be used as a 2.5 or 3.0 microfarad replacement, and that the two 5.0 microfarad values are actually 4.5 and 5.5 microfarad capacitor sections, also with possibilities for more replacements.

FIGS. 20-23 are charts showing applications of capacitor 10 in replacing both a fan motor capacitor and a compressor motor capacitor. This is an important capability, because many air conditioning systems are equipped with dual value capacitors and when one of the values fails, another dual value capacitor must be substituted into the mounting space bracket.

The chart of FIG. 20 shows dual value capacitances that can be provided by capacitor 10 wherein the nominal 2.5 microfarad capacitor section 25 is used for one of the dual values, usually the fan motor. Fan motors are generally not rigid in their requirements for an exact capacitance value, wherein the capacitor section 25 may also be used for fan motors specifying a 3.0 microfarad capacitor. The remaining capacitor sections 20-24 are available for connection individually or in parallel to the compressor motor, providing capacitance values from 5.0 to 65.0 microfarads in 5.0 microfarad increments.

The chart of FIG. 21 also shows dual value capacitances that can be provided by capacitor 10. In the chart of FIG. 21, one of the dual values is 5.0 microfarads that can be provided by either capacitor section 23 having an actual capacitance value of 5.5 microfarads or by capacitor section 24 having an actual capacitance of 4.5 microfarads. As discussed above, the capacitor section 24 can also be used for a 4.0 microfarad replacement value, and capacitor section 23 could be used for a 6.0 microfarad replacement value. Thus, the FIG. 21 chart represents more dual replacement values than are specifically listed. The other capacitor section may be used in various parallel connections to achieve the second of the dual capacitance values.

The chart of FIG. 22 illustrates yet additional dual value capacitances that can be provided by capacitor 10. Capacitor section 25 (nominal 2.5 microfarads) is connected in parallel with one of capacitor section 23 (5.5 microfarads) or capacitor section 24 (4.5 microfarads) to provide a 7.5 microfarad capacitance value as one of the dual value capacitances. The remaining capacitor sections are used individually or in parallel to provide the second of the dual value capacitances.

The FIG. 23 chart illustrates yet additional dual value capacitances that can be provided by capacitor 10, where capacitor section 22 (10 microfarads) is dedicated to provide one of the dual values. The remaining capacitor sections are used individually or in parallel for the other of the dual values.

It will be appreciated that any one or group of capacitor sections may be used for one of a dual value, with a selected one or group of the remaining capacitor sections connected to provide another capacitance value. Although there are no known applications, it will also be appreciated that the capacitor 10 could provide six individual capacitance values corresponding to the capacitor sections, or three, four or five capacitance values in selected individual and parallel connections. Additional single values can be derived from series connections.

The six capacitor sections 20-25 can provide hundreds of replacement values, including single and dual values. It will further be appreciated that if fewer replacement values are required, the capacitor 10 can be made with five or even four capacitor sections, and that if more replacement values were desired, the capacitor 10 could be made with more than six capacitor sections. It is believed that, at least in the intended field of use for replacement of air conditioner capacitors, there should be a minimum of five capacitor sections and preferably six capacitor sections to provide an adequate number of replacement values.

As is known in the art, there are occasional failures of capacitive elements made of wound metalized polymer film. If the capacitive element fails, it may do so in a sudden and violent manner, producing heat and outgassing such that high internal pressures are developed within the housing. Pressure responsive interrupter systems have been designed to break the connection between the capacitive element and the cover terminals in response to the high internal pressure, thereby removing the capacitive element from a circuit and stopping the high heat and overpressure condition within the housing before the housing ruptures. Such pressure interrupter systems have been provided for capacitors having two and three cover terminals, including the common terminal, but it has not been known to provide a capacitor with four or more capacitor sections and a pressure interrupter cover assembly.

Figure 24:
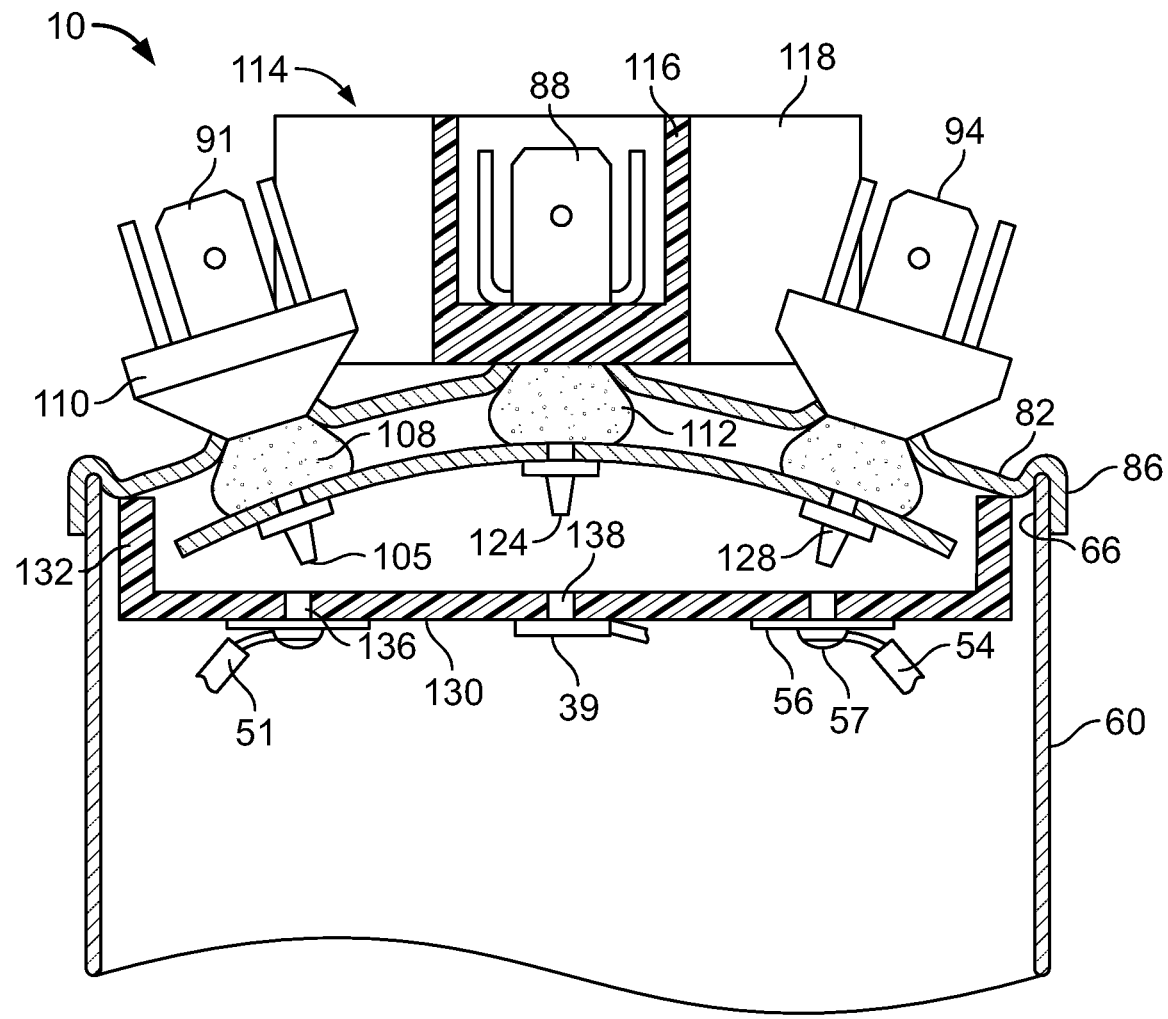
FIG. 24 is a sectional view of the capacitor of FIG. 1, taken generally along the lines 24-24 of FIG. 2, but showing the capacitor after failure of the capacitive element.
Figure 25:
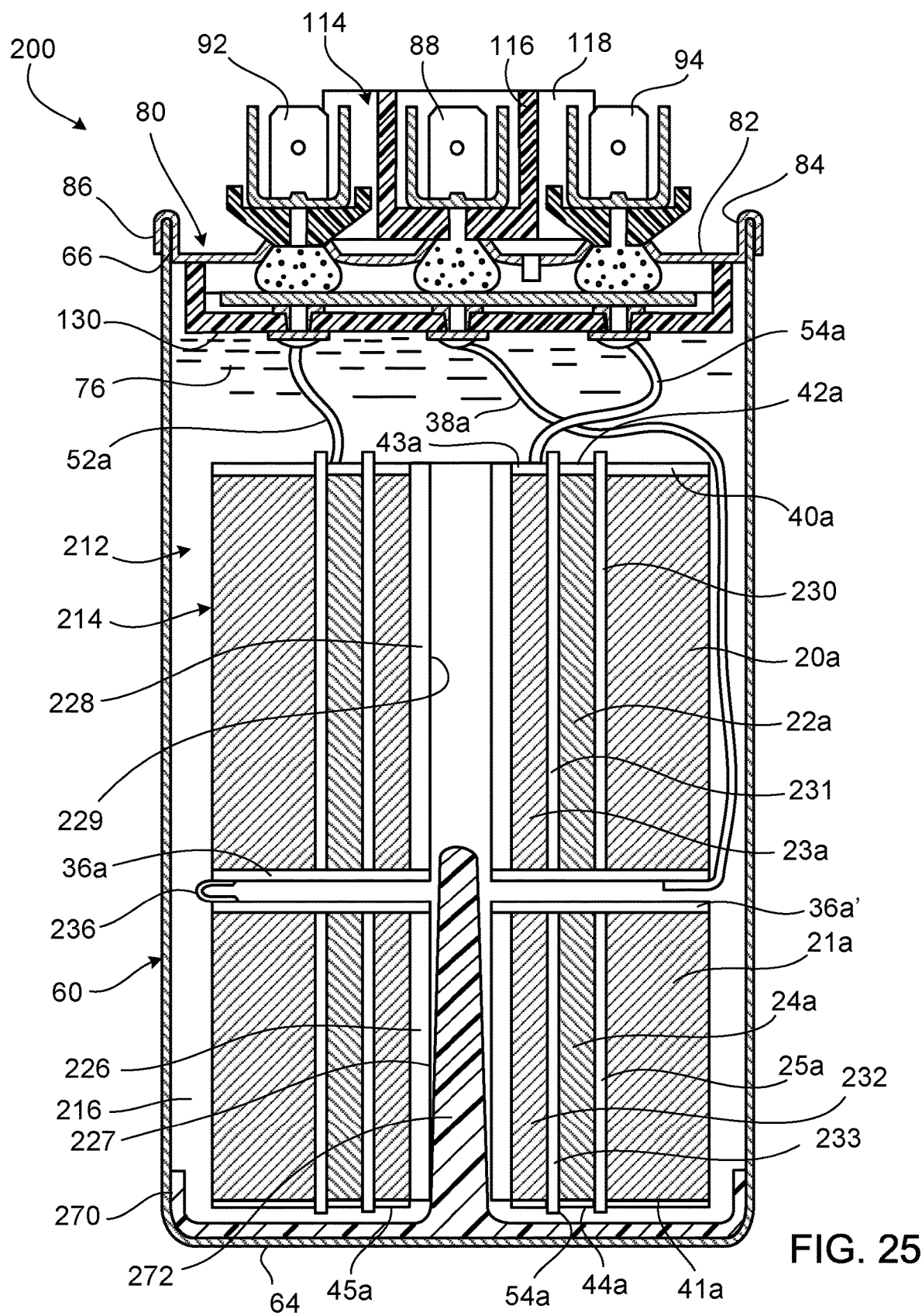
FIG. 25 is a sectional view of a capacitor according to the invention herein.

The pressure interrupter cover assembly 80 provides such protection for the capacitor 10 and its capacitive element 12. With reference to FIG. 24, the capacitor 10 is shown after failure. Outgassing has caused the circular cover 82 to deform upwardly into a generally domed shape. When the cover 82 deforms in the manner shown, the terminal posts 104, 122 are also displaced upwardly from the disconnect plate 130, and the weld connection of the distal end 124 of common cover terminal post 122 to the distal end 39 foil lead 38 from the element common terminal 36 of the capacitive element 12 is broken, and the welds between the foil tabs 56 and the terminal posts 104 of the section cover terminals 90-95 are also broken, the separation at section cover terminals 91 and 94 being shown.

Although the preferred pressure interrupter cover assembly includes the foil lead 38 and foil tabs 56, frangibly connected to the distal ends of the terminal posts, the frangible connections both known in the art and to be developed may be used. As an example, the terminal posts themselves may be frangible.

It should be noted that although it is desirable that the connections of the capacitive element and all cover terminals break, it is not necessary that they all do so in order to disconnect the capacitive element 12 from a circuit. For all instances in which the capacitor 10 is used with its capacitor sections connected individually or in parallel, only the terminal post 122 of common cover terminal 88 must be disconnected in order to remove the capacitive element 12 from the circuit. Locating the common cover terminal 88 in the center of the cover 82, where the deformation of the cover 82 is the greatest, ensures that the common cover terminal connection is broken both first and with certainty in the event of a failure of the capacitive element 12.

If the capacitor sections of the capacitor 10 are utilized in a series connection, it is necessary that only one of the terminal posts used in the series connection be disconnected from its foil tab at the disconnect plate 130 to remove the capacitive element from an electrical circuit. In this regard, it should be noted that the outgassing condition will persist until the pressure interrupter cover assembly 80 deforms sufficiently to cause disconnection from the circuit, and it is believed that an incremental amount of outgassing may occur as required to cause sufficient deformation and breakage of the circuit connection at the terminal post of one of the section cover terminal. However, in the most common applications of the capacitor 10, the common cover terminal 88 will be used and the central location of the common cover terminal 88 will cause fast and certain disconnect upon any failure of the capacitive element.

Two other aspects of the design are pertinent to the performance of the pressure interrupter system. First, with respect to series connections only, the common cover terminal 88 may be twisted to pre-break the connection of the terminal post 122 with the foil strip 38, thus eliminating the requirement of any force to break that connection in the event of a failure of the capacitive element 12. The force that would otherwise be required to break the connection of common cover terminal post 122 is then applied to the terminal posts of the section cover terminals, whereby the section cover terminals are more readily disconnected. This makes the pressure interrupter cover assembly 80 highly responsive in a series connection configuration.

Second, the structural aspects of welding foil tabs to the distal ends of the terminal posts corresponding to the various capacitor sections and thereafter soldering the connecting wires onto the foil tabs 56 is also believed to make the pressure interrupter cover assembly 80 more responsive to failure of the capacitive element 12. In particular, the solder and wire greatly enhance the rigidity of the foil tabs 56 wherein upon deformation of the cover 82, the terminal posts break cleanly from the foil tabs 56 instead of pulling the foil tabs partially through the disconnect plate before separating. Thus, the capacitor 10, despite having a common cover terminal and section cover terminals for six capacitor sections, is able to satisfy safety requirements for fluid-filled metalized film capacitors, which is considered a substantial advance in the art.

Figure 26:
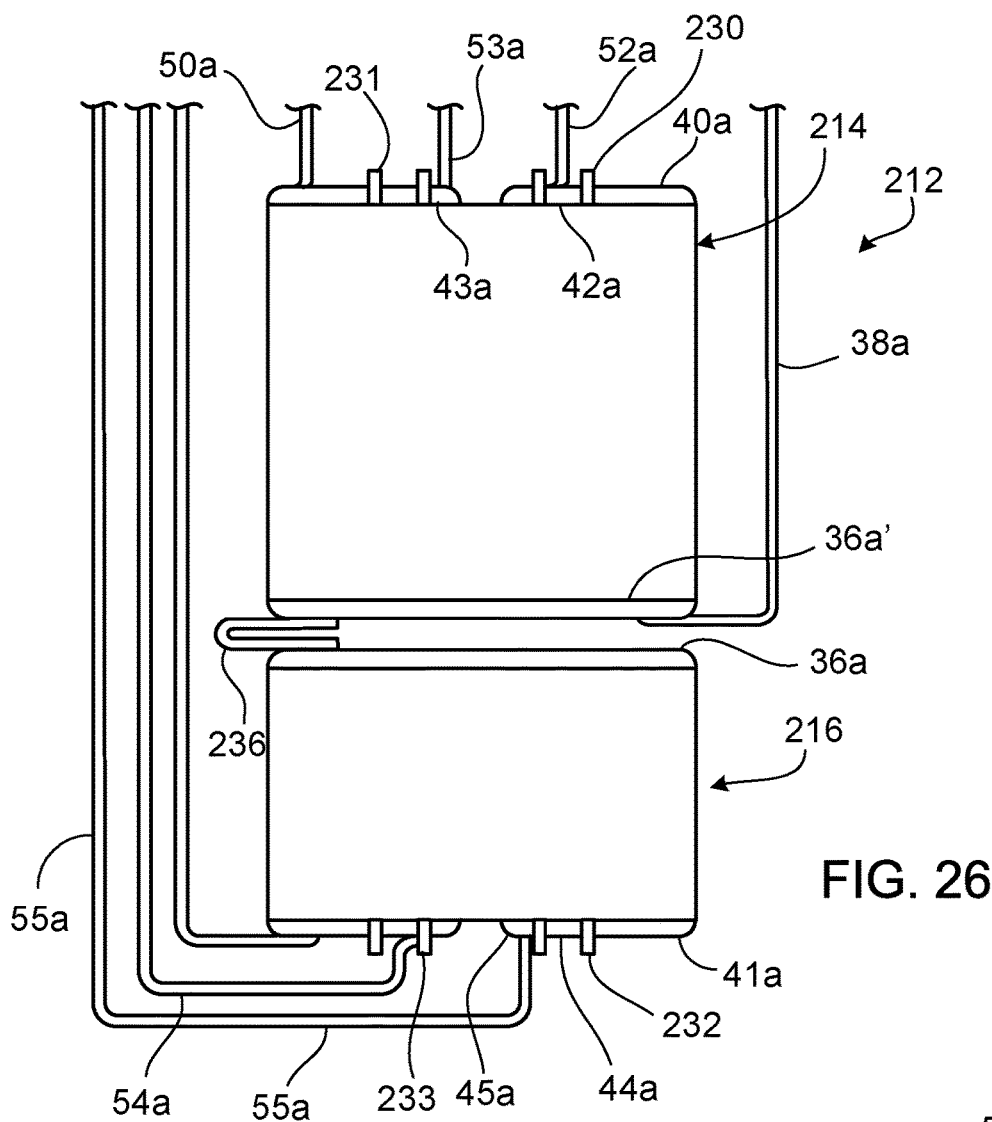
FIG. 26 is a side elevation view of the capacitive element of the capacitor of FIG. 25, including conductors connected to the capacitor sections thereof.
Figure 27:
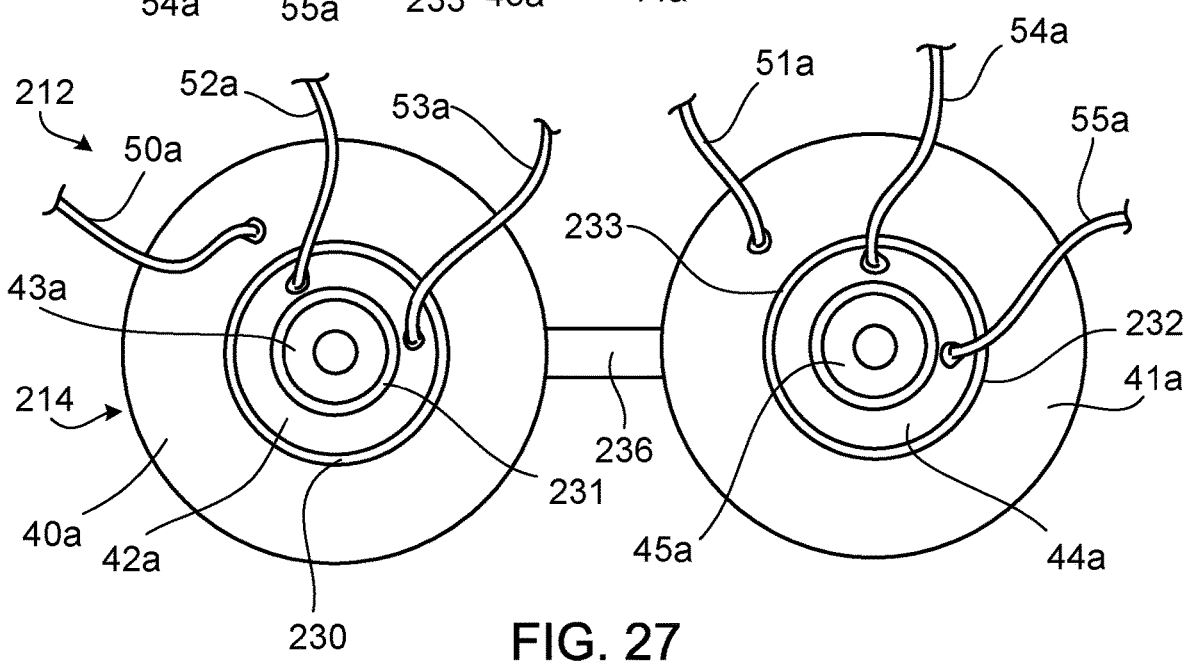
FIG. 27 is a folded top and bottom view of the capacitive element of the capacitor of FIG. 26 including conductors connected to capacitor sections thereof.
Figure 28:
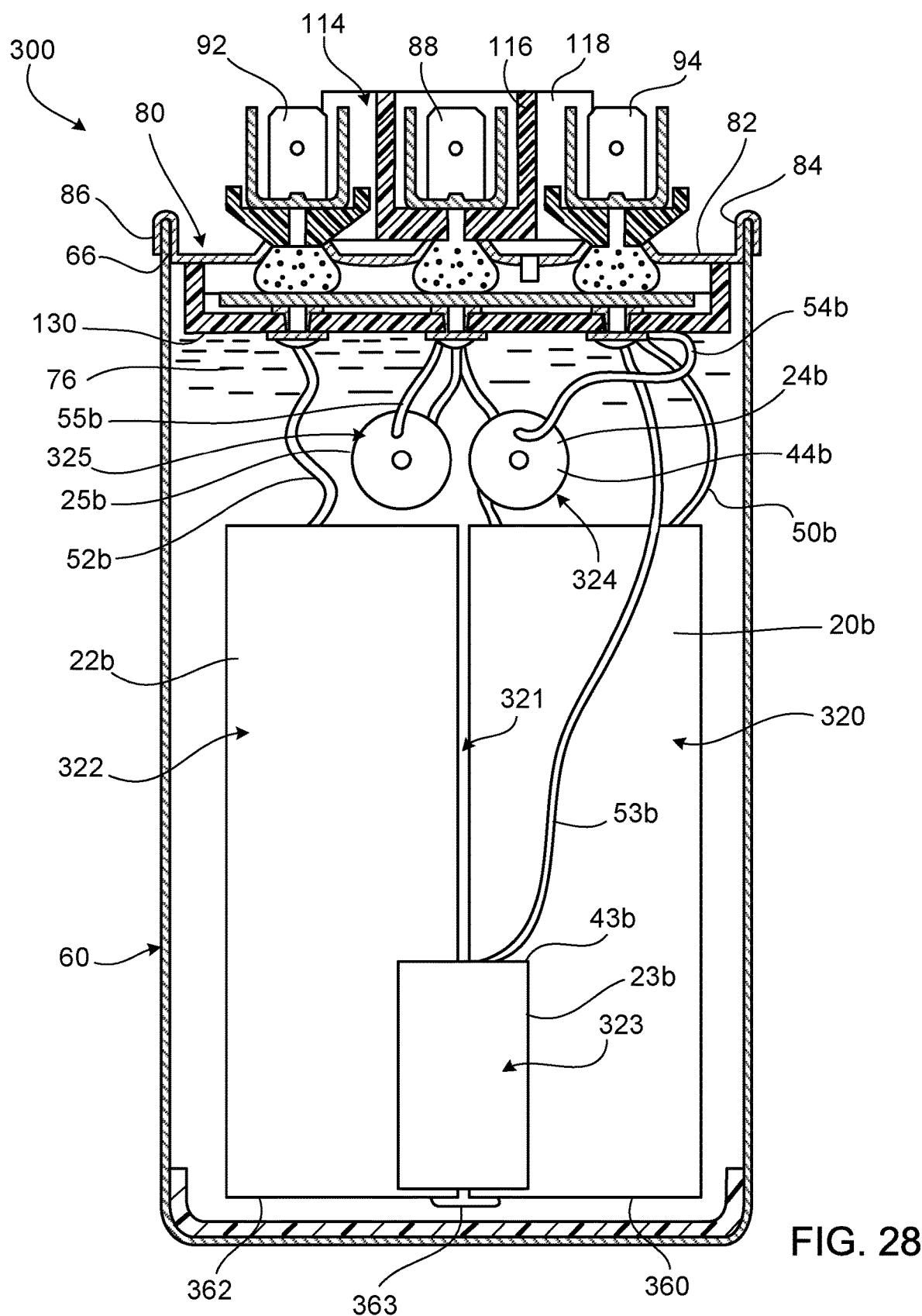
FIG. 28 is a sectional view of a capacitor according to the invention herein.

Another capacitor 200 according to the invention herein is illustrated in FIGS. 26-28. The capacitor 200 has the same or similar external appearance and functionality as capacitor 10, and is adapted to replace any one of a large number of capacitors with the capacitor 200 connected to provide the same capacitance value or values of a failed capacitor.

The capacitor 200 is characterized by a capacitive element 212 having two wound cylindrical capacitive elements 214 and 216 stacked in axial alignment in case 60. The first wound cylindrical capacitive element 214 provides three capacitor sections 20a, 22a and 23a, and the second wound cylindrical element 216 provides an additional three capacitive sections 21a, 24a and 25a. These capacitor sections correspond in capacitance value to the capacitor sections 20-25 of capacitor 10, i.e. capacitor sections 20 and 20a have the same capacitance value, capacitor sections 21 and 21a have the same capacitance value, etc.

The wound cylindrical capacitive element 214 has a central spool or mandrel 228, which has a central opening 229. First and second dielectric films, each having metalized layer on one side thereof, are wound in cylindrical form on the mandrel 228 with the non-metalized size of one film being in contact with the metalized side of the other. Selected portions of one or both of the metalized layers are removed in order to provide multiple sections in the wound cylindrical capacitive element. Element insulation barriers 230 and 231 are inserted into the winding to separate the capacitor sections, the element insulation barriers also assuming a cylindrical configuration, with the element insulation barrier 230 separating capacitor sections 20a and 22a, and element insulation barrier 231 separating capacitor sections 22a and 23a. Zinc or other metal spray is applied between the barriers to form section terminals 40a, 42a and 43a at one end of wound cylindrical capacitive element 214, and first common element terminal 36a.

The second wound cylindrical capacitive element 216 is similarly formed, on a mandrel 226 with central opening 227, providing three capacitor sections 21a, 24a and 25a, with insulation barriers 232 and 233 separating the sections. The insulation barriers may be as described above with respect to capacitive element 12, i.e. polypropylene barriers sufficient to withstand heat from adjacent soldering without loosing the integrity of electrical insulation. The capacitor sections 21a, 24a and 25a are also metal sprayed to form section terminals 41a, 44a and 45a with capacitance values respectively corresponding to sections 41, 44 and 45 of capacitive element 12.

Element common terminal 36a' is also formed. Element common terminal 36a of wound cylindrical capacitive element 214 connects the sections 20a, 22a and 23a thereof, and an element common terminal 36a' of wound cylindrical capacitive element 216 electrically connects the capacitor sections 21a, 24a and 25a. The element common terminals 36a and 36a' are connected by a foil strip 236, wherein they become the common terminal for all capacitor sections. The wound cylindrical capacitive elements 214 and 216 are stacked vertically in the case 60, with the common element terminals 36a, 36a' adjacent to each other such that any contact between these common element terminals is normal and acceptable because they are connected as the common terminal for all capacitor sections. An insulator cup 270 is positioned in the bottom of case 60, to protect element section terminals 21a, 24a and 25a from contact with the case 60 and a post 272 keeps the wound cylindrical elements 214 and 216 aligned and centered in case 60.

Conductors 50a-55a, preferably in the form of six insulated foil strips or insulated wires, each have one of their respective ends soldered to corresponding element section terminals 20a-25a, and have their other respective ends connected to the corresponding terminal posts of pressure interrupter cover assembly 80. One of the element common terminals 36a, 36a' is connected to the common cover terminal post 122 by conductor 38a. When the conductors are foil strips, all of the conductors may be connected as described above with respect to the foil strip 38, and if the conductors are insulated wire conductors they may be connected as described above with respect to the insulated wires 50-55. The case 60 is filled with an insulating fluid 76.

The length L of the two wound cylindrical capacitives 214 and 216, i.e. the length of the mandrels 226 and 228 on which the metalized dielectric sheet is wound, is selected in part to provide the desired capacitance values. The outer capacitor sections having the greater circumferencial dimension contain more metalized dielectric film than the capacitor sections more closely adjacent to the mandrels, and therefore provide a larger capacitance value. Thus, the longer wound cylindrical capacitive element 214 provides the 25 microfarad capacitor section 20a and the 10 microfarad capacitor section 22a, with the 5.5 microfarad capacitor section 23a adjacent mandrel 238. The shorter wound cylindrical capacitive element 216 provides the 20 microfarad capacitor section 21a, the 4.5 microfarad capacitor section 24a and the 2.8 microfarad capacitor section 25a.

A capacitive element 212 made up of two wound cylindrical capacitive elements 214 and 216 therefore provides the same capacitance values in its various capacitor sections as capacitive element 12 and, when connected to the cover section terminals 90-95, may be connected in the same way as described above with respect to the capacitor 10 and to provide the same replacement capacitance values shown in the charts of FIGS. 19-23.

With reference to FIGS. 28-30, another capacitor 300 is shown, also having the same or similar exterior appearance as the capacitor 10 and having the same functionality and replacing failed capacitors of varying values. The capacitor 300 includes case 60 and pressure interrupter cover assembly 80, and the capacitor 300 is characterized by a capacitive element provided in six separate wound cylindrical capacitive elements 320-325, each wound cylindrical capacitive element providing one capacitor section 20b-25b of the total capacitive element 312.

Accordingly, the capacitive element includes a first wound cylindrical capacitive element 320 which provides a capacitive section 20b, preferably having a capacitance value of 25 microfarads. The capacitive section 20b has a section terminal 40b which is connected by conductor 50b to section cover terminal 90 of the cover assembly 80, and has bottom common terminal 360. Wound cylindrical capacitor element 321 provides the capacitor section 21b having a value of 20 microfarads, having a section terminal 41b connected to the cover section terminal 91 by a conductor 51b. This section also has a bottom terminal 361. Similarly, a wound cylindrical capacitive element 322 provides the capacitor section 22b of capacitance value 10 microfarads, with section terminal 42b connected to the corresponding section cover terminal 92 by conductor 52c, and has a bottom terminal 362. Wound cylindrical capacitive element 325 provides capacitor section 25b having sectional terminal 45b connected to the section cover terminal 95 by insulated wire conductor 55b. It also has a bottom terminal 325. The wound cylindrical capacitive element 325, providing only 2.8 microfarads of capacitance value, is quite small compared to the wound cylindrical capacitive elements 320, 321 and 322.

The four wound cylindrical capacitive elements 320, 321, 322 and 325 are oriented vertically within the case 60, but provide sufficient head room to accommodate two additional wound cylindrical capacitive elements 323 and 324, which are placed horizontally under the cover assembly 80. The wound capacitive element 323 provides capacitor section 23b, preferably having a value of 4.5 microfarads, and the wound cylindrical capacitive element 324 provides capacitor section 24b having a value of 5.5 microfarads. These capacitor sections have, respectively, section terminals 43b and 44b connected to cover terminals 93 and 94 by conductors 53b and 54b and bottom terminals 323 and 324.

All of the bottom terminals 320-325 are connected together to form common element terminal 36b, and are connected to the common cover terminal 88. As best seen in FIG. 29, the bottom terminals 320, 321, 322 and 325 of the capacitor sections 20b, 21b, 22b and 25b are connected together by strips soldered or welded thereto, these strips providing both an electrical connection and a mechanical connection holding the assemblies together. Additionally, they may be wrapped with insulating tape. An insulated foil strip 38b connects the aforesaid bottom terminals to the common cover terminal. The bottom terminals 323 and 324 of capacitor sections 23b and 24b are also connected together, and are further connected to the common cover terminal by an insulated foil strip 38b'.

The wound cylindrical capacitive elements 320-325 are placed in case 60 with an insulating fluid 76. The capacitor 300 may be used in the same way as described above with respect to capacitor 10, to provide selected replacement values for a large number of different failed capacitors.

It will be noted that the wound cylindrical capacitive elements 320-325 occupy less space in the case 60 than the single wound cylindrical capacitive element 12 of capacitor 10. This is achieved by using thinner dielectric film wherein the capacitance values can be provided in less volume; however, the voltage rating of the wound cylindrical capacitive elements 320-325 is correspondingly less because of the thinner dielectric material. Thus, the capacitors made with this technique may have a shorter life, but benefit from a lower cost of manufacture.

Referring to FIG. 31(a)-(c), a capacitor 400 is presented that includes an elliptical-shaped case 402 (e.g., an oval-shaped case), which is partially shown in the exploded perspective view of FIG. 31(a). The capacitor 400 provides a similar functionality as the capacitor 10, and is adapted to replace any of the a large number of capacitors with the capacitor 400 being connected to provide a substantially similar (or equivalent) capacitance value or values of one or more failed capacitors. The capacitor 400 may include one or more of the design aspects, features, materials, etc. employed by the capacitors presented and described with respect to FIGS. 1-30. In this arrangement, the capacitor 400 includes two wound cylindrical capacitive elements 404 and 406 that are stacked on their respective sides such that the longitudinal axes of the elements are substantially parallel to each other. In some arrangements, the corresponding portions of each element's side may come into contact; although the sides of the elements may be separated by a distance in some arrangements (e.g., through the use a spacing device, a bracket, etc.). This positioning of the capacitive elements 404 and 406 may depend upon (or even defined in part by) the dimensions of the elliptically-shaped case 402. For example, due to the diameter, height, cylindrical shape, etc. of the capacitive elements, the geometry of the case 402 may constrain the layout of the components. However, in some arrangements one or more dimensions of a similarly elliptically-shaped case (e.g., an oval-shaped case) may adjusted (e.g., increased) to allow the capacitive elements to be positioned differently. For example, one or both of the capacitive elements may be rotated (with respect to their longitudinal axis by 90°) such that each element is vertically oriented (in comparison to the horizontal orientation illustrated in the figure). The manner in which the capacitive elements may be stacked amongst themselves may also be adjusted. For example, pairs of elements may be stacked end-to-end (a vertical stack) rather than side-by-side as shown in the figure.

In general, the capacitor 400 provides a functionality that is similar to the capacitor 10 and can be considered as being adaptable to replace any one of a large number of capacitors (with the capacitor 400) to provide the same capacitance value or values of a failed capacitor. Each of the capacitive elements 404 and 406 of the capacitor 400 can be implemented by using one or more production techniques, such as being wound elements like the two wound cylindrical capacitive elements 214 and 216. In this example, each of the capacitive elements 404 and 406 provide two capacitor sections, however in some arrangements either or both of the capacitive elements may provide more or less capacitive sections. Each capacitor section has a capacitance value that may be equivalent or different. In one arrangement, each of the capacitive elements may be used to provide the same pair of capacitance values. For example, capacitive element 404 may provide a 1.5 microfarads capacitance value and 5.0 microfarads capacitance, and, capacitive element 406 may similarly provide a 1.5 microfarads capacitance value and 5.0 microfarads capacitance. Other capacitance values may be provided either or both of the capacitive elements 404 and 406 (e.g., including values that are greater or less than values mentioned above), thereby providing a range of values. For example, the combined capacitance values provided by the capacitive elements may range from single digits (e.g., 1 microfarad) to two and three digits (e.g., tens or even hundreds of microfarads).

Similar to capacitive element 214, each of the capacitive elements 404 and 406 has a central spool or mandrel, which has a central opening. First and second dielectric films, each having a metalized layer on one side thereof, are wound in cylindrical form on the mandrel with the non-metalized side of one film being in contact with the metalized side of the other. Selected portions of one or both of the metalized layers are removed in order to provide multiple sections in the wound cylindrical capacitive element. Element insulation barriers (similar to barriers 230 and 231 shown in FIG. 25) may be inserted into the winding to separate the capacitor sections, the element insulation barriers also assuming a cylindrical configuration. Zinc or other metal spray may be applied between the barriers to form section terminals at one end of each of the wound cylindrical capacitive elements 404 and 406, along with a common element terminal for each capacitive element. The insulation barriers may be produced for a variety of materials such as polypropylene to withstand heat from soldering or other activities without losing the integrity of electrical insulation. Capacitor sections may also be metal sprayed to form section terminals.

In some arrangements capacitive elements may be adjusted to occupy more or less space. This may be achieved by using thinner dielectric film wherein the capacitance values can be provided in less volume; however, the voltage rating of the wound cylindrical capacitive elements may be correspondingly less due to the thinner dielectric material. Thus, the capacitors made with this technique may have a shorter life, but benefit from a lower cost of manufacture.

The common terminal of each capacitive element 404 and 406 respectively connects the sections of the corresponding element. In some arrangements, the element common terminals of the two capacitive elements 404 and 406 are connected using one or more conductors (e.g., foil strip(s), wire(s), etc.), wherein they become the common terminal for all capacitor sections. In some arrangements, an insulator cup 408 (e.g., similar to the insulator cup 270 shown in FIG. 25) is positioned in the bottom of the elliptically-shaped case 402, to protect the elements such as the lower positioned capacitive element 406 (and potentially other portions of the elements such as section terminals) from contact with the case. One or more mechanical mechanisms such as a bracket, a post, etc. may keep one or both of the wound cylindrical elements 404 and 406 in proper alignment.

Conductors, preferably in the form of insulated foil strips or insulated wires, each have one of their respective ends soldered to corresponding element section terminals and have their other respective ends connected to the corresponding terminal posts of a cover assembly such as a cover assembly 410. In some arrangements, the cover assembly 410 can assist in providing the functionality of a pressure interrupter, as described above. Typically a common terminal of each element is connected to a common cover terminal post by one or more conductors. The conductors may be foil strips, insulated wire conductors, etc., and one or more connection techniques may be employed. In some arrangements the case 402 may be filled with an insulating fluid (such as insulating fluid 76), however in some arrangements, an insulating fluid may not be used.

Geometry (length, shape, etc.), dimensions (e.g., length, diameter, etc.), etc. of either or both of the two wound cylindrical capacitive elements 404 and 406 may be selected in part to provide the desired capacitance values. The outer capacitor sections generally have greater circumferential dimension and contain more metalized dielectric film compared to the capacitor sections more closely adjacent to the mandrels, and therefore provide a larger capacitance value.

Each capacitive section has a section terminal which is connected by conductor to a corresponding one of the section cover terminals 412, 414 and 416 of the cover assembly 410, and has a bottom common terminal. Each of the bottom terminals of the capacitive elements 404, 406 are connected together to form a common element terminal, and is connected to the common cover terminal 418. The bottom terminals of the capacitor sections may be connected together by strips soldered, welded, etc., with these strips providing both an electrical connection and a mechanical connection holding the assemblies together. Additionally, they may be wrapped with insulating tape. An insulated foil strip may connect the bottom terminals to the common cover terminal 418.

As similarly illustrated in FIG. 10, each cover terminal (such as cover terminal 412) includes a number of upstanding blades (e.g., two blades) mounted on the upper end of a terminal post. The terminal post has a distal end, opposite the blades. The cover assembly 410 has an opening for accommodating the terminal post, and the opening may be formed of one or more shapes and include a variety of features such as a beveled lip that surrounds the opening.

Referring to FIG. 32(a)-(c), perspective views of the capacitor 400 are presented that show both the internal components of the capacitor (e.g., the capacitive elements 404 and 406) and portions of the elliptically-shaped case 402. In particular, FIG. 32(a) presents a front view of the capacitor 400 while FIGS. 32(b) and (c) present left side and right side views of the capacitor 400. By representing the elliptically-shaped case as being somewhat transparent, the electrical connections between components are also presented. In this particular arrangement, a conductor 420 is used to connect a portion of capacitive element 404 and a portion of capacitive element 406 to connect capacitors in parallel to provide one capacitance value. A connector 422 then connects the parallel-connected capacitors to the cover terminal 412. Connectors 424 and 426 respectively connect individual capacitor sections of the capacitive elements 404 and 406 to the respective cover terminals 414 and 416. For a common connection, a connector 428 connects the respective common terminal of each capacitive element 404 and 406 to the common cover terminal 418. As mentioned above, one or more types of techniques may be employed for establishing the electrical connections, for example, one or more of the connectors may be electrical wires, metallic film, etc.

Figure 33B:
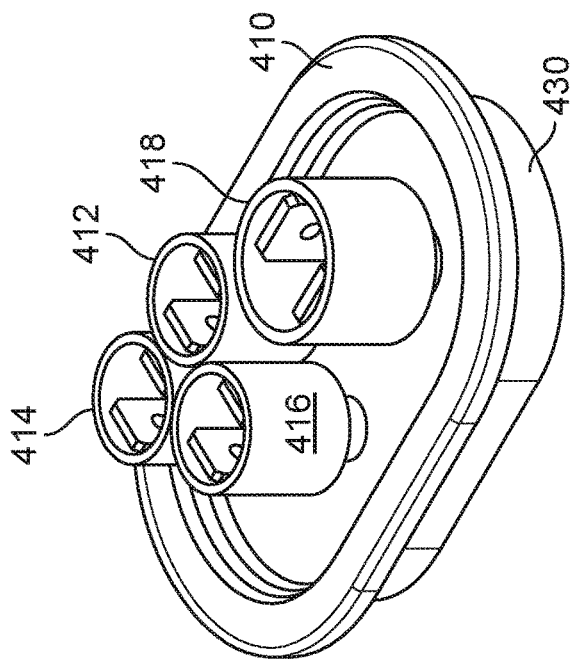
FIG. 33(a)-(c) illustrates views of a cover assembly for an elliptically-shaped case.
Figure 33C:
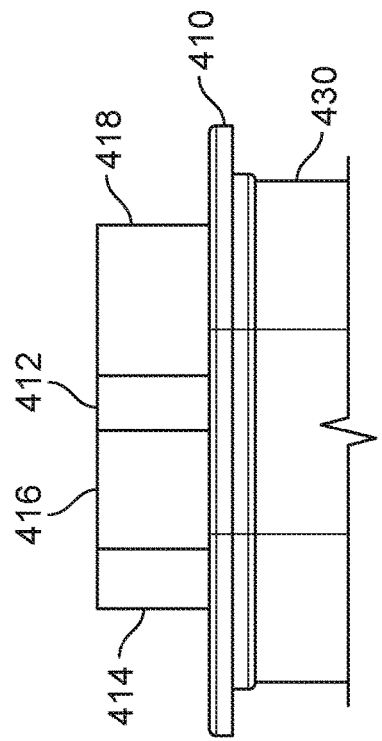
Figure 33A:
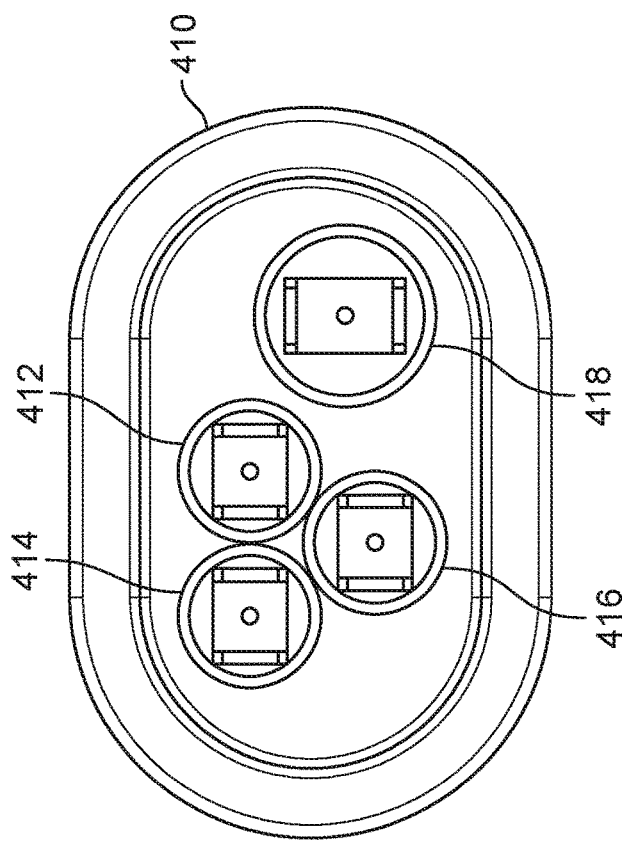

Referring to FIG. 33(a)-(c), three perspective views are provided for the cover assembly 410, which includes the three cover terminals 412, 414 and 416 along with the common cover terminal 418. With reference to FIGS. 3, 9 and 10, the cover assembly 410 may include a disconnect plate 430 that may be produced from a rigid insulating material, such as a phenolic. The disconnect plate 430 may include openings to accommodate the distal ends of the terminal posts for the cover terminals (e.g., the cover terminals 412, 414 and 416, the common cover terminal 418). The disconnect plate 430 may be provided with raised guides, such as linear guides and dimple guides, generally adjacent the openings accommodating the distal ends of terminal posts.

To provide protection to the capacitor 400, the cover assembly 410 may provide the functionality of a pressure interrupter. For example, if one or more of the capacitive elements 404, 406, or a portion of either or both elements were to fail; the elliptically-shaped cover of the cover assembly (or a portion of the cover) may deform upwardly due to outgassing of the failed element or elements. When deformed, the terminal posts are generally displaced upwardly from the disconnect plate 430, and the connection (e.g., a weld connection) between one or more terminals and the capacitive elements 404, 406 are broken.

In this particular arrangement, the cover terminals 412, 414 and 416 are positioned on the cover assembly 410 to form triangular-shaped group. The common cover terminal 418 is positioned at a location that can be considered slightly separated from the triangular-shaped group of the cover terminals 412, 414 and 416. Similar to the presented layout, other layouts, patterns, designs etc. may be employed to position the cover terminals and the common cover terminal upon the cover assembly. For example, the cover terminals 412, 414 and 416 may be positioned to generally surround the common cover terminal 418 in a manner similarly illustrated in FIG. 1 and FIG. 2, for example. In some arrangements one or more insulator techniques and mechanisms may be incorporated into the cover assembly 410. For example, and with reference to FIGS. 1 and 2, the cover assembly 410 may include an insulator barrier capable of separating two or more of the cover terminals and/or the common cover terminal. For example, the insulator barrier may include an elongated cylindrical center barrier cup capable of surrounding one or more of the terminals (e.g., the common cover terminal 418, cover terminal 412, etc.). In some arrangements the height of the barrier cup wall may extend above the height of the surrounded terminal or terminals. Insulation may also be provided by one or more fins that may extend between two or more terminals. For example, similar to the fins presented in FIGS. 1 and 2, fins may extend respectively radially outwardly from an elongated center barrier cup such that they are deployed between adjacent terminals (e.g., cover terminals). In some arrangements the height of the fins may extend above the height of the corresponding terminals, however, fins may also be employed that to not fully extend above the height of one or more of the terminals.

The elliptical shape of the cross section of the capacitor's case and the cover assembly may both approximately share a common ellipse shape. In general, the ellipse shape can be considered a curve on a plane surrounding two focal points such that a straight line drawn from one of the focal points to any point on the curve and then back to the other focal point has the same length for every point on the curve. An ellipse shape can also be considered as the set of points such that the ratio of the distance of each point on the curve from a given point (called a focus or focal point) to the distance from that same point on the curve to a given line (called the directrix) is a constant, referred to as the eccentricity of the ellipse. A circle can be considered as having an ellipse shape in which both focal points are positioned at the same location. The shape of an ellipse (e.g., how 'elongated' it is) is represented by its eccentricity which for an ellipse can be represented by any number from 0 (the limiting case of a circle) to arbitrarily close to but less than 1, for example. Ellipses can also be considered a closed type of conic section: a plane curve formed from the intersection of a cone by a plane.

Referring to FIG. 34, a schematic diagram of one potential arrangement for the circuitry of the capacitor 400 is presented. In this example, the capacitive elements are each produced to include two capacitor sections that correspondingly provide two capacitance values. In some arrangements, one or both of the capacitive elements may be used produced to provide more or less than two capacitive values. For example, on one potential arrangement, the capacitive element 404 may provide three capacitance values and capacitive element 406 may provide one capacitance value. Rather than providing a total of four capacitive values between the two capacitive elements 404, 406, more or less capacitive values may be provided. Further, while two capacitive elements 404, 406 are employed in this example, more or less capacitive elements may be used to provide capacitive values for a capacitor.

In this particular example, each of the capacitive elements 404, 406 provide equivalent capacitance values (e.g., 1.5 microfarad and 5.0 microfarad); however in some arrangements the elements may provide only one common value or entirely different capacitance values. The capacitance values provided by the capacitive elements 404 and 406 may also different in other arrangements. For example, values greater or less than 1.5 microfarads and/or 5.0 microfarads may be provided by the capacitive elements.

In this particular example, two of the cover terminals (i.e., cover terminals 414 and 416) are connected to the capacitive elements (by respective conductors 424 and 426) to each provide 5.0 microfarads (by electrically connecting to either cover terminal and the common cover terminal 418). The third cover terminal 412 is connected to both of the 1.5 microfarads capacitance values provided by the capacitive elements 404, 406. Connected in parallel, these two capacitance values combine to provide a capacitance value of 3.0 microfarads at the cover terminal 412. Along with connecting the two common sides of the capacitive elements, the conductor 428 also provides a connection to the common cover terminal 418 included in the cover assembly 410.

From the capacitance values (e.g., 1.5 microfarads and 5.0 microfarads) provided by the two capacitance elements 404 and 406, a variety of capacitance values are available from the capacitor 400. For example, by connecting the cover terminals 412, 414, 416 and the common cover terminal 418 in different variations, for example by using jumper wires, additional capacitance values may be provided. In the illustrated arrangement, along with the 5.0 microfarads capacitance provided by either of the cover terminals 414 and 416, a capacitance of 3.0 microfarad is provided by the cover terminal 412 (due the two 1.5 microfarad capacitance values connected in parallel). By connected either cover terminal 414 or 416 to the cover terminal 412 a capacitance value of 6.5 microfarad is provided (from the 1.5 microfarad capacitance value being connected in parallel with one of the 5.0 microfarad capacitance values). A capacitance value if 10.0 microfarad may be provided by connecting cover terminals 414 and 416 to place the two 5.0 microfarad capacitance values in parallel. By connecting all three of the cover terminals 412, 414, 416 a capacitance value of 13.0 microfarad is provided between the connected terminals (that connect each of the four capacitance values in parallel) and the common cover terminal 418. By adjusting the capacitance values provided by the capacitive elements 404 and 406, other levels of capacitance can be attained.

As described above, in some implementations, the capacitors described herein may be configured to provide a capacitance that is appropriate for allowing an external device (e.g., an air conditioning system, and in particular, a compressor motor of the air conditioning system) to operate in a "running" state. Such capacitors are sometimes referred to herein as "run capacitors." However, in some implementations, a different capacitance value may be more appropriate for the compressor motor when the compressor motor is started (e.g., powered on from an unpowered state). Thus, in some implementations, a separate second capacitor may also be connected to the compressor motor and configured to provide an appropriate capacitance value for allowing the compressor motor to start. Such capacitors are sometimes referred to herein as "start" capacitors, "hard start" capacitors, "easy start" capacitors, "motor start" capacitors, etc. In such implementations, the start capacitor provides an appropriate capacitance for allowing the compressor motor to start, and the run capacitor provides an appropriate capacitance for allowing the compressor motor to continue running.

In some implementations, the run capacitor may become disconnected from the compressor motor or may fail (e.g., due to reaching its expected (e.g., rated) end of life, or for other reasons). In such situations, it may be beneficial for the start capacitor to be disconnected from the compressor motor. In other words, it may be beneficial for the circuit that includes the start capacitor and the compressor motor to be broken, for example, by severing at least an electrical ground connection. For example, the capacitance provided by the start capacitor may continue to cause compressor motor to operate the compressor motor. In such situations, the compressor motor would be running without a run capacitor, and the capacitance provided by the start capacitor may be unsuitable for continuous prolonged use by the compressor motor in its running state. In some implementations, the capacitance value provided by the start capacitor may cause the compressor motor to fail (e.g., "burn out") after prolonged use due to excessive current draw and overheating. In some implementations, the excessive current draw and overheating may cause the compressor motor to shut off due to a thermal overload switch. However, even with the protection of the thermal overload switch, the compressor motor may continue to be power cycled due to the start capacitance provided by the start capacitor. To avoid damage to and/or repeated power cycling of the compressor motor, the start capacitor may be connected to the compressor motor in such a way that the start capacitor is automatically disconnected from the compressor motor when the run capacitor is no longer connected to the compressor motor. As such, the start capacitor will not cause the compressor motor to restart and/or to continue to run by using the capacitance provided by the start capacitor in place of the now disconnected run capacitor until/unless the run capacitor is replaced and the electrical connection between the compressor motor and the start capacitor is reestablished.

Figure 35:
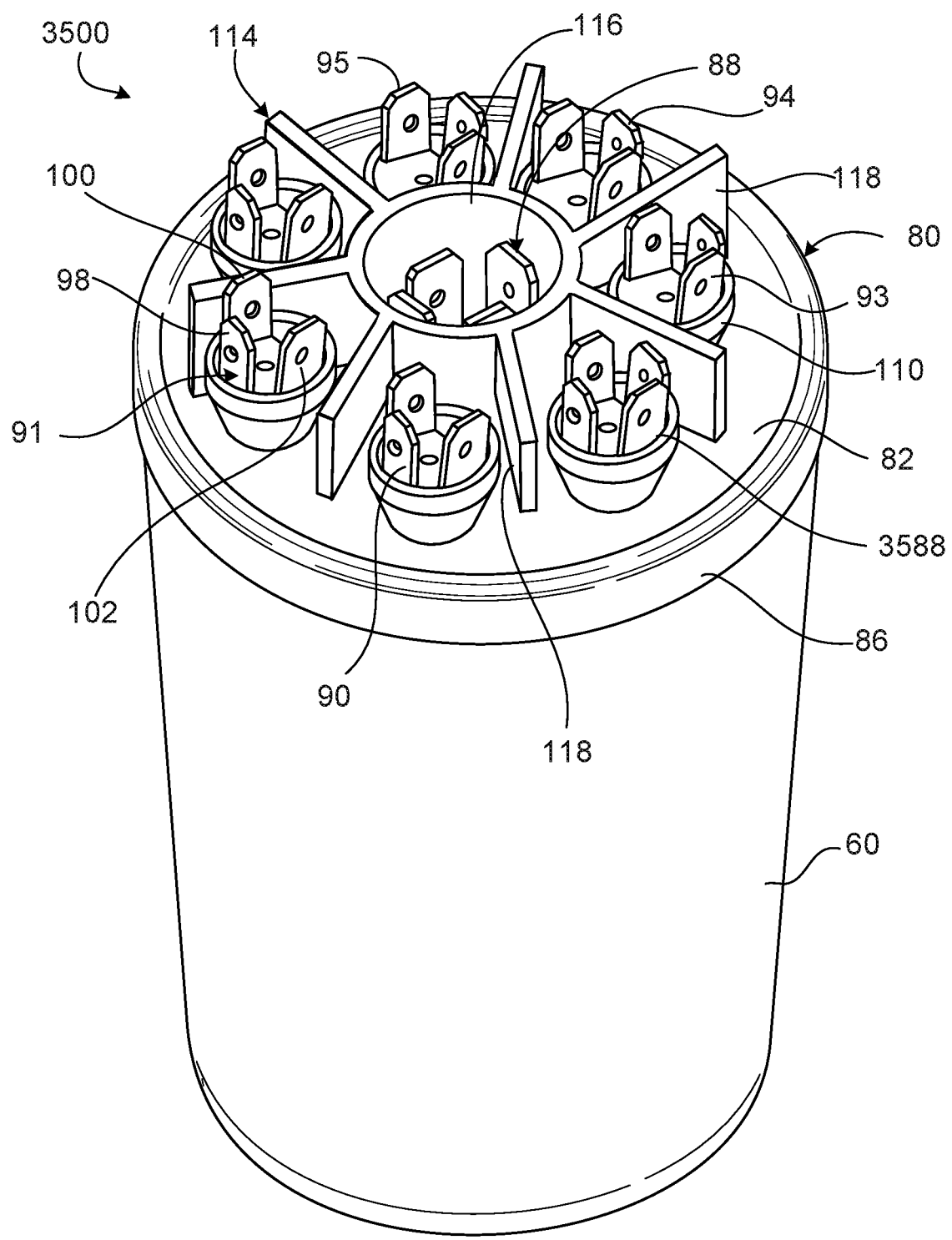
FIG. 35 shows a perspective view of an example of a run capacitor that is configured to accept an electrical connection to a start capacitor.
Figure 36:
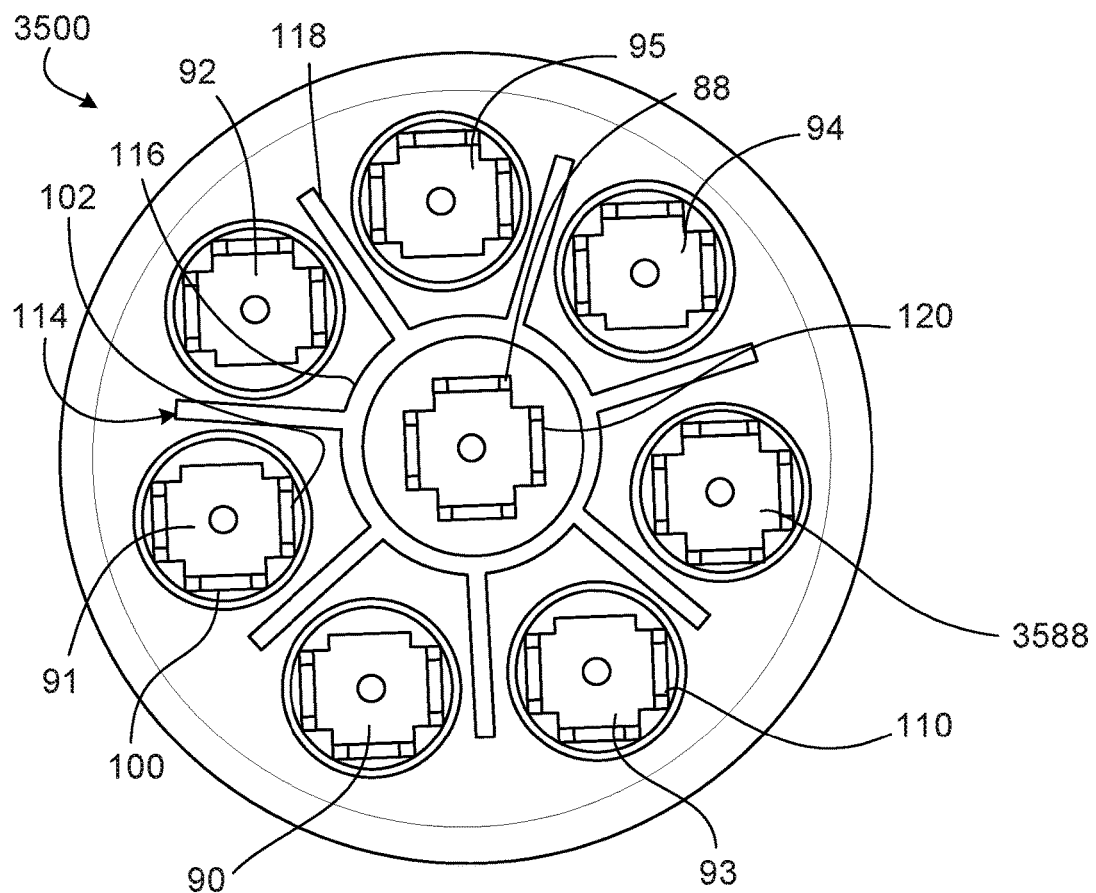
FIG. 36 shows a top view of the run capacitor of FIG. 35.

FIGS. 35 and 36 show a perspective view and a top view, respectively, of an example of a run capacitor 3500 that is configured to allow at least one connection to a start capacitor. The connection to the start capacitor may be such that when the run capacitor 3500 is disconnected from the external system (e.g., the compressor motor of an air conditioning system), the start capacitor is likewise disconnected. When we say "disconnected," we mean electrically disconnected such that the capacitor is no longer able to provide a capacitance to the compressor motor. In other words, a capacitor may still be physically connected to the compressor motor (e.g., via wires, banana clips, etc.), yet the capacitor may be electrically disconnected (e.g., due at least in part to the failure mechanism described above with respect to FIG. 24). In other words, a circuit that includes the start capacitor and the compressor motor is broken (e.g., due to an electrical ground connection between the start capacitor and the compressor motor being severed).

The run capacitor 3500 may be substantially similar in configuration and operating principles to the capacitors 10, 200, 300, 400 described above. In the illustrated example, the run capacitor 3500 is substantially similar to the capacitor 10 described above, and includes many/all of the same components as the capacitor 10, except the run capacitor 3500 further includes a second common cover terminal 3588 (and, in some implementations, additional components associated with the cover terminals such as a terminal post, as described above) that is configured to accept a connection to a start capacitor. The second common cover terminal 3588 is connected to the common cover terminal 88 (e.g., the "first" common cover terminal) underneath the cover 82 of the run capacitor 3500. The connection between the common cover terminal 88 and the second common cover terminal 3588 can occur below a disconnect plate (e.g., 130 of FIG. 24) of the run capacitor 3500, and in particular, below a location where the terminal posts are displaced upwardly. Thus, when the run capacitor 3500 fails in the manner described above with respect to FIG. 24, the start capacitor is likewise no longer connected to the compressor motor (e.g., because the circuit that includes the start capacitor and the compressor motor is broken). The second common cover terminal 3588 is sometimes referred to herein as a "booster" terminal. In some implementations, if the common cover terminal 88 is separated from the disconnect plate upon failure, neither the run capacitor 3500 nor the start capacitor are electrically connected to the compressor motor by a grounding connection. In some implementations, the second common cover terminal 3588 can also be associated with a terminal post that distends from and is disconnected from the disconnect plate upon failure, thereby severing the electrical connection between the ground of the start capacitor and the ground of the run capacitor 3500. However, in some implementations, the second common cover terminal 3588 may not require a disconnection from the disconnect plate (or even a connection to the disconnect plate in the first place) because the disconnection of the common cover terminal 88 is sufficient to break the electrical ground connection between the start capacitor and the compressor motor.

Figure 37A:
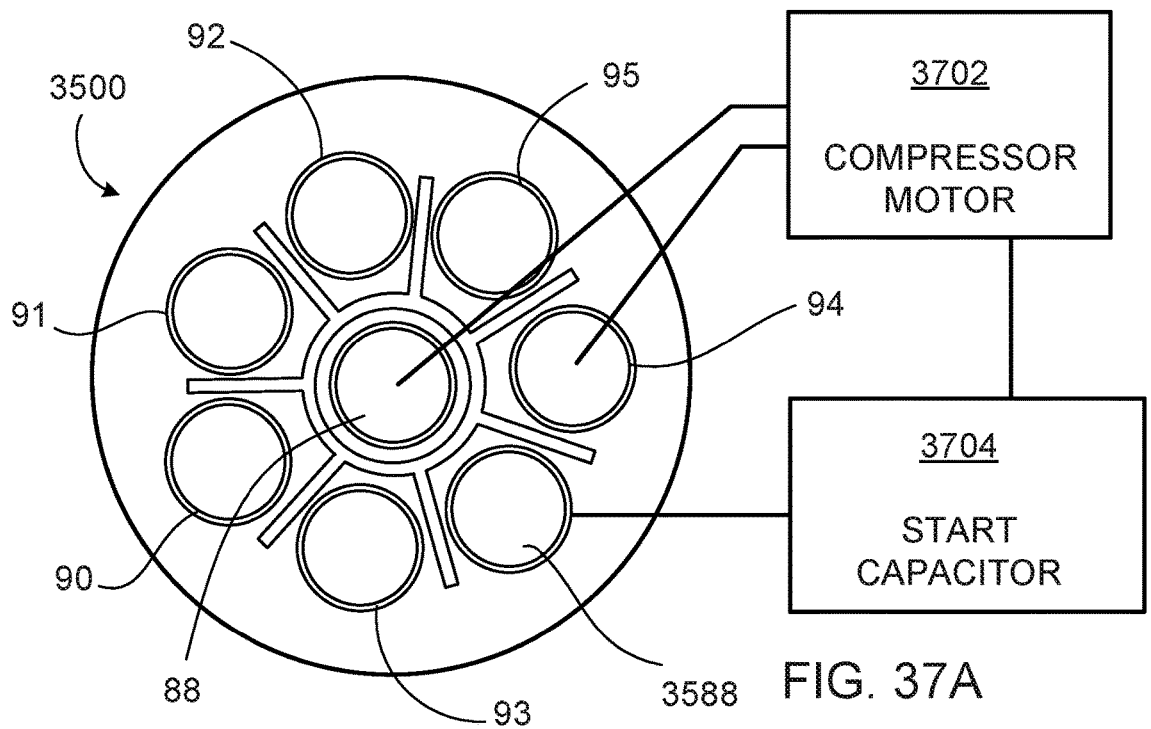
FIG. 37A shows a schematic example of the run capacitor of FIGS. 35 and 36 connected to a compressor motor and a start capacitor.

FIG. 37A shows a schematic example of the run capacitor 3500 connected to at least a compressor motor 3702 and a start capacitor 3704. In the illustrated example, the start capacitor 3704 is connected such that a first connection is made to the compressor motor 3702 (e.g., a capacitor cover terminal of the start capacitor 3704 is connected to the compressor motor 3702) and a second connection is made to the second common cover terminal 3588 of the run capacitor 3500 (e.g., a common cover terminal of the start capacitor 3704 is connected to the second common cover terminal 3588). In other words, the start capacitor 3704 is not directly grounded to the compressor motor 3702 by a direct grounding connection, but is rather connected and grounded to the compressor motor 3702 via the run capacitor 3500. In this way, a direct connection between the run capacitor 3500 and the compressor motor 3702 is required in order for the start capacitor 3704 to complete a circuit with (and provide a start capacitance to) the compressor motor 3702. As described above, the common cover terminal 88 and the second common cover terminal 3588 are connected to each other (e.g., by a conductor that resides underneath the cover 82 of the run capacitor 3500). The connection between the common cover terminal 88 and the second common cover terminal 3588 may occur beneath a disconnect plate of the run capacitor 3500 or at another location beneath a terminal post of the common cover terminal 88. Thus, if the common cover terminal 88 is disconnected from the compressor motor 3702 (e.g., physical disconnection or electrical disconnection due to failure), the ground connection between the start capacitor 3704 and the compressor motor 3702 is electrically disconnected.

Figure 37B:
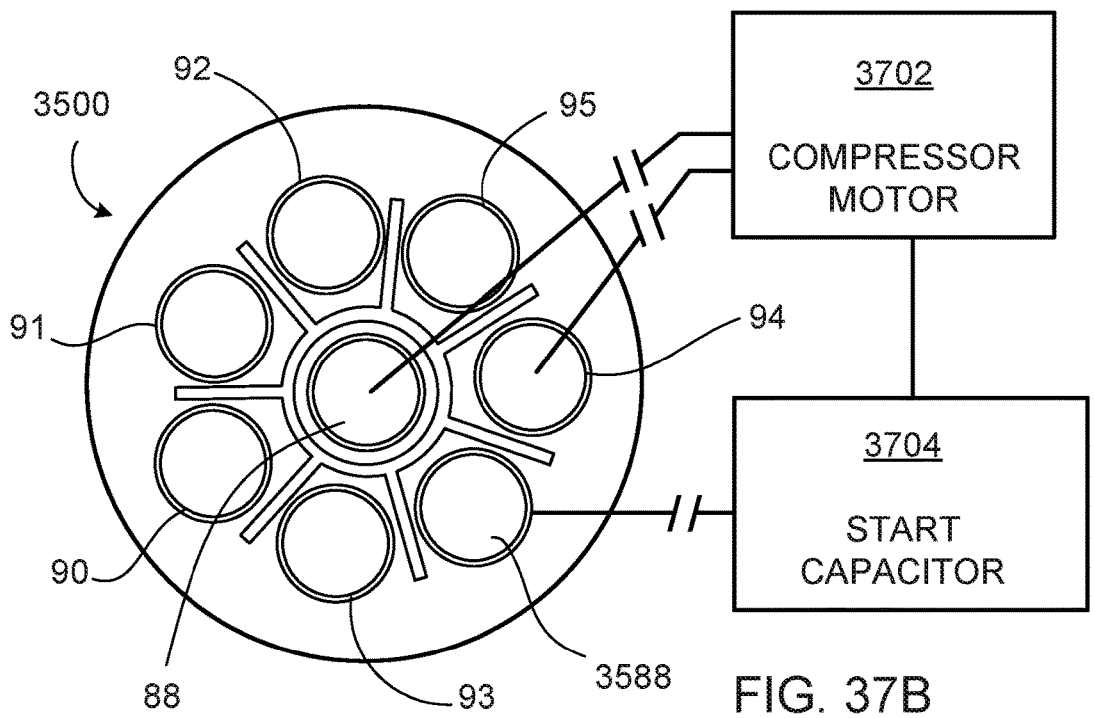
FIG. 37B shows a schematic example of the run capacitor of FIGS. 35-37A electrically disconnected from the compressor motor of FIG. 37A.

FIG. 37B shows a schematic example of the run capacitor 3500 and the start capacitor 3704 electrically disconnected from the compressor motor 3702. In the illustrated example, due to physical disconnection or failure of the run capacitor 3500, the connections between the run capacitor 3500 and the compressor motor 3702 are electrically disconnected. Likewise, because the start capacitor 3704 is connected to the second common cover terminal 3588, and because the second common cover terminal 3588 is connected to the common cover terminal 88, the ground connection between the start capacitor 3704 and the compressor motor 3702 is electrically disconnected. As described above, in some implementations, due to failure of the run capacitor 3500, the second common cover terminal 3588 may be disconnected from a ground of the run capacitor 3500 (e.g., due to a terminal post associated with the second common cover terminal 3588 being displaced from a disconnect plate of the run capacitor 3500). Thus, the start capacitance provided by the start capacitor 3704 to the compressor motor 3702 is no longer provided when the run capacitor 3500 is not electrically connected to the compressor motor 3702. As described above, damage to the compressor motor 3702 that may otherwise occur due to prolonged continuous application of the start capacitance can be reduced or avoided.

Figure 38:
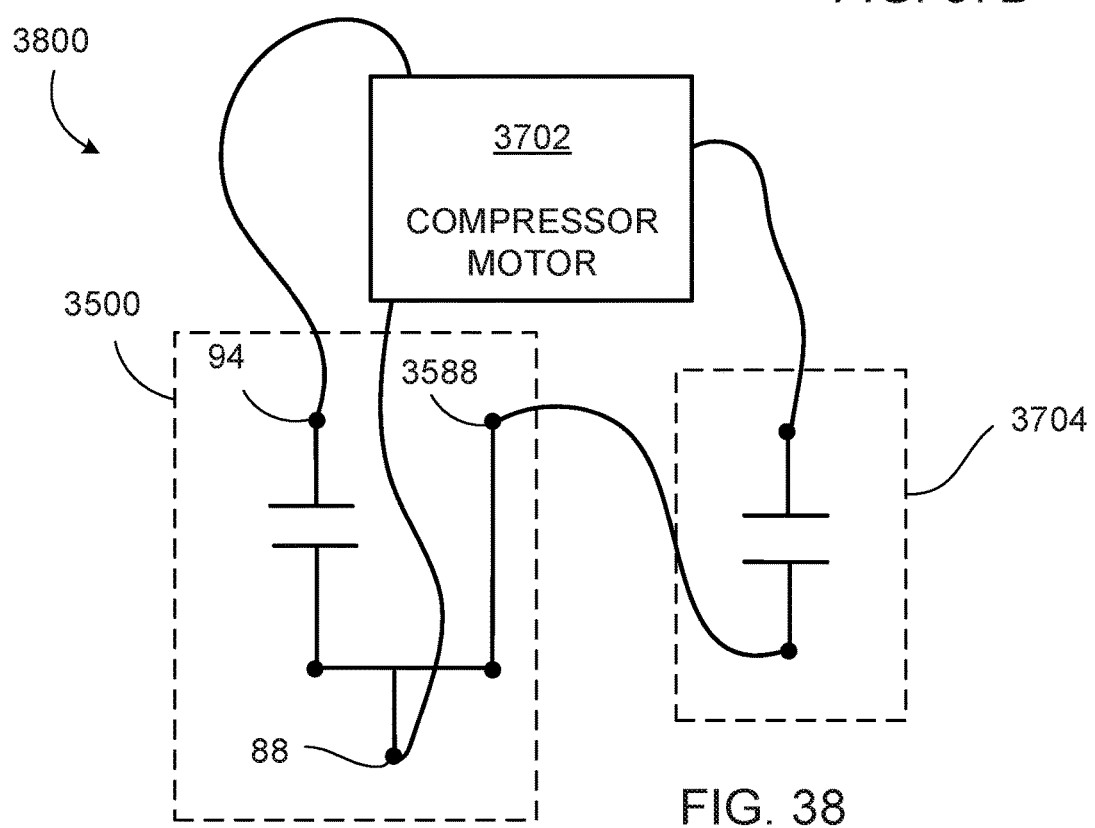
FIG. 38 shows an example of a schematic circuit diagram of the run capacitor and start capacitor connected to the compressor motor.

FIG. 38 shows an example of a schematic circuit diagram 3800 of the run capacitor 3500 and the start capacitor 3704 connected to the compressor motor 3702. The run capacitor 3500 is directly connected to the compressor motor 3702. For example, the compressor motor 3702 is directly connected to the capacitor cover terminal 94 and the common cover terminal 88 by two physical electrical connection. The start capacitor 3704 is indirectly connected to the compressor motor 3702. For example, the compressor motor 3702 is directly connected to the start capacitor 3704 by a first physical electrical connection, but a second connection between the start capacitor 3704 and the compressor motor 3702 is made via a second physical electrical connection between the start capacitor 3704 and the second common cover terminal 3588 of the run capacitor 3500. The schematic circuit diagram 3800 of FIG. 38 corresponds to the schematic arrangement illustrated in FIG. 37A. As illustrated in FIG. 37B, if the electrical connections between the run capacitor 3500 and the compressor motor 3702 are disconnected, the grounding connection of the start capacitor 3704 to the compressor motor 3702 via the second common cover terminal 3588 is likewise electrically disconnected, and damage to the compressor motor 3702 can be reduced or avoided.

While the second common cover terminal 3588 is shown and described as being positioned near an outside edge (e.g., the perimeter) of the run capacitor 3500, in some implementations, the second common cover terminal 3588 may be positioned elsewhere. For example, in some implementations, second common cover terminal 3588 may be positioned near the center of the cover 82 of the run capacitor 3500.

The run capacitor 3500 described above with respect to FIGS. 35-38 is but one example of a run capacitor that is fitted with a second common cover terminal (e.g., which is connected to a "first" common cover terminal) for allowing the start capacitor 3704 to indirectly connect to the compressor motor 3702. However, other implementations are also possible. For example, a second common cover terminal that is connected to a first common cover terminal can be implemented in any capacitor (e.g., any run capacitor, or in some implementations, any other type of capacitor, including a start capacitor) to cause a start capacitor to be disconnected from an external system upon failure of the capacitor that includes two common cover terminals. In some implementations, a second common cover terminal may be applied to a Turbo® capacitor (e.g., a Turbo® 200, Turbo® 200 X, Turbo® Mini-IM, Turbo® Mini-Oval, Turbo® APC, Turbo Easy-Start™ 5, Turbo57 RMAC™—Enhanced, DC Link, custom Turbo®, etc.), a motor-start capacitor such as a Turbolytic™, a motor-run capacitor such as a KVAR-PFC, etc. in a manner similar to that described above. In some implementations, the concept of applying a second common cover terminal in the manner described above may also be applied to a device other than a capacitor. For example, a second common cover terminal can be applied to any device that is configured to be connected to a second device in such a way that both devices are configured to be connected to a system, yet the second device is to be disconnected from the system upon disconnection of the first device from the system.

In some implementations, a capacitor with fewer capacitor cover terminals than the run capacitor 3500 of FIGS. 35-38 (e.g., fewer than the six capacitor cover terminals) may be fitted with a second common cover terminal in a manner similar to that described above. For example, a capacitor that would otherwise include one capacitor cover terminal and one common cover terminal (e.g., a "single" capacitor) may be fitted with a second common cover terminal (e.g., three cover terminals total) that allows the start capacitor 3704 to be connected thereto such that the start capacitor 3704 is indirectly connected to the compressor motor 3704. In some implementations, a capacitor that would otherwise include two capacitor cover terminals and one common cover terminal (e.g., a "dual" capacitor) or a capacitor that would otherwise include three capacitor cover terminals and one common cover terminal (e.g., similar to the capacitor 400 of FIGS. 31-34) may be fitted with a second common cover terminal that allows the start capacitor 3704 to be connected thereto.

Figure 39:
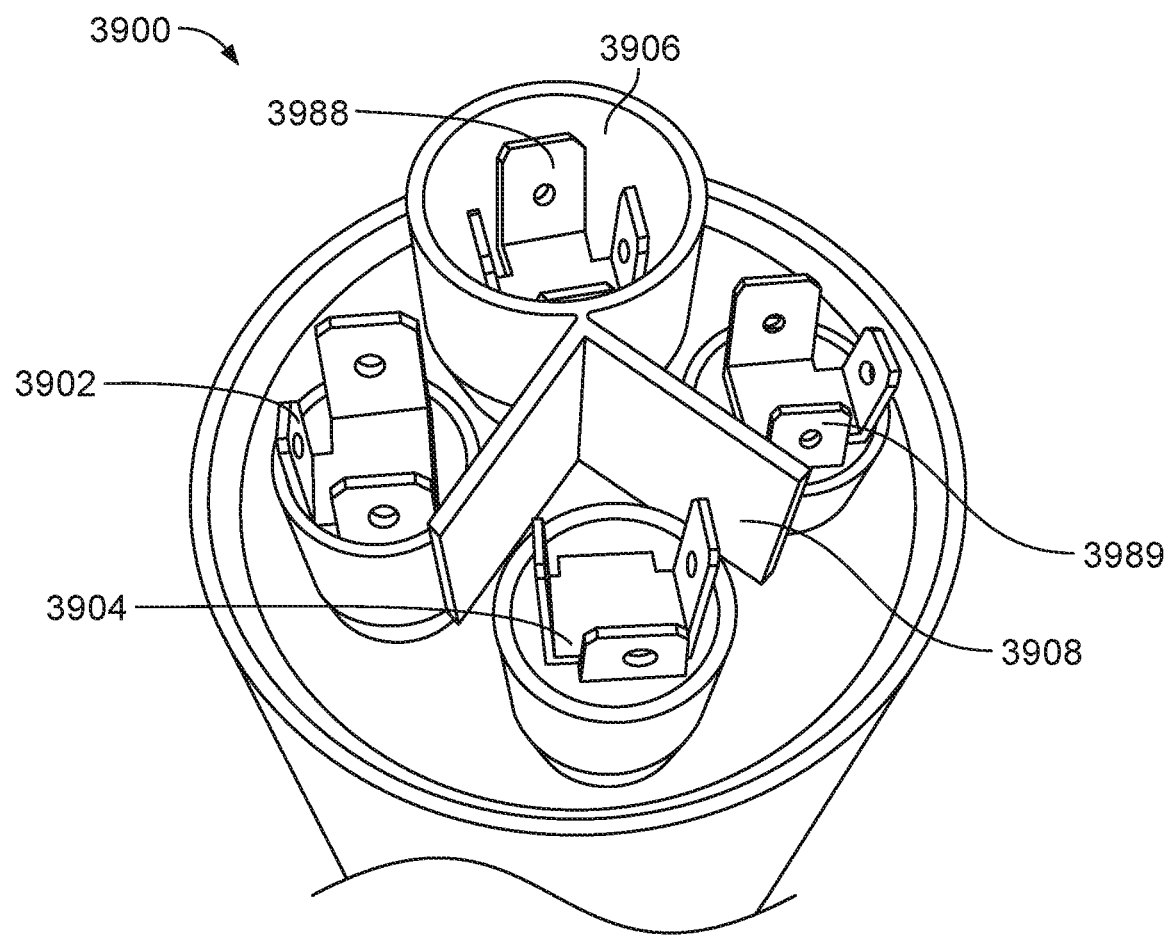
FIG. 39 shows another example of a run capacitor that is configured to accept an electrical connection to a start capacitor.

FIG. 39 shows another example of a run capacitor 3900 (e.g., a dual run capacitor) that is configured to allow at least one connection to a start capacitor (e.g., the start capacitor 3704 of FIGS. 37-38). Like the run capacitor 3500 described above, the connection between the run capacitor 3900 and the start capacitor 3704 may be such that when the run capacitor 3900 is disconnected from the external system (e.g., the compressor motor 3702 of FIGS. 37-38), the start capacitor 3704 is likewise disconnected.

The run capacitor 3900 may be substantially similar to the run capacitor 3500 described above with respect to FIGS. 35-38 (e.g., with one or more changes to account for fewer capacitor cover terminals). For example, in the illustrated example, the run capacitor 3900 includes two capacitor cover terminals 3902, 3904 each associated with at least one capacitance value, a first common cover terminal 3988 configured to provide a first grounding connection (e.g., for connection to the compressor motor 3702), and a second common cover terminal 3989 configured to provide a second grounding connection (e.g., for connection to the start capacitor 3704). Similarly as described above with respect to the run capacitor 3500 of FIGS. 35-38, the first common cover terminal 3988 is connected to the second common cover terminal 3989 underneath a cover of the run capacitor 3900. Thus, when the run capacitor 3900 is disconnected from the compressor motor 3702 or fails in the manner described above with respect to FIG. 24, the start capacitor 3704 is likewise no longer connected to the compressor motor 3702 (e.g., because the start capacitor 3704 circuit is broken).

The run capacitor 3900 includes a barrier cup 3906 surrounding and extending above blades of the first common cover terminal 3988, and at least two barrier fins 3908 that extend radially outwardly from the barrier cup 3906 such that they are deployed between adjacent ones of the capacitor cover terminals 3902, 3904 and the second common cover terminal 3989. The barrier cup 3906 and the barrier fins 3908 can provide protection against arcing or bridging contact between any of the terminals 3902, 3904, 3988, 3989. In the illustrated example, each of the capacitor cover terminals 3902, 3904 and the second common cover terminal 3989 is surrounded by an insulator cup that may also extend above blades of the respective terminal 3902, 3904, 3989. In some implementations (e.g., when the insulator cups extend above the blades), the barrier fins 3908 may be omitted. In some implementations, the first common cover terminal 3988 may also be surrounded by an insulator cup. In some implementations, rather than being surrounded by the barrier cup 3906, additional barrier fins 3908 may be provided between the first common cover terminal 3988 and the adjacent terminals 3902, 3989.

In some implementations, the techniques described above for electrically disconnecting a start capacitor from a compressor motor when a run capacitor fails can be used to safely introduce start capacitor into circuits that otherwise would not employ start capacitors. For example, a residential home and/or a boat (e.g., a yacht) may include an air conditioning system that omits a start capacitor due to the potential issues described above that may arise when a run capacitor fails. Without a start capacitor, a surge of current may be generated in the air conditioning system when powered on, which may cause lights to dim and/or other unwanted electrical occurrences. By employing a start capacitor connected to the run capacitors 3500, 3900 described above, the current surge can be reduced or eliminated. Due to the start capacitor being connected to the air conditioning system via the run capacitor as described above, upon possible electrical disconnection of the run capacitor, the start capacitor is also electrically disconnected from the air conditioning system and the air conditioning system can be prevented from powering back on, thereby preventing potential damage to the compressor motor (or other components) of the air conditioning system.

Figure 40:
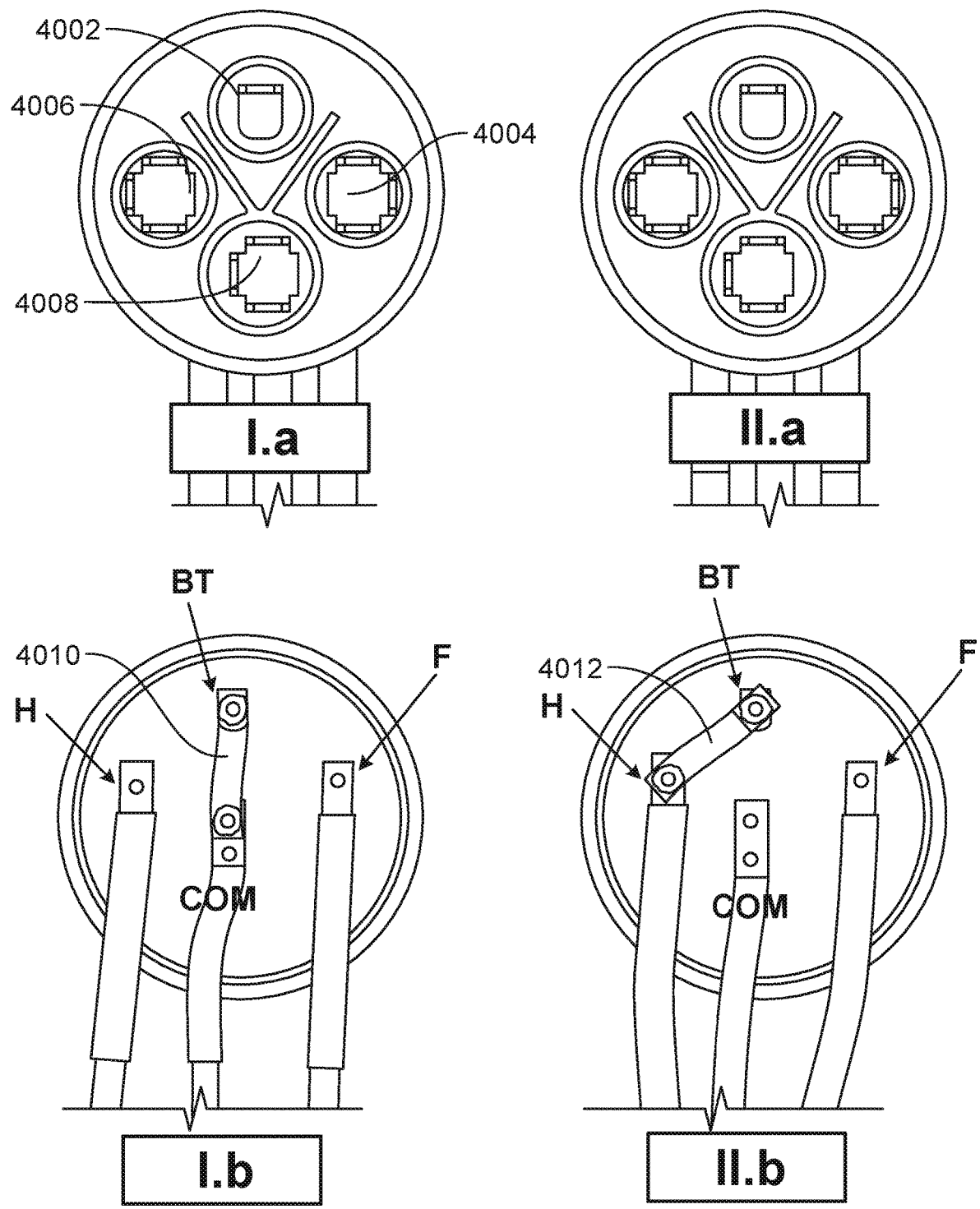
FIGS. 40-42 show examples of run capacitors that include a booster terminal.
Figure 41:
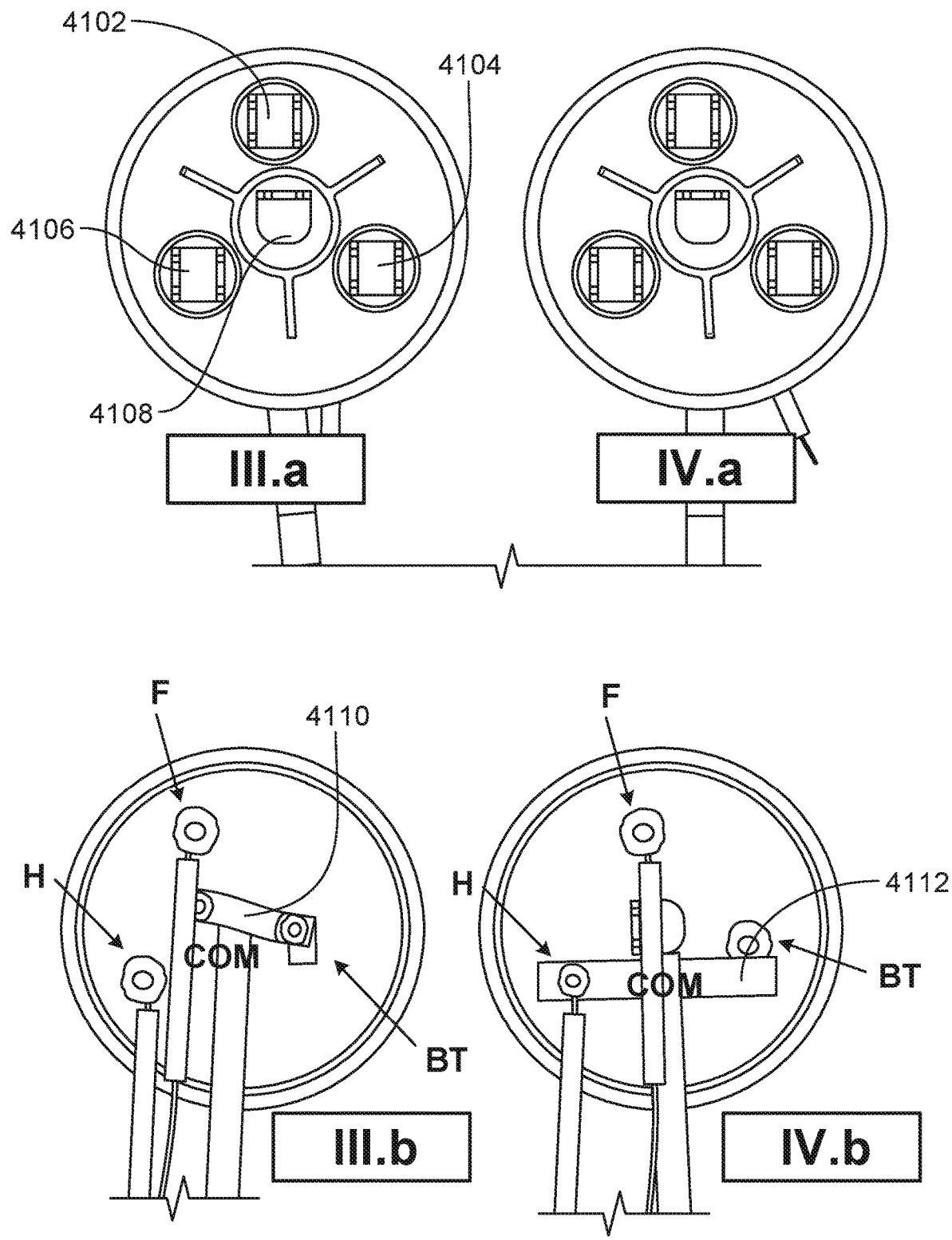

With respect to FIGS. 36-38, we described a second common terminal that is connected to the common cover terminal, e.g., underneath the cover of the run capacitor. In some implementations, the second common terminal may be connected to a terminal other than the common terminal. For example, in some implementations, the second common cover terminal may be connected to one of the capacitor cover terminals beneath the cover of the run capacitor. FIGS. 40 and 41 show an example of a run capacitor (e.g., a dual run capacitor) that is configured to allow at least one connection to a start capacitor (e.g., the start capacitor 3704 of FIGS. 37-38). Like the run capacitors described above, the connection between the run capacitor and the start capacitor may be such that when the run capacitor is disconnected from the external system (e.g., the compressor motor 3702 of FIGS. 37-38), the start capacitor is likewise disconnected.

Referring to FIG. 40, the run capacitor includes a second common terminal (e.g., sometimes referred to as a booster terminal (BT) 4002), a compressor capacitor 4004, a fan capacitor 4006, and a common terminal 4008. In variants I.a and I.b, the booster terminal 4002 is connected to the common terminal 4008 by a conductor 4010 that runs between the two terminals beneath the cover of the capacitor. This arrangement is similar to the implementations described above with respect to FIGS. 36-38. On the other hand, variants II.a and II.b show the booster terminal 4002 connected to the compressor capacitor 4004 by a conductor 4012. With the booster terminal 4002 connected to the compressor capacitor 4004, the same disconnection techniques described above can be employed for ensuring that the start capacitor is disconnected from the compressor when the run capacitor fails, as described in more detail below.

Referring to FIG. 41, the run capacitor includes a second common terminal (e.g., sometimes referred to as a booster terminal (BT) 4102), a compressor capacitor 4104, a fan capacitor 4106, and a common terminal 4108. In variants III.a and III.b, the booster terminal 4102 is connected to the common terminal 4108 by a conductor 4110 that runs between the two terminals beneath the cover of the capacitor. This arrangement is similar to the implementations described above with respect to FIGS. 36-38. On the other hand, variants IV.a and IV.b show the booster terminal 4102 connected to the compressor capacitor 4104 by a conductor 4112. With the booster terminal 4102 connected to the compressor capacitor 4104, the same disconnection techniques described above can be employed for ensuring that the start capacitor is disconnected from the compressor when the run capacitor fails.

Figure 42:
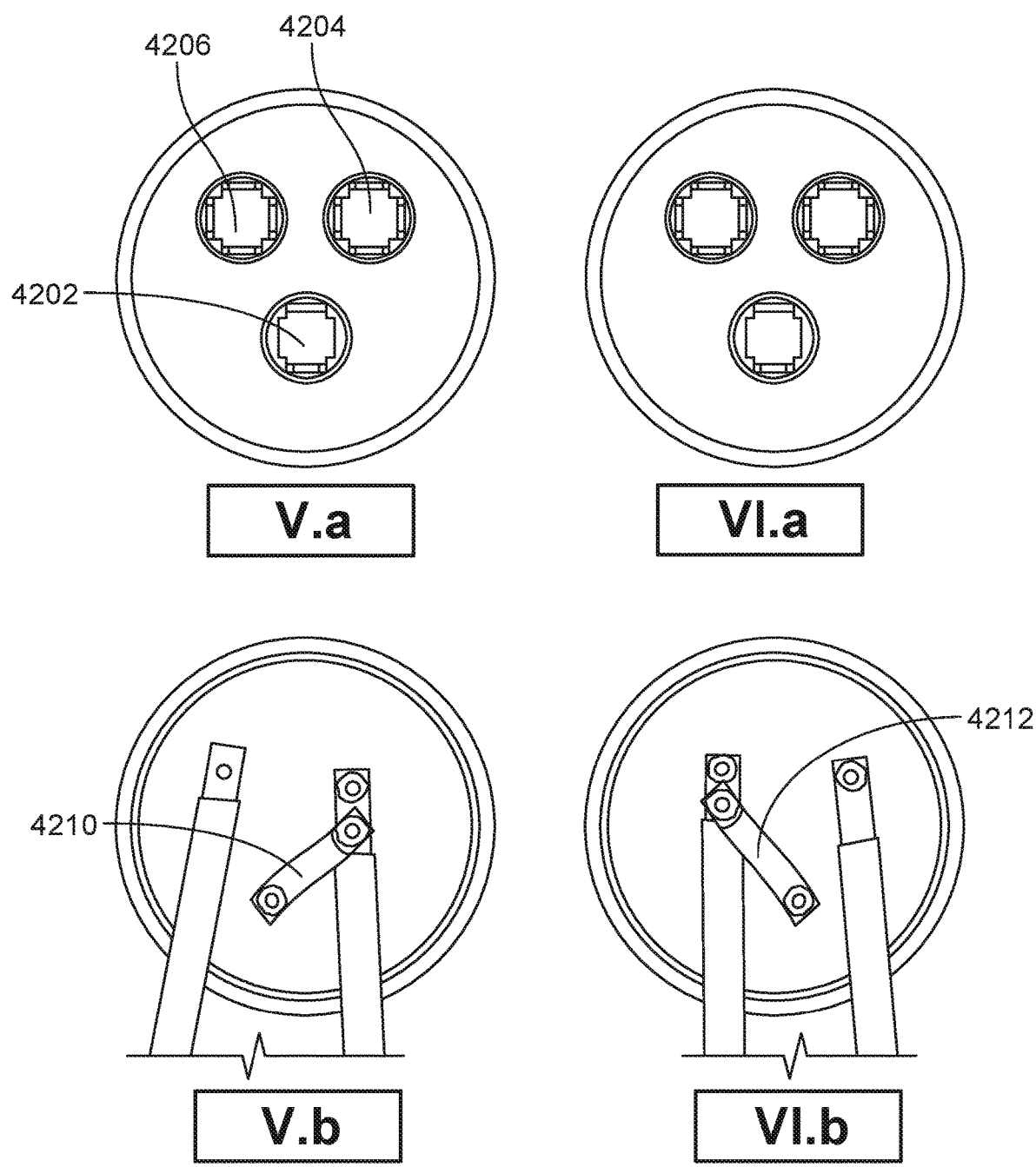

FIG. 42 shows an example of a run capacitor (e.g., a "single" run capacitor) that includes a second common terminal (e.g., sometimes referred to as a booster terminal (BT) 4202), a compressor capacitor 4204, and a common terminal 4206. In variants V.a and V.b, the booster terminal 4202 is connected to the common terminal 4206 by a conductor 4210 that runs between the two terminals beneath the cover of the capacitor. This arrangement is similar to the implementations described above with respect to FIGS. 36-38. On the other hand, variants VI.a and VI.b show the booster terminal 4202 connected to the compressor capacitor 4204 by a conductor 4212. With the booster terminal 4202 connected to the compressor capacitor 4204, the same disconnection techniques described above can be employed for ensuring that the start capacitor is disconnected from the compressor when the run capacitor fails.

Figure 43A:
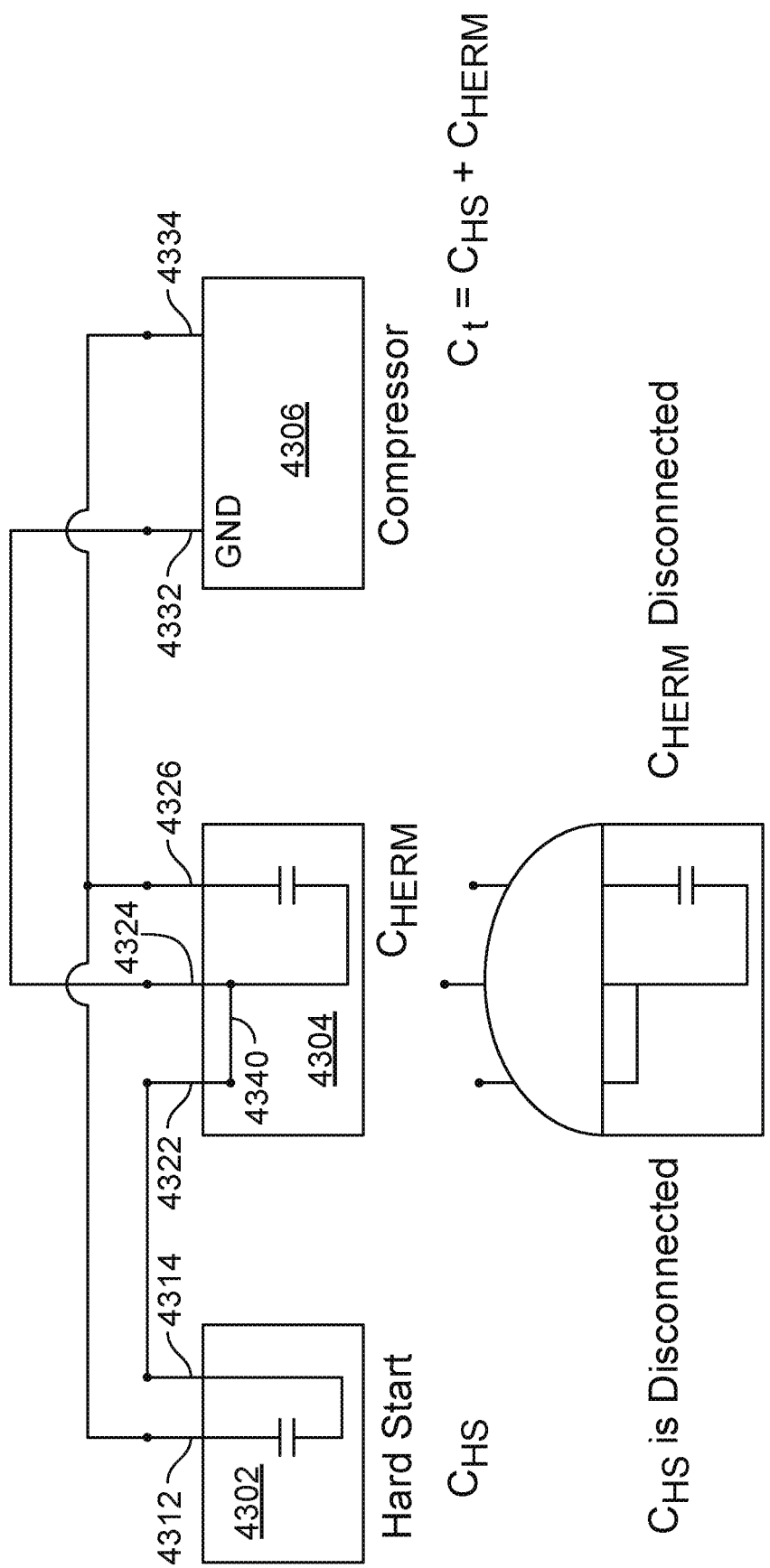
FIGS. 43A-B are schematic circuit diagrams showing connections between a run capacitor, a start capacitor, and a compressor.

FIG. 43A shows a schematic circuit diagram illustrating connections between a start capacitor 4302, a run capacitor 4304 with a booster terminal 4322, and a compressor motor 4306 (e.g., of an air conditioning system). In the illustrated example, the booster terminal 4322 is connected to a common cover terminal 4324 of the run capacitor. A connection 4340 (e.g., by a conductor) occurs beneath a cover of the run capacitor 4304. When the system is operational, the capacitor of the hard start capacitor 4302 and the capacitor (e.g., the herm capacitor) of the run capacitor 4304 are connected in parallel. When the run capacitor fails, as shown in the illustration, all terminal pins are broken, and the start capacitor 4302 is not electrically connected to the compressor 4306, as shown. In particular, the common terminal's connection to ground is broken, thereby resulting in the start capacitor 4302 being electrically disconnected from the compressor 4306.

Figure 43B:
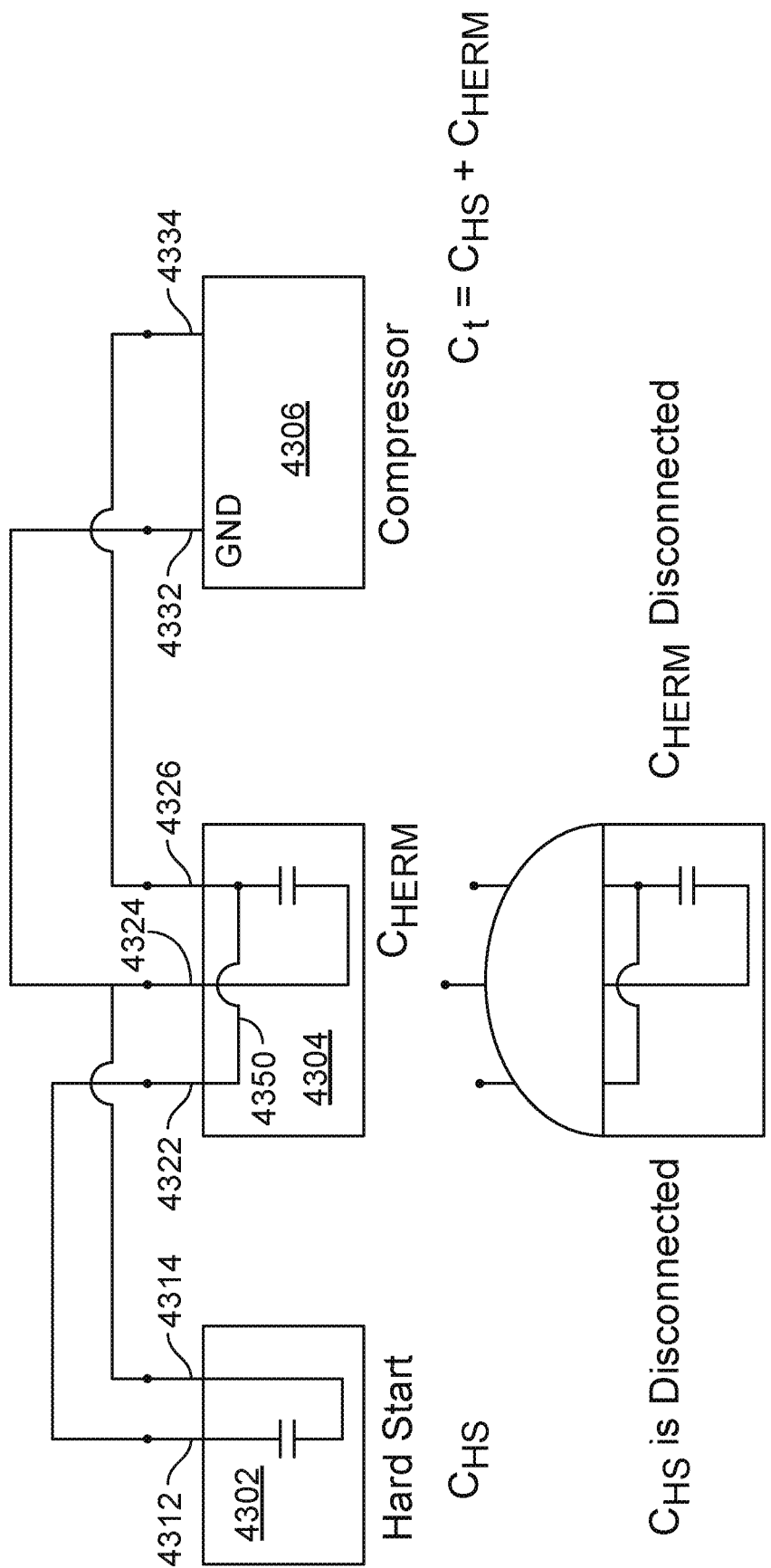

FIG. 43B shows a schematic circuit diagram illustrating connections between the start capacitor 4302, the run capacitor 4304 with the booster terminal 4322, and the compressor motor 4306 (e.g., of an air conditioning system). In the illustrated example, the booster terminal 4322 is connected to a cover terminal (e.g., a capacitor cover terminal) of the run capacitor, in particular, to the herm capacitor terminal 4326. A connection 4350 (e.g., by a conductor) occurs beneath a cover of the run capacitor 4304. When the system is operational, the capacitor of the hard start capacitor 4302 and the capacitor (e.g., the herm capacitor) of the run capacitor 4304 are connected in parallel. When the run capacitor fails, as shown in the illustration, all terminal pins are broken, and the start capacitor 4302 is not electrically connected to the compressor 4306, as shown.

Figure 44A:
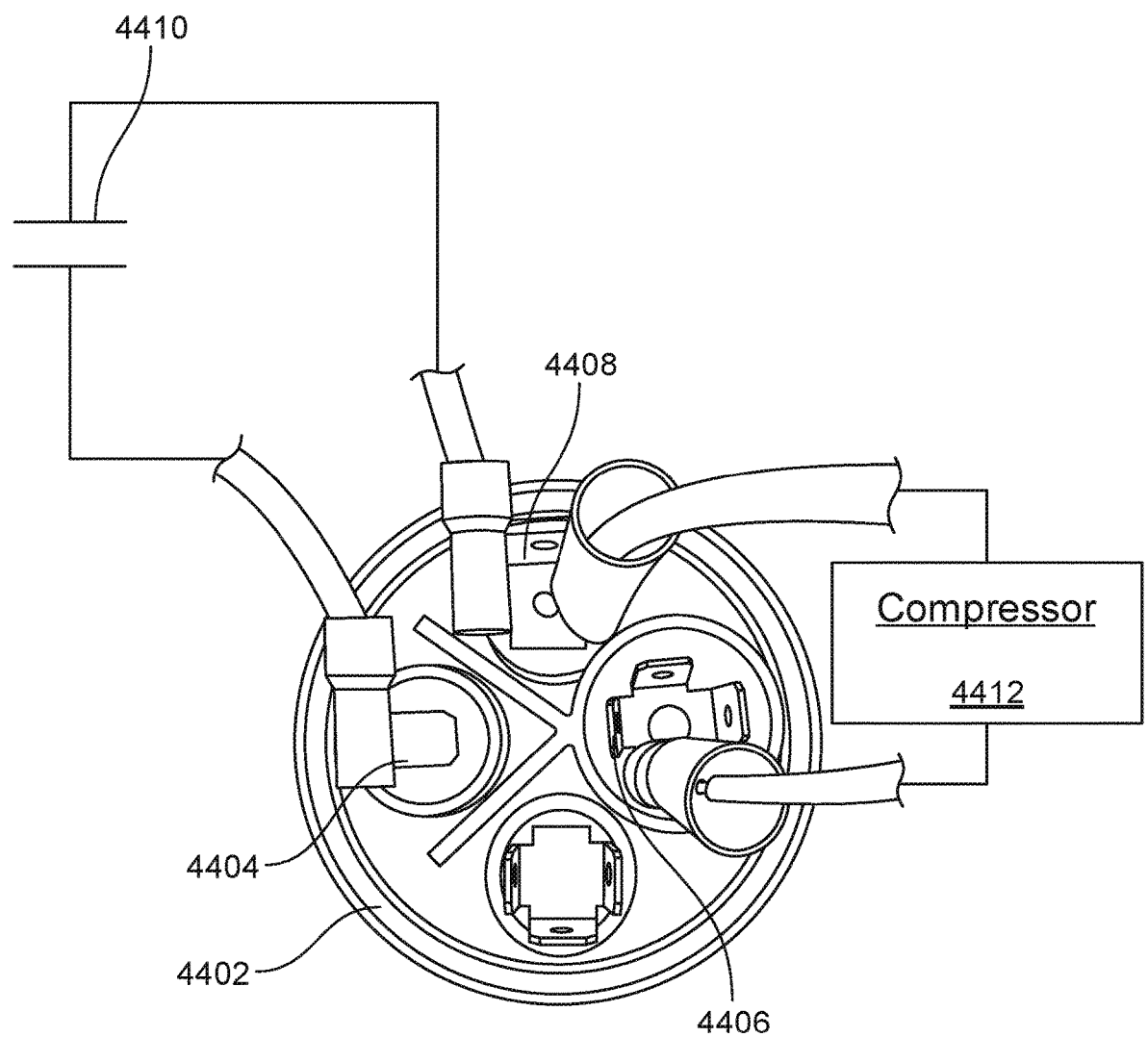
FIGS. 44A-C show examples of run capacitors that include a booster terminal.
Figure 44B:
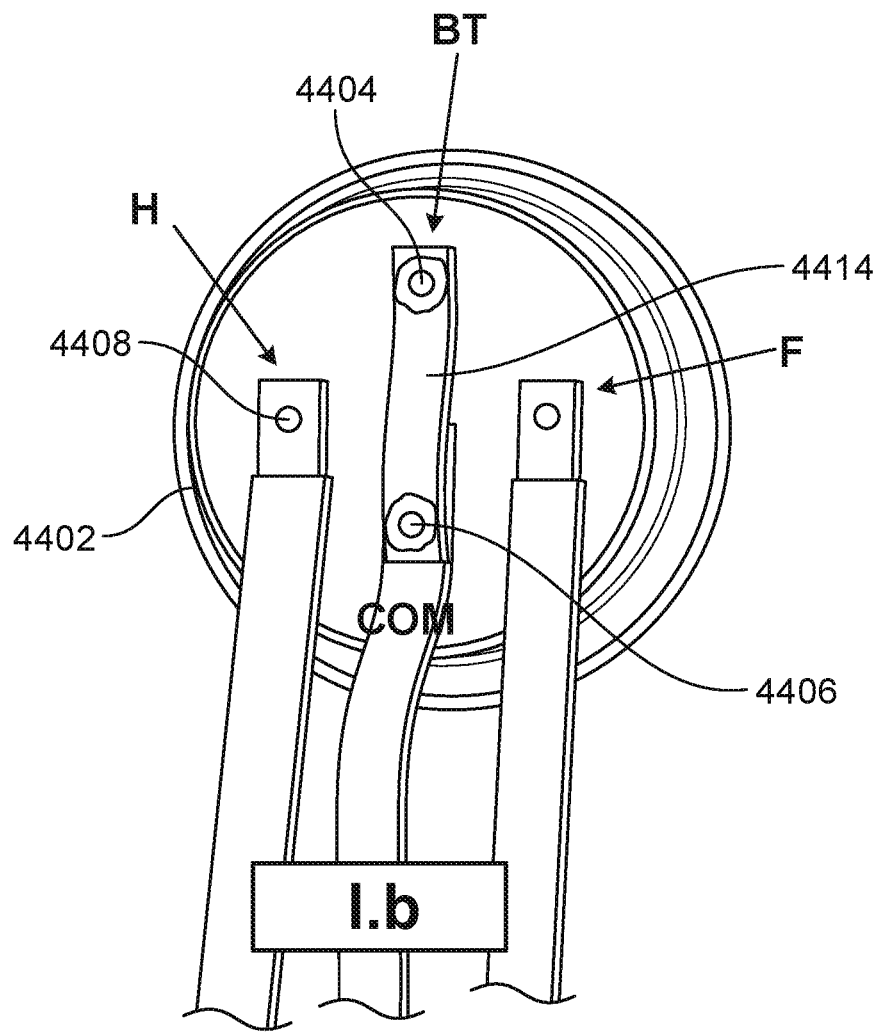
Figure 44C:
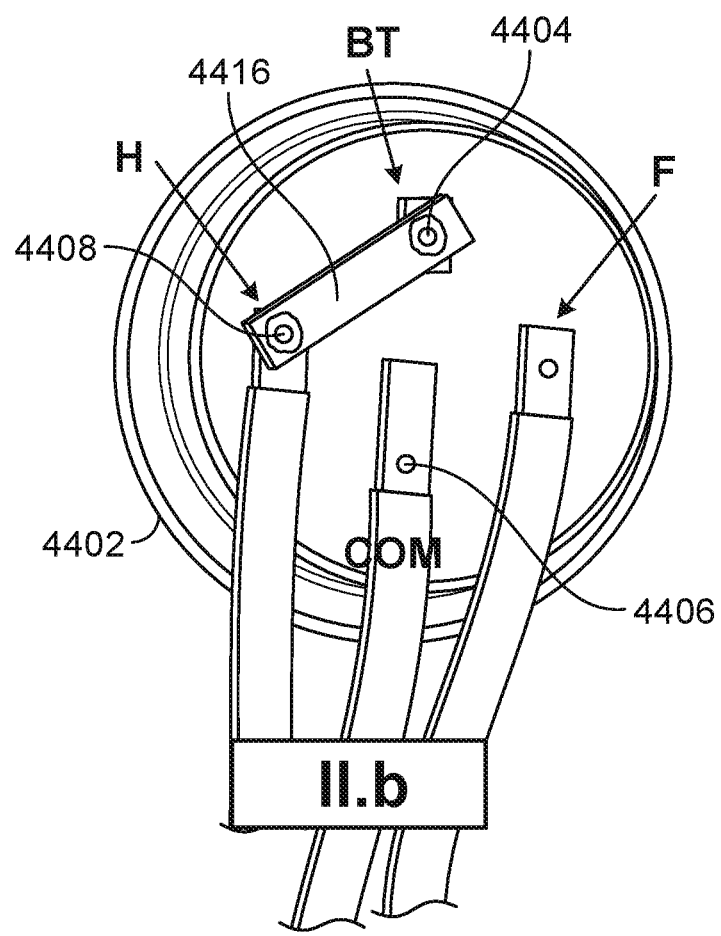

FIGS. 44A-C show examples of run capacitors. Referring to FIG. 44A in particular, the run capacitor 4402 employs a dual design in which one capacitance is provided to be connected to a compressor and a second capacitance is provided for connecting to a fan. In the illustrated example, the run capacitor 4402 includes a booster terminal 4404, a common terminal 4406, and a herm terminal 4408 (e.g., a positive compressor terminal). The herm terminal 4408 provides a run capacitance as well as a start capacitance 4410 to the compressor 4412. The run capacitance and the start capacitance 4410 are connected in parallel during operation of the compressor 4412. The common terminal 4406 of the run capacitor 4402 is connected to the compressor 4412 (e.g., the common side of the compressor), and the booster terminal 4404 of the run capacitor 4402 is connected to the start capacitance 4410 (e.g., a start capacitor such as a Turbo Easy-Start from American Radionic of Palm Coast, Fla.). Due to this connection, the common side of the start capacitance 4410 is not directly connected to the compressor 4412, but rather connected to the compressor 4412 via the booster terminal 4404 of the run capacitor 4402. A terminal of the run capacitor 4402 normally used to connect to the fan is not illustrated as being connected in the figure.

FIG. 44B shows an underside of the cover of the run capacitor 4402. The booster terminal 4404 and the common terminal 4406 are connected to each other by a conductor 4414. Thus, when the start capacitance (4410 of FIG. 44A) is connected to the booster terminal 4404, it is connected to the ground of the run capacitor 4402 (e.g., via the common terminal 4406). The schematic circuit diagram of FIG. 43A corresponds to the wiring shown in FIGS. 44A and 44B. When the run capacitor 4402 fails, the cover domes out as described in detail above. This results in the terminal posts of the various terminals being electrically separated from the body (e.g., the case and inner components) of the run capacitor 4402. Because of the indirect nature in which the common side of the start capacitance 4410 is connected to the compressor 4412 (e.g., via the booster terminal 4404), failure of the run capacitor 4402 results in the start capacitance 4410 (as well as the run capacitance) being disconnected from the compressor 4412. In this way, the compressor 4412 is prevented from continued operation by the start capacitance 4410, which over time can lead to early failure of the compressor 4412.

FIG. 44C shows an underside of an alternative implementation of the run capacitor 4402. In this example, rather than the booster terminal 4404 being connected to the common terminal 4406 by the conductor 4414 (as shown in FIG. 44B), the booster terminal 4404 is connected to the herm terminal 4408 via a conductor 4416. Using this configuration, the positive side of the start capacitance 4410 is connected to the compressor 4412 via the booster terminal 4404 (which, e.g., is connected to the herm terminal 4408 by conductor 4416), and the common side of the start capacitance 4410 is connected to the common terminal 4406. The schematic circuit diagram of FIG. 43B corresponds to the wiring shown in FIGS. 44A and 44C. Like the implementation of FIG. 44B, when the run capacitor 4402 fails, the cover domes up, thereby resulting in the start capacitance 4410 being disconnected from the compressor 4412 due to its indirect connection of its positive side via the booster terminal 4404. Such a configuration prevents the start capacitance 4410 from keeping the compressor 4412 running despite failure of the run capacitor 4402.

While the connections of FIGS. 44A-C have been shown and described using a dual run capacitor 4402 (e.g., a run capacitor that is configured to provide two separate capacitance values), other types of run capacitors can similarly include a booster terminal for allowing an indirect connection between the start capacitance and the compressor. In some implementations, the run capacitor may be a single capacitor (e.g., a capacitor configured to provide a single capacitance value) that includes a herm terminal, a common terminal, and a booster terminal electrically connected to either the herm terminal or the common terminal underneath the cover. In some implementations, the run capacitor may be a universal capacitor (e.g., a Turbo 200 motor run capacitor from American Radionic of Palm Coast, Fla.) that is configured to provide a plurality of various capacitance values and including a booster terminal connected to the common terminal underneath the cover of the universal run capacitor. Despite the particular run capacitor used, failure of the run capacitor with the start capacitor wired as depicted herein results in the start capacitance no longer being connected to the compressor, thereby preventing extended running of the compressor using a start capacitance, and in turn preventing danger or damage to the compressor.

The capacitor and the features thereof described above are believed to admirably achieve the objects of the invention and to provide a practical and valuable advance in the art by facilitating efficient replacement of failed capacitors. Those skilled in the art will appreciate that the foregoing description is illustrative and that various modifications may be made without departing from the spirit and scope of the invention, which is defined in the following claims.

The invention claimed is:

1. An apparatus suitable for use with a fan motor and a compressor motor in an air-conditioning system and configured to provide a plurality of selectable capacitance values, comprising:
    six capacitive devices housed in a case, wherein the six capacitive devices have a combined capacitance value of about 67.5 microfarads, and each capacitive device has a first capacitor terminal and a second capacitor terminal;
    a cover assembly comprising:
        a deformable cover mountable to the case;
        six capacitor cover terminals, each capacitor cover terminal corresponding to one of the six capacitive devices, and each capacitor cover terminal having at least one contact extending from the deformable cover, wherein the deformable cover is configured to displace at least one of the six capacitor cover terminals upon an operative failure of at least one of the six capacitive devices;
        six insulation structures, wherein each insulation structure is configured to provide insulation for at least one of the six capacitor cover terminals;
        a common cover terminal having at least one electrical contact extending from the deformable cover; and
        a circuitry connection terminal for connecting and disconnecting external equipment from a circuit; and
    six conductors, wherein each conductor is configured to electrically connect one of the six capacitor cover terminals to a corresponding one of the six capacitive devices,
    wherein at least one of the six capacitive devices is connected to the fan motor during operation of the air-conditioning system and wherein at least another of the six capacitive devices is connected to the compressor motor during operation of the air-conditioning system.

2. The apparatus of claim 1, wherein the circuitry connection terminal is positioned at a periphery of the deformable cover.

3. The apparatus of claim 1, wherein the circuitry connection terminal is connected to one of the six capacitor cover terminals, and the connection is located beneath the deformable cover.

4. The apparatus of claim 1, wherein the circuitry connection terminal is connected to the common cover terminal, and the connection is located beneath the deformable cover.

5. The apparatus of claim 4, wherein the common cover terminal and the circuitry connection terminal are connected to all of the capacitive devices of the apparatus.

6. The apparatus of claim 1, wherein the circuitry connection terminal is configured to connect to a start capacitor having a capacitance value that is suitable for starting the compressor motor of the air-conditioning system.

7. The apparatus of claim 6, wherein the start capacitor is connected to the compressor motor via the apparatus.

8. The apparatus of claim 7, wherein the start capacitor is configured to be electrically disconnected from the compressor motor upon an operative failure of at least one of the six capacitive devices of the apparatus.

9. The apparatus of claim 1, wherein the circuitry connection terminal has four electrical contacts extending from the deformable cover.

10. The apparatus of claim 1, further comprising an insulation structure configured to provide insulation for the circuitry connection terminal.

11. An apparatus suitable for use with one or both of a fan motor or a compressor motor in an air-conditioning system, the apparatus comprising:
    at least one capacitive device housed in a case, wherein the at least one capacitive device has a first capacitor terminal and a second capacitor terminal;
    a cover assembly comprising:
        a deformable cover mountable to the case;
        a capacitor cover terminal corresponding to the capacitive device, the capacitor cover terminal having at least one contact extending from the deformable cover, wherein the deformable cover is configured to displace the capacitor cover terminal upon an operative failure of the capacitive device;
        an insulation structure configured to provide insulation for the capacitor cover terminals;
        a common cover terminal having at least one electrical contact extending from the deformable cover; and
        a circuitry connection terminal for connecting and disconnecting external equipment from a circuit; and
    a conductor that is configured to electrically connect the capacitor cover terminal to the capacitive device,
    wherein the capacitive device is connected to the fan motor or the compressor motor during operation of the air-conditioning system.

12. The apparatus of claim 11, wherein the circuitry connection terminal is connected to the capacitor cover terminal, and the connection is located beneath the deformable cover.

13. The apparatus of claim 11, wherein the circuitry connection terminal is connected to the common cover terminal, and the connection is located beneath the deformable cover.

14. The apparatus of claim 13, wherein the common cover terminal and the circuitry connection terminal are connected to all of the capacitive devices of the apparatus.

15. The apparatus of claim 11, wherein the circuitry connection terminal is configured to connect to a start capacitor having a capacitance value that is suitable for starting the compressor motor of the air-conditioning system.

16. The apparatus of claim 15, wherein the start capacitor is connected to the compressor motor via the apparatus.

17. The apparatus of claim 16, wherein the start capacitor is configured to be electrically disconnected from the compressor motor upon an operative failure of the capacitive device of the apparatus.

18. The apparatus of claim 11, further comprising an insulation structure configured to provide insulation for the circuitry connection terminal.

19. The apparatus of claim 18, wherein the insulation structure for providing insulation for the circuitry connection terminal includes a cup portion.

20. The apparatus of claim 19, wherein the apparatus comprises two capacitive devices housed in the case, and the insulation structure for providing insulation for the circuitry connection terminal further includes at least two fins extending radially from the cup portion.

21. The apparatus of claim 20, wherein the insulation structure for providing insulation for the circuitry connection terminal includes three fins extending radially from the cup portion.

\* \* \* \* \*